(12) United States Patent
Sasaki et al.

(10) Patent No.: US 8,427,782 B2
(45) Date of Patent: Apr. 23, 2013

(54) MAGNETIC HEAD FOR PERPENDICULAR MAGNETIC RECORDING

(75) Inventors: Yoshitaka Sasaki, Milpitas, CA (US);
Hiroyuki Itoh, Milpitas, CA (US);
Shigeki Tanemura, Milpitas, CA (US);
Tatsushi Shimizu, Hong Kong (CN);
Tatsuya Shimizu, Hong Kong (CN)

(73) Assignees: Headway Technology, Inc., Milpitas;
SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/476,543

(22) Filed: May 21, 2012

(65) Prior Publication Data

US 2012/0229932 A1     Sep. 13, 2012

Related U.S. Application Data

(62) Division of application No. 13/051,560, filed on Mar. 18, 2011, now Pat. No. 8,213,116, which is a division of application No. 11/546,902, filed on Oct. 13, 2006, now Pat. No. 7,940,495.

(51) Int. Cl.
*G11B 5/147* (2006.01)
(52) U.S. Cl.
USPC ............ 360/125.27; 360/125.02; 360/128.28; 360/125.29
(58) Field of Classification Search ............. 360/125.02, 360/125.27–125.29
See application file for complete search history.

(56) References Cited

U.S. PATENT DOCUMENTS

| | | | |
|---|---|---|---|
| 4,656,546 | A | 4/1987 | Mallory |
| 4,672,493 | A | 6/1987 | Schewe |
| 6,504,675 | B1 | 1/2003 | Shukh et al. |
| 6,954,340 | B2 | 10/2005 | Shukh et al. |
| 7,126,788 | B1 | 10/2006 | Liu et al. |
| 7,180,704 | B2 | 2/2007 | Mochizuki et al. |
| 7,233,457 | B2 | 6/2007 | Johnston et al. |
| 7,940,495 | B2 | 5/2011 | Sasaki et al. |
| 2005/0128637 | A1 | 6/2005 | Johnston et al. |
| 2006/0002020 | A1 | 1/2006 | Pokhil et al. |

FOREIGN PATENT DOCUMENTS

JP     A-2006-18988     1/2006

OTHER PUBLICATIONS

Sep. 16, 2010 Office Action issued in U.S. Appl. No. 11/546,902.
Feb. 17, 2011 Notice of Allowance issued in U.S. Appl. No. 11/546,902.
Feb. 22, 2012 Notice of Allowance issued in U.S. Appl. No. 13/051,560.

*Primary Examiner* — Hoa T Nguyen
*Assistant Examiner* — Carlos E Garcia
(74) *Attorney, Agent, or Firm* — Oliff & Berridge, PLC

(57) ABSTRACT

A magnetic layer for writing incorporates: a pole layer having an end face located in a medium facing surface and a lower yoke layer. A first magnetic layer for flux concentration is connected to the lower yoke layer at a location away from the medium facing surface, and passes a magnetic flux corresponding to a magnetic field generated by a first coil. A second magnetic layer for flux concentration is connected to the pole layer at a location away from the medium facing surface, and passes a magnetic flux corresponding to a magnetic field generated by a second coil. A nonmagnetic layer is disposed between the pole layer and the lower yoke layer. The lower yoke layer is connected to the pole layer at a location closer to the medium facing surface than the nonmagnetic layer.

5 Claims, 33 Drawing Sheets

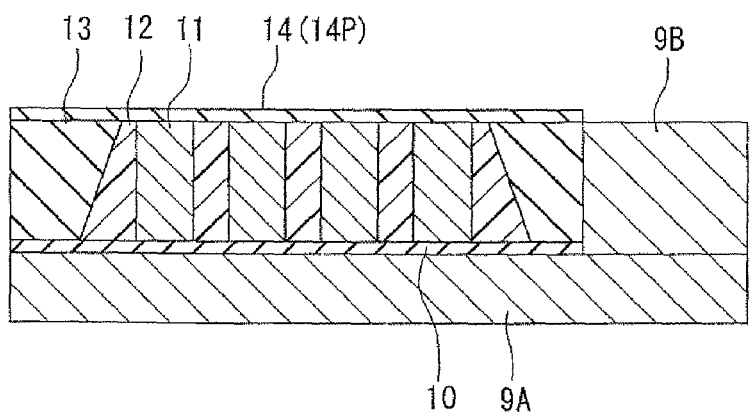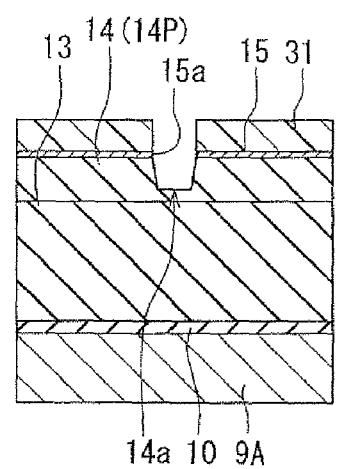
FIG. 5A                                      FIG. 5B
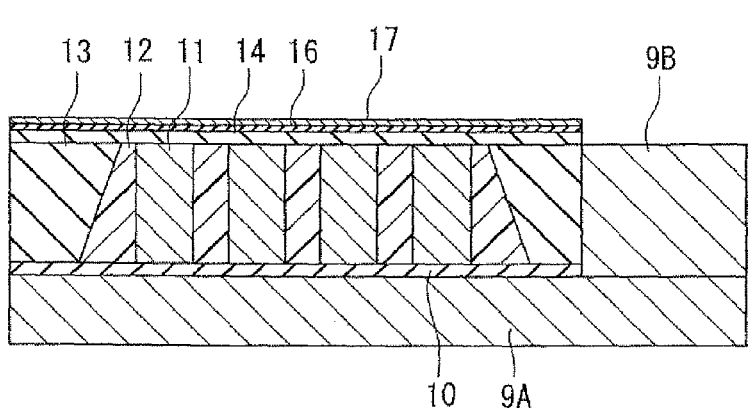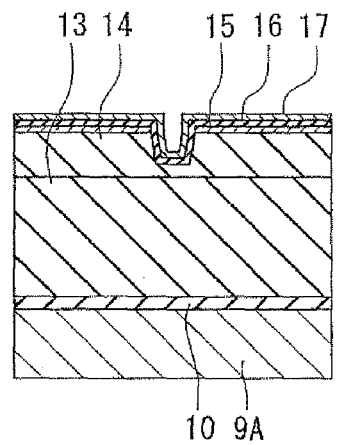
FIG. 6A                                      FIG. 6B

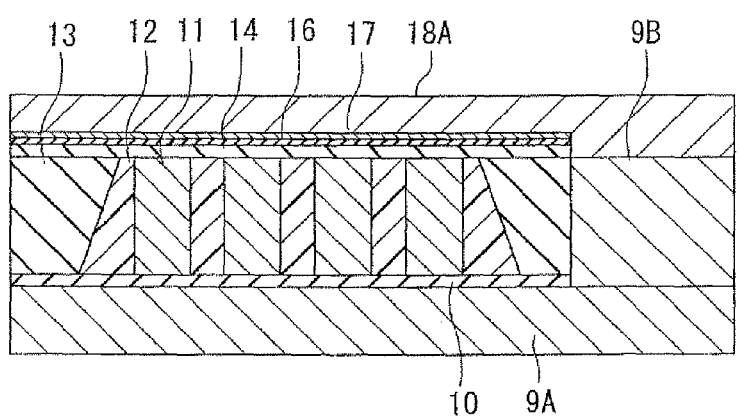 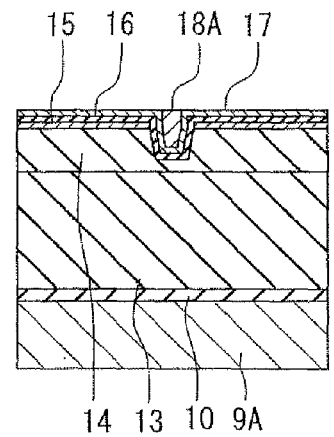
FIG. 7A                FIG. 7B
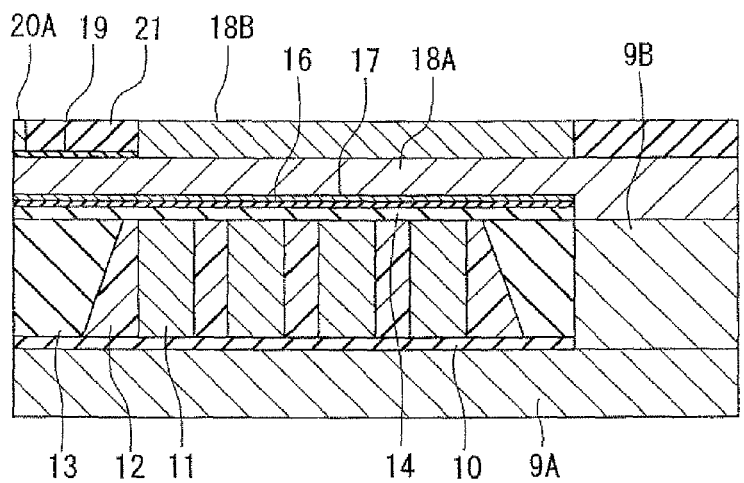 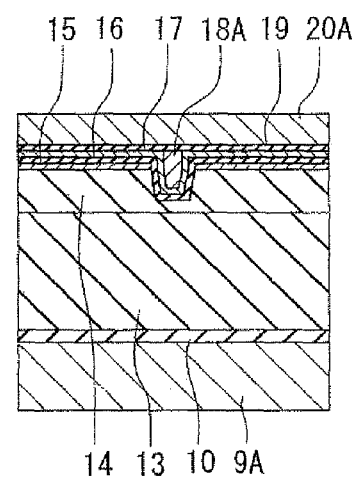
FIG. 8A                FIG. 8B

MAGNETIC HEAD FOR PERPENDICULAR MAGNETIC RECORDING

This is a Divisional of application Ser. No. 13/051,560 filed Mar. 18, 2011 (now U.S. Pat. No. 8,213,116), which is a Divisional of application Ser. No. 11/546,902 filed Oct. 13, 2006 (now U.S. Pat. No. 7,940,495). The disclosure of the prior applications is hereby incorporated by reference herein in its entirety.

BACKGROUND OF THE INVENTION

1. Field of the Invention

The present invention relates to a magnetic head for perpendicular magnetic recording that is used for writing data on a recording medium by means of a perpendicular magnetic recording system.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, suffers degradation. It is therefore required to achieve better write characteristics as the track width is reduced.

A magnetic head used for a magnetic disk drive such as a hard disk drive is typically provided in a slider. The slider has a medium facing surface that faces toward a recording medium. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system that exhibits a better capability of writing on a recording medium than the longitudinal magnetic recording system, in particular, if the above-mentioned skew occurs, problems arise, such as an occurrence of a phenomenon in which data stored on an adjacent track is erased when data is written on a specific track (that is hereinafter called adjacent track erase), or unwanted writing between adjacent two tracks. To achieve higher recording density, it is required to suppress adjacent track erase. Unwanted writing between adjacent two tracks affects detection of servo signals for alignment of the magnetic head and the signal-to-noise ratio of a read signal.

A technique is known for preventing the above-described problems resulting from the skew, as disclosed in U.S. Pat. No. 6,504,675 B1, for example. According to this technique, an end face of the pole layer located in the medium facing surface is made to have a shape in which one of the sides of the end face located backward along the direction of travel of the recording medium (that is, the side located closer to the air inflow end of the slider) is shorter than the opposite side.

As a magnetic head for perpendicular magnetic recording, a magnetic head comprising the pole layer and a shield is known, as disclosed in U.S. Pat. No. 4,656,546, for example. In the medium facing surface of this magnetic head, an end face of the shield is located forward of the end face of the pole layer along the direction of travel of the recording medium with a specific small space therebetween. Such a magnetic head will be hereinafter called a shield-type head. In the shield-type head the shield prevents a magnetic flux from reaching the recording medium, the flux being generated from the end face of the pole layer and extending in directions except the direction orthogonal to the surface of the recording medium. In addition, the shield has a function of returning a magnetic flux that has been generated from the end face of the pole layer and has magnetized the recording medium. The shield-type head achieves a further improvement in linear recording density.

U.S. Pat. No. 4,672,493 discloses a magnetic head having such a structure that magnetic layers are respectively provided forward and backward of a middle magnetic layer to be a pole layer along the direction of travel of a recording medium and that coils are respectively provided between the middle magnetic layer and the magnetic layer located forward and between the middle magnetic layer and the magnetic layer located backward. According to this magnetic head, it is possible to increase components in the direction orthogonal to the surface of the recording medium among components of the magnetic field generated from an end of the middle magnetic layer closer to the medium facing surface.

U.S. Pat. No. 6,954,340 B2 discloses a magnetic head having such a structure that return poles are respectively provided forward and backward of a main pole to be a pole layer along the direction of travel of a recording medium and that coils are respectively provided between the main pole and the return pole located forward and between the main pole and the return pole located backward. This magnetic head has two side shields that connect the two return poles to each other and that are disposed on both sides of the main pole opposed to each other in the direction of track width.

Reference is now made to FIG. 37 to describe a basic configuration of the shield-type head. FIG. 37 is a cross-sectional view of the main part of an example of the shield-type head. This shield-type head comprises: a medium facing surface 100 that faces toward a recording medium; a coil 101 for generating a magnetic field corresponding to data to be written on the medium; a pole layer 102 having an end located in the medium facing surface 100, allowing a magnetic flux corresponding to the field generated by the coil 101 to pass, and generating a write magnetic field for writing the data on the medium by means of the perpendicular magnetic recording system; a shield layer 103 having an end located in the medium facing surface 100 and having a portion located away from the medium facing surface 100 and coupled to the pole layer 102; a gap layer 104 provided between the pole layer 102 and the shield layer 103; and an insulating layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium with a specific space created by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 37 the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 faces toward the pole layer 102 with the gap layer 104 disposed in between. Throat height TH is the length (height) of the portions of the pole layer 102 and the shield layer 103 facing toward each other with the gap layer 104 disposed in between, the length being taken from the end closer to the medium facing surface 100 to the other end. The throat height TH influences the intensity and distribution of the field generated from the pole layer 102 in the medium facing surface 100.

The location of the end of a bit pattern to be written on a recording medium by the head of FIG. 37 is determined by the location of an end of the end face of the pole layer 102 located in the medium facing surface 100, the end being located forward along the direction T of travel of the recording medium. At a location forward of the end face of the pole layer 102 along the direction T of travel of the recording medium, the shield layer 103 takes in a magnetic flux generated from the end face of the pole layer 102 and extending in directions except the direction orthogonal to the surface of the recording medium. The shield layer 103 thereby prevents this flux from reaching the recording medium. As a result, it is possible to prevent a direction of magnetization of the bit pattern already written on the medium from being changed due to the effect of the above-mentioned flux.

In the shield-type head as shown in FIG. 37, for example, it is preferred to reduce the throat height TH to improve the overwrite property. It is required that the throat height TH be 0.1 to 0.3 micrometer (μm), for example. When such a small throat height TH is required, the following problems arise in the head of FIG. 37.

That is, when the head of FIG. 37 is in operation, the insulating layer 105 may expand due to the heat generated by the coil 101, and an end portion of the shield layer 103 closer to the medium facing surface 100 may thereby protrude. Particularly when the throat height TH is small, a portion of the shield layer 103 located between the insulating layer 105 and the medium facing surface 100 is thin, so that the end portion of the shield layer 103 closer to the medium facing surface 100 is more likely to protrude. The protrusion of the end portion of the shield layer 103 during operation of the head makes a collision of the slider with the recording medium occur more frequently.

According to the magnetic head comprising two coils disposed to sandwich the pole layer, as disclosed in U.S. Pat. No. 4,672,493 and U.S. Pat. No. 6,954,340 B2, it is possible to make the heat value of each of the two coils smaller than that of a coil of a magnetic head in which the coil is the only one coil provided.

However, the magnetic heads disclosed in U.S. Pat. No. 4,672,493 and U.S. Pat. No. 6,954,340 B2 have problems as will now be described. First, in the magnetic head disclosed in U.S. Pat. No. 4,672,493, at a location away from the medium facing surface, the magnetic layer located forward is connected to the top surface of the middle magnetic layer, and the magnetic layer located backward is connected to the bottom surface of the middle magnetic layer. In addition, the interface between the middle magnetic layer and the magnetic layer located forward and the interface between the middle magnetic layer and the magnetic layer located backward are opposed to each other. Therefore, in this magnetic head, in a region between these two interfaces, the flow of a magnetic flux that has come into the middle magnetic layer from the magnetic layer located forward and the flow of a magnetic flux that has come into the middle magnetic layer from the magnetic layer located backward are nearly opposite in direction. As a result, in the middle magnetic layer of this magnetic head, there occurs repulsion between the magnetic flux that has come into the middle magnetic layer from the magnetic layer located forward and the magnetic flux that has come into the middle magnetic layer from the magnetic layer located backward, and the flux density of the middle magnetic layer may be thereby reduced, which may result in degradation of overwrite property.

In the magnetic head disclosed in U.S. Pat. No. 6,954,340 B2, at a location away from the medium facing surface, the return pole located forward is connected to the top surface of the main pole with a first magnetic stud disposed in between, and the return pole located backward is connected to the bottom surface of the main pole with a second magnetic stud disposed in between. In addition, the interface between the main pole and the first magnetic stud and the interface between the main pole and the second magnetic stud are opposed to each other. Therefore, in this magnetic head, in a region between these two interfaces, the flow of a magnetic flux that has come into the main pole from the return pole located forward via the first magnetic stud and the flow of a magnetic flux that has come into the main pole from the return pole located backward via the second magnetic stud are nearly opposite in direction. As a result, in the main pole of this magnetic head, there occurs repulsion between the magnetic flux that has come into the main pole from the return pole located forward via the first magnetic stud and the magnetic flux that has come into the main pole from the return pole located backward via the second magnetic stud, and the flux density of the main pole may be thereby reduced, which may result in degradation of overwrite property.

OBJECT AND SUMMARY OF THE INVENTION

It is an object of the invention to provide a magnetic head for perpendicular magnetic recording comprising a magnetic layer generating a write magnetic field and two coils located to sandwich the magnetic layer, the head being capable of preventing a reduction in flux density of the magnetic layer.

A first magnetic head for perpendicular magnetic recording of the invention comprises: a medium facing surface that faces toward a recording medium; a first coil and a second coil each generating a magnetic field corresponding to data to be written on the recording medium; a magnetic layer for writing having an end face located in the medium facing surface, allowing a magnetic flux corresponding to the field generated by each of the first and second coils to pass therethrough, and generating a write magnetic field for writing the data on the recording medium by means of a perpendicular magnetic recording system; a first magnetic layer for flux concentration disposed backward of the magnetic layer for writing along a direction of travel of the recording medium, connected to the magnetic layer for writing at a location away from the medium facing surface, and allowing a magnetic flux corresponding to the field generated by the first coil to pass; and a second magnetic layer for flux concentration disposed forward of the magnetic layer for writing along the direction of travel of the recording medium, connected to the magnetic layer for writing at a location away from the medium facing surface, and allowing a magnetic flux corresponding to the field generated by the second coil to pass.

When seen in a direction orthogonal to the interface between the first magnetic layer for flux concentration and the magnetic layer for writing, the first coil is wound around the interface between the first magnetic layer for flux concentration and the magnetic layer for writing. When seen in a direction orthogonal to the interface between the second magnetic layer for flux concentration and the magnetic layer for writing, the second coil is wound around the interface between the second magnetic layer for flux concentration and the magnetic layer for writing. When seen in a direction orthogonal to the interface between the second magnetic layer for flux concentration and the magnetic layer for writing, the interface between the second magnetic layer for flux concentration and the magnetic layer for writing is disposed at a location that does not coincide with the interface between the first magnetic layer for flux concentration and the magnetic layer for writing. Such a configuration suppresses repulsion between a magnetic flux flowing into the magnetic layer for writing from the first magnetic layer for flux concentration and a magnetic flux flowing into the magnetic layer for writing from the second magnetic layer for flux concentration.

In the first magnetic head of the invention, the magnetic layer for writing may incorporate: a pole layer having the end face located in the medium facing surface; and a yoke layer connected to the pole layer and disposed forward of the pole layer along the direction of travel of the recording medium at a location away from the medium facing surface. In this case, the first magnetic layer for flux concentration is connected to the pole layer while the second magnetic layer for flux concentration is connected to the yoke layer.

In the first magnetic head of the invention, the magnetic layer for writing may incorporate: a pole layer having the end face located in the medium facing surface; and a yoke layer connected to the pole layer and disposed backward of the pole layer along the direction of travel of the recording medium at a location away from the medium facing surface. In this case, the first magnetic layer for flux concentration is connected to the yoke layer while the second magnetic layer for flux concentration is connected to the pole layer.

In the first magnetic head of the invention, the second magnetic layer for flux concentration may have an end face located in the medium facing surface, and part of the second coil may be disposed between the second magnetic layer for flux concentration and the magnetic layer for writing.

In the first magnetic head of the invention, the first magnetic layer for flux concentration may have a portion located to sandwich part of the first coil between the magnetic layer for writing and itself.

The first magnetic head of the invention may further comprise: a shield layer disposed forward of the magnetic layer for writing along the direction of travel of the recording medium and having an end face located in the medium facing surface; and a gap layer made of a nonmagnetic material and disposed between the magnetic layer for writing and the shield layer. In this case, in the medium facing surface, the end face of the shield layer is located forward of the end face of the magnetic layer for writing along the direction of travel of the recording medium with a specific space created by the thickness of the gap layer. In addition, the end face of the magnetic layer for writing has a side located adjacent to the gap layer, the side defining the track width. In this case, the first magnetic layer for flux concentration may incorporate a portion located to sandwich part of the first coil between the magnetic layer for writing and itself, and the magnetic head may further comprise a coupling portion coupling the shield layer and the first magnetic layer for flux concentration to each other without touching the magnetic layer for writing.

A second or third magnetic head for perpendicular magnetic recording of the invention comprises: a medium facing surface that faces toward a recording medium; a first coil and a second coil each generating a magnetic field corresponding to data to be written on the recording medium; a magnetic layer for writing having an end face located in the medium facing surface, allowing a magnetic flux corresponding to the field generated by each of the first and second coils to pass therethrough, and generating a write magnetic field for writing the data on the recording medium by means of a perpendicular magnetic recording system; a first magnetic layer for flux concentration disposed backward of the magnetic layer for writing along a direction of travel of the recording medium, connected to the magnetic layer for writing at a location away from the medium facing surface, and allowing a magnetic flux corresponding to the field generated by the first coil to pass; and a second magnetic layer for flux concentration disposed forward of the magnetic layer for writing along the direction of travel of the recording medium, connected to the magnetic layer for writing at a location away from the medium facing surface, and allowing a magnetic flux corresponding to the field generated by the second coil to pass.

In the second magnetic head of the invention, the magnetic layer for writing incorporates: a pole layer having the end face located in the medium facing surface; and a yoke layer connected to the pole layer and disposed forward of the pole layer along the direction of travel of the recording medium at a location away from the medium facing surface. The first magnetic layer for flux concentration is connected to the pole layer. The second magnetic layer for flux concentration is connected to the yoke layer. When seen in a direction orthogonal to the interface between the first magnetic layer for flux concentration and the pole layer, the first coil is wound around the interface between the first magnetic layer for flux concentration and the pole layer. When seen in a direction orthogonal to the interface between the second magnetic layer for flux concentration and the yoke layer, the second coil is wound around the interface between the second magnetic layer for flux concentration and the yoke layer.

The second magnetic head of the invention further comprises a nonmagnetic layer made of a nonmagnetic material and disposed between the pole layer and the yoke layer. When seen in a direction orthogonal to the interface between the second magnetic layer for flux concentration and the yoke layer, at least part of the nonmagnetic layer is disposed at a location that coincides with at least part of this interface. The yoke layer is connected to the pole layer at least at a location closer to the medium facing surface than the nonmagnetic layer. Such a configuration suppresses repulsion between a magnetic flux flowing into the pole layer from the first magnetic layer for flux concentration and a magnetic flux flowing into the yoke layer from the second magnetic layer for flux concentration.

In the second magnetic head of the invention, the second magnetic layer for flux concentration may have an end face located in the medium facing surface, and part of the second coil may be disposed between the second magnetic layer for flux concentration and the magnetic layer for writing.

In the second magnetic head of the invention, the first magnetic layer for flux concentration may have a portion located to sandwich part of the first coil between the magnetic layer for writing and itself.

The second magnetic head of the invention may further comprise: a shield layer disposed forward of the pole layer along the direction of travel of the recording medium and having an end face located in the medium facing surface; and a gap layer made of a nonmagnetic material and disposed between the pole layer and the shield layer. In this case, in the medium facing surface, the end face of the shield layer is located forward of the end face of the pole layer along the direction of travel of the recording medium with a specific space created by the thickness of the gap layer. The end face of the pole layer has a side located adjacent to the gap layer, the side defining the track width. In this case, the first magnetic layer for flux concentration may incorporate a portion located to sandwich part of the first coil between the magnetic layer for writing and itself, and the magnetic head may further comprise a coupling portion coupling the shield layer and the first magnetic layer for flux concentration to each other without touching the magnetic layer for writing.

In the third magnetic head of the invention, the magnetic layer for writing incorporates: a pole layer having the end face located in the medium facing surface; and a yoke layer connected to the pole layer and disposed backward of the pole layer along the direction of travel of the recording medium at a location away from the medium facing surface. The first magnetic layer for flux concentration is connected to the yoke layer. The second magnetic layer for flux concentration is connected to the pole layer. When seen in a direction orthogonal to the interface between the first magnetic layer for flux concentration and the yoke layer, the first coil is wound around the interface between the first magnetic layer for flux concentration and the yoke layer. When seen in a direction orthogonal to the interface between the second magnetic layer for flux concentration and the pole layer, the second coil is wound around the interface between the second magnetic layer for flux concentration and the pole layer.

The third magnetic head of the invention further comprises a nonmagnetic layer made of a nonmagnetic material and disposed between the pole layer and the yoke layer. When seen in a direction orthogonal to the interface between the first magnetic layer for flux concentration and the yoke layer, at least part of the nonmagnetic layer is disposed at a location that coincides with at least part of this interface. The yoke layer is connected to the pole layer at least at a location closer to the medium facing surface than the nonmagnetic layer. Such a configuration suppresses repulsion between a magnetic flux flowing into the yoke layer from the first magnetic layer for flux concentration and a magnetic flux flowing into the pole layer from the second magnetic layer for flux concentration.

In the third magnetic head of the invention, the second magnetic layer for flux concentration may have an end face located in the medium facing surface, and part of the second coil may be disposed between the second magnetic layer and the magnetic layer for writing.

In the third magnetic head of the invention, the first magnetic layer for flux concentration may have a portion located to sandwich part of the first coil between the magnetic layer for writing and itself.

The third magnetic head of the invention may further comprise: a shield layer disposed forward of the pole layer along the direction of travel of the recording medium and having an end face located in the medium facing surface; and a gap layer made of a nonmagnetic material and disposed between the pole layer and the shield layer. In this case, in the medium facing surface, the end face of the shield layer is located forward of the end face of the pole layer along the direction of travel of the recording medium with a specific space created by the thickness of the gap layer. The end face of the pole layer has a side located adjacent to the gap layer, the side defining the track width. In this case, the first magnetic layer for flux concentration may incorporate a portion located to sandwich part of the first coil between the magnetic layer for writing and itself, and the magnetic head may further comprise a coupling portion coupling the shield layer and the first magnetic layer for flux concentration to each other without touching the magnetic layer for writing.

According to the first magnetic head of the invention, the interface between the second magnetic layer for flux concentration and the magnetic layer for writing is disposed at a location that does not coincide with the interface between the first magnetic layer for flux concentration and the magnetic layer for writing. As a result, according to the invention, it is possible to suppress repulsion between the magnetic flux flowing into the magnetic layer for writing from the first magnetic layer for flux concentration and the magnetic flux flowing into the magnetic layer for writing from the second magnetic layer for flux concentration. According to the invention, it is thereby possible to prevent a reduction in flux density of the magnetic layer for writing.

The second magnetic head of the invention comprises the nonmagnetic layer disposed between the pole layer and the yoke layer, and, when seen in a direction orthogonal to the interface between the second magnetic layer for flux concentration and the yoke layer, at least part of the nonmagnetic layer is disposed at a location that coincides with at least part of this interface. The yoke layer is connected to the pole layer at least at a location closer to the medium facing surface than the nonmagnetic layer. As a result, according to the invention, it is possible to suppress repulsion between the magnetic flux flowing into the pole layer from the first magnetic layer for flux concentration and the magnetic flux flowing into the yoke layer from the second magnetic layer for flux concentration. According to the invention, it is thereby possible to prevent a reduction in flux density of the magnetic layer for writing.

The third magnetic head of the invention comprises the nonmagnetic layer disposed between the pole layer and the yoke layer, and, when seen in a direction orthogonal to the interface between the first magnetic layer for flux concentration and the yoke layer, at least part of the nonmagnetic layer is disposed at a location that coincides with at least part of this interface. The yoke layer is connected to the pole layer at least at a location closer to the medium facing surface than the nonmagnetic layer. As a result, according to the invention, it is possible to suppress repulsion between the magnetic flux flowing into the yoke layer from the first magnetic layer for flux concentration and the magnetic flux flowing into the pole layer from the second magnetic layer for flux concentration. According to the invention, it is thereby possible to prevent a reduction in flux density of the magnetic layer for writing.

Other and further objects, features and advantages of the invention will appear more fully from the following description.

BRIEF DESCRIPTION OF THE DRAWINGS

FIG. 5A and FIG. 5B are views for illustrating a step that follows the step shown in FIG. 4A and FIG. 4B.

FIG. 6A and FIG. 6B are views for illustrating a step that follows the step shown in FIG. 5A and FIG. 5B.

FIG. 7A and FIG. 7B are views for illustrating a step that follows the step shown in FIG. 6A and FIG. 6B.

FIG. 8A and FIG. 8B are views for illustrating a step that follows the step shown in FIG. 7A and FIG. 7B.

DETAILED DESCRIPTION OF THE PREFERRED EMBODIMENTS

First Embodiment

Figure 1:
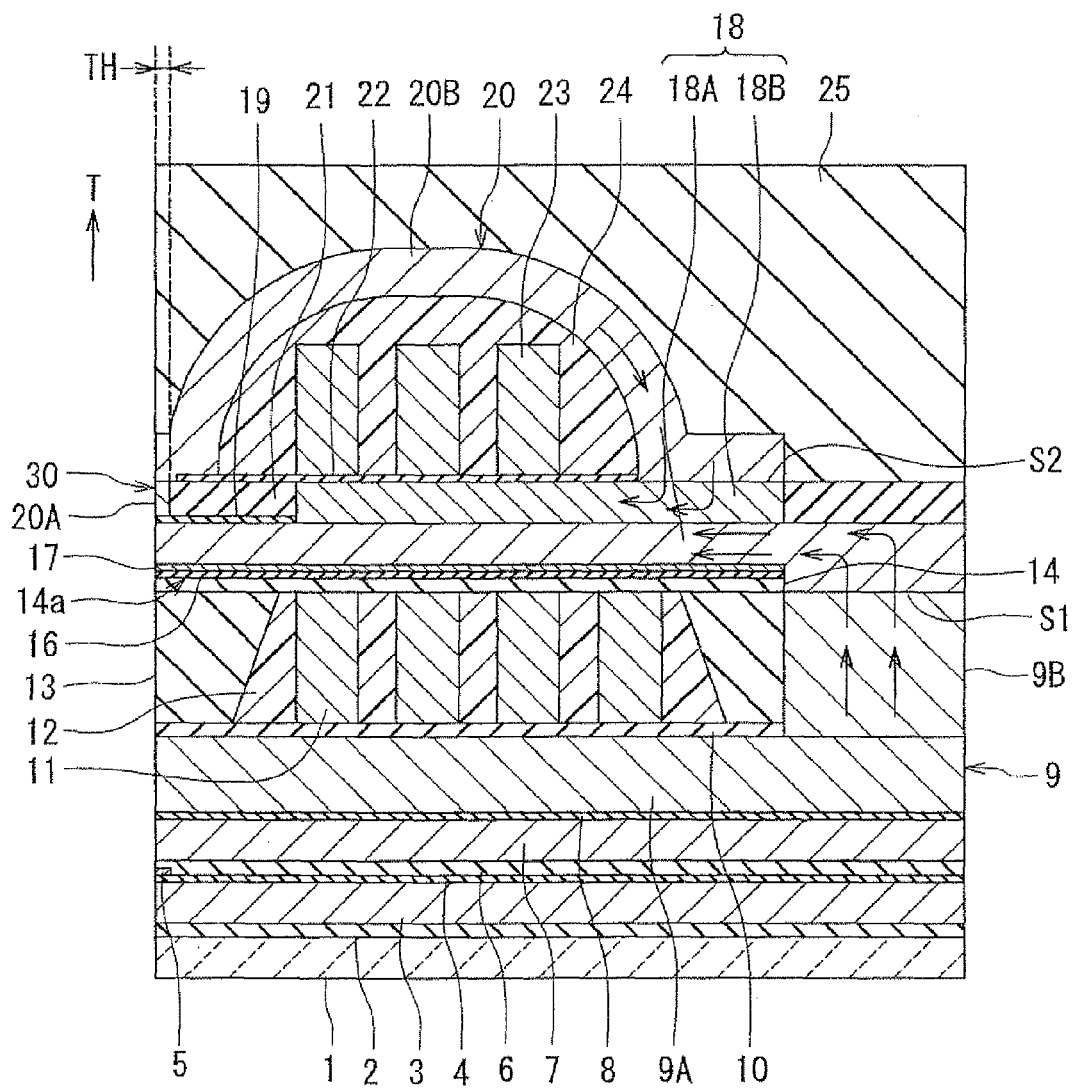
FIG. 1 is a cross-sectional view for illustrating the configuration of a magnetic head of a first embodiment of the invention.
Figure 2:
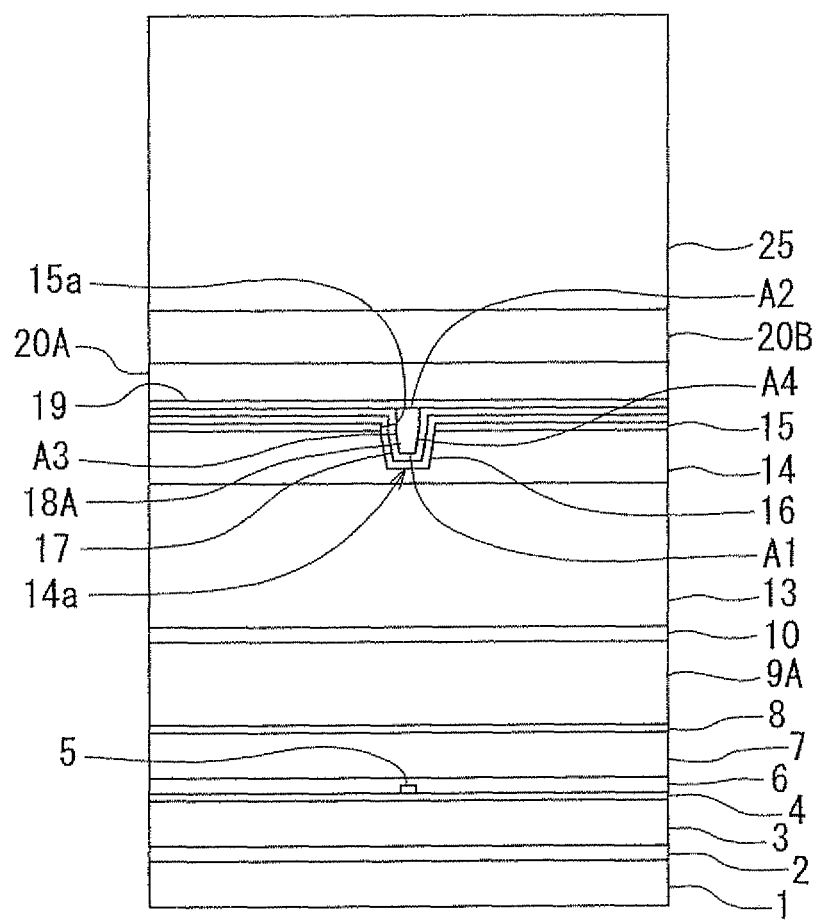
FIG. 2 is a front view of the medium facing surface of the magnetic head of the first embodiment of the invention.
Figure 3:
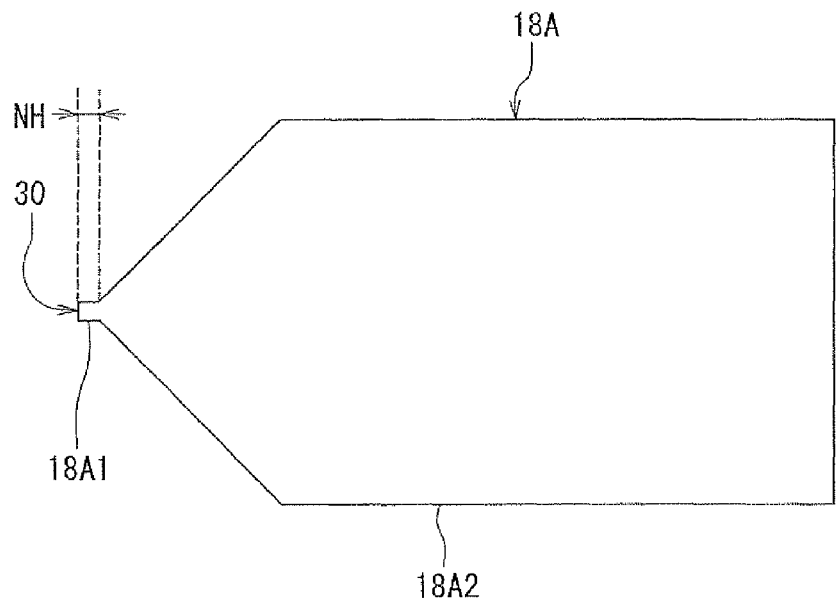
FIG. 3 is a top view of a pole layer of the magnetic head of the first embodiment of the invention.

Preferred embodiments of the invention will now be described in detail with reference to the accompanying drawings. Reference is now made to FIG. 1 to FIG. 3 to describe the configuration of a magnetic head for perpendicular magnetic recording of a first embodiment of the invention. FIG. 1 is a cross-sectional view for illustrating the configuration of the magnetic head of the embodiment. FIG. 1 illustrates a cross section orthogonal to the medium facing surface and the plane of a substrate. The arrow indicated with T in FIG. 1 shows the direction of travel of a recording medium. The arrow with T denotes the same in the other drawings, too. FIG. 2 is a front view of the medium facing surface of the magnetic head of the embodiment. FIG. 3 is a top view of a pole layer of the magnetic head of the embodiment.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The portions from the bottom shield layer 3 to the top shield layer 7 make up a read head. The magnetic head further comprises a nonmagnetic layer 8 made of a nonmagnetic material and disposed on the top shield layer 7, and a write head disposed on the nonmagnetic layer 8. The nonmagnetic layer 8 is made of alumina, for example.

The write head comprises a first coil 11, a second coil 23, a magnetic layer 18 for writing, a first magnetic layer 9 for flux concentration, a second magnetic layer 20 for flux concentration, and a gap layer 19. The first coil 11 and the second coil 23 each generate a magnetic field corresponding to data to be written on the recording medium.

The magnetic layer 18 for writing has an end face located in the medium facing surface 30. The magnetic layer 18 for writing allows a magnetic flux corresponding to the field generated by each of the coils 11 and 23 to pass therethrough and generates a write magnetic field for writing the data on the medium by means of the perpendicular magnetic recording system. The magnetic layer 18 for writing incorporates: a pole layer 18A having the end face located in the medium facing surface 30; and an upper yoke layer 18B connected to the pole layer 18A and disposed forward of the pole layer 18A along the direction T of travel of the recording medium at a location away from the medium facing surface 30.

The first magnetic layer 9 for flux concentration is disposed backward of the magnetic layer 18 for writing along the direction T of travel of the recording medium and connected to the pole layer 18A of the magnetic layer 18 at a location away from the medium facing surface 30. The first magnetic layer 9 for flux concentration allows a magnetic flux corresponding to the field generated by the first coil 11 to pass. The first magnetic layer 9 for flux concentration incorporates: a first layer 9A having an end face located in the medium facing surface 30; and a second layer 9B connected to the top surface of the first layer 9A at a location away from the medium facing surface 30. The top surface of the second layer 9B is connected to a region of the bottom surface of the pole layer 18A away from the medium facing surface 30.

The second magnetic layer 20 for flux concentration is disposed forward of the magnetic layer 18 for writing along the direction T of travel of the recording medium and connected to the upper yoke layer 18B of the magnetic layer 18 at a location away from the medium facing surface 30. The second magnetic layer 20 for flux concentration allows a magnetic flux corresponding to the field generated by the second coil 23 to pass. The second magnetic layer 20 for flux concentration incorporates: a first layer 20A having an end face located in the medium facing surface 30; and a second layer 20B having an end face located in the medium facing surface, the second layer 20B being connected to the top surface of the first layer 20A and also connected to a region of the top surface of the upper yoke layer 18B away from the medium facing surface 30.

Each of the layers making up the magnetic layers 9 and 20 is made of a magnetic material. The material may be any of CoFeN, CoNiFe, NiFe and CoFe, for example.

The magnetic head further comprises an insulating layer 10 made of an insulating material and disposed around the second layer 9B on the first layer 9A. The insulating layer 10 is made of alumina, for example. The first coil 11 is disposed on the insulating layer 10. The coil 11 is flat-whorl-shaped. The coil 11 is made of a conductive material such as copper. When seen in a direction orthogonal to the interface between the first magnetic layer 9 and the magnetic layer 18, that is, the interface S1 between the second layer 913 and the pole layer 18A, (seen from the top or bottom of FIG. 1), the coil 11 is wound around the interface S1.

The magnetic head further comprises: an insulating layer 12 made of an insulating material and disposed around the coil 11 and in the space between the respective adjacent turns of the coil 11; and an insulating layer 13 disposed around the insulating layer 12 and the second layer 9B. The second layer 9B, the coil 11, and the insulating layers 12 and 13 have flattened top surfaces. The insulating layer 12 is made of photoresist, for example. The insulating layer 13 is made of alumina, for example.

The magnetic head further comprises an encasing layer 14 made of a nonmagnetic material and disposed on the flattened top surfaces of the second layer 9B, the coil 11, and the insulating layers 12 and 13. The encasing layer 14 has a groove 14a that opens in the top surface thereof and that accommodates at least part of the pole layer 18A. The bottom of the groove 14a has a contact hole formed to a level of the top surface of the second layer 9B. The encasing layer 14 may be made of an insulating material such as alumina, silicon oxide ($SiO_x$), or silicon oxynitride (SiON), or a nonmagnetic metal material such as Ru, Ta, Mo, Ti, W, NiCu, NiB or NiP.

The magnetic head further comprises a nonmagnetic metal layer 15 made of a nonmagnetic metal material and disposed on the top surface of the encasing layer 14. The nonmagnetic metal layer 15 has an opening 15a that penetrates, and the edge of the opening 15a is located directly above the edge of the groove 14a in the top surface of the encasing layer 14. The nonmagnetic metal layer 15 may be made of any of Ta, Mo, W, Ti, Ru, Rh, Re, Pt, Pd, Ir, NiCr, NiP, NiB, AlCu, $WSi_2$, $TaSi_2$, $TiSi_2$, TiN, and TiW, for example.

The magnetic head further comprises a nonmagnetic film 16 and a polishing stopper layer 17 that are disposed in the groove 14a of the encasing layer 14 and in the opening 15a of the nonmagnetic metal layer 15. The nonmagnetic film 16 is disposed to touch the surface of the groove 14a. The pole layer 18A is disposed apart from the surface of the groove 14a. The polishing stopper layer 17 is disposed between the nonmagnetic film 16 and the pole layer 18A. The nonmagnetic film 16 and the polishing stopper layer 17 have contact holes, too, that are fanned to the level of the top surface of the second layer 9B. The pole layer 18A is thus connected to the second layer 9B through the contact holes formed in the groove 14a, the nonmagnetic film 16 and the polishing stopper layer 17.

As described above, the pole layer 18A is disposed in the groove 14a of the encasing layer 14 and in the opening 15a of the nonmagnetic metal layer 15 with the nonmagnetic film 16 and the polishing stopper layer 17 disposed between the pole layer 18A and each of the groove 14a and the opening 15a. The nonmagnetic film 16 has a thickness that falls within a range of 10 to 40 nm inclusive, for example. However, the thickness of the nonmagnetic film 16 is not limited to this range but may be of any other value, depending on the track width. The polishing stopper layer 17 has a thickness that falls within a range of 30 to 100 nm inclusive, for example.

The nonmagnetic film 16 is made of a nonmagnetic material. The material of the nonmagnetic film 16 may be an insulating material, a semiconductor material or a conductive material. The insulating material as the material of the nonmagnetic film 16 may be any of alumina, silicon oxide ($SiO_x$), and silicon oxynitride (SiON). The semiconductor material as the material of the nonmagnetic film 16 may be polycrystalline silicon or amorphous silicon. The conductive material as the material of the nonmagnetic film 16 may be the same as that of the nonmagnetic metal layer 15.

The polishing stopper layer 17 is made of a nonmagnetic material. The material of the polishing stopper layer 17 may be a nonmagnetic conductive material or an insulating material. The nonmagnetic conductive material as the material of the polishing stopper layer 17 may be the same as that of the nonmagnetic metal layer 15. The insulating material as the material of the polishing stopper layer 17 may be silicon oxide.

The pole layer 18A is made of a magnetic metal material. The pole layer 18A may be made of any of NiFe, CoNiFe and CoFe, for example.

The gap layer 19 is disposed on a region of the pole layer 18A near the medium facing surface 30. The gap layer 19 is made of a nonmagnetic material. The material of the gap layer 19 may be an insulating material such as alumina or a nonmagnetic conductive material such as Ru, NiCu, Ta, W, NiB or NiP.

The first layer 20A of the magnetic layer 20 for flux concentration is disposed on the gap layer 19. In the medium facing surface 30, the end face of the first layer 20A is located at a specific distance created by the thickness of the gap layer 19 from the end face of the pole layer 18A. The thickness of the gap layer 19 preferably falls within a range of 5 to 60 nm inclusive, and may fall within a range of 30 to 60 nm inclusive, for example. The end face of the pole layer 18A has a side adjacent to the gap layer 19, and this side defines the track width.

The first layer 20A may incorporate: a middle portion including a portion opposed to the pole layer 18A with the gap layer 19 disposed in between; and two side portions located outside the middle portion along the direction of track width. The maximum length of each of the side portions taken in the direction orthogonal to the medium facing surface 30 is greater than the length of the middle portion taken in the direction orthogonal to the medium facing surface 30.

The upper yoke layer 18B is disposed on a region of the pole layer 18A away from the medium facing surface 30 and connected to the pole layer 18A. The magnetic head further comprises a nonmagnetic layer 21 made of a nonmagnetic material and disposed around the first layer 20A and the upper yoke layer 18B. The nonmagnetic layer 21 is made of alumina, for example. The first layer 20A, the upper yoke layer 18B5 and the nonmagnetic layer 21 have flattened top surfaces.

The magnetic head further comprises an insulating layer 22 made of an insulating material and disposed on portions of the flattened top surfaces of the upper yoke layer 18B and the nonmagnetic layer 21. The insulating layer 22 is made of alumina, for example. The second coil 23 is disposed on the insulating layer 22. The coil 23 is flat-whorl-shaped. The coil 23 is made of a conductive material such as copper.

The magnetic head further comprises an insulating layer 24 made of an insulating material and disposed around the coil 23 and in the space between the respective adjacent turns of the coil 23. The insulating layer 24 is made of photoresist, for example. The second layer 20B is disposed to couple the first layer 20A to the upper yoke layer 18B. A portion of the second layer 20B is disposed on the insulating layer 24. When seen in the direction orthogonal to the interface between the second magnetic layer 20 and the magnetic layer 18, that is, the interface S2 between the second layer 20B and the upper yoke layer 18B, (seen from the top or bottom of FIG. 1), the coil 23 is wound around the interface S2. When seen in the direction orthogonal to the interface S2, the interface S2 is disposed at a location that is closer to the medium facing surface 30 than the interface S1 and that does not coincide with the interface S1.

Part of the coil 23 is disposed between the second layer 20B of the magnetic layer 20 and the yoke layer 18B of the magnetic layer 18.

The magnetic head further comprises a protection layer 25 made of a nonmagnetic material and disposed to cover the second layer 20B. The protection layer 25 is made of an inorganic insulating material such as alumina.

As described so far, the magnetic head of the embodiment comprises the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the first coil 11, the second coil 23, the magnetic layer 18 for writing, the first magnetic layer 9 for flux concentration, the second magnetic layer 20 for flux concentration, and the gap layer 19. The magnetic layer 18 for writing incorporates: the pole layer 18A having the end face located in the medium facing surface 30; and the upper yoke layer 18B connected to the pole layer 18A and disposed forward of the pole layer 18A along the direction T of travel of the recording medium at a location away from the medium facing surface 30.

The first magnetic layer 9 for flux concentration is disposed backward of the magnetic layer 18 for writing along the direction T of travel of the recording medium and connected to the pole layer 18A of the magnetic layer 18 at a location away from the medium facing surface 30. The first magnetic layer 9 allows a magnetic flux corresponding to the field generated by the first coil 11 to pass. The first magnetic layer 9 incorporates: the first layer 9A having the end face located in the medium facing surface 30; and the second layer 9B connected to a region of the top surface of the first layer 9A away from the medium facing surface 30. The magnetic layer 9 incorporates a portion located to sandwich part of the coil 11 between the magnetic layer 18 and itself, that is, the first layer 9A. The magnetic layer 9 and the second layer 9B thereof, in particular, have a function of allowing the magnetic flux corresponding to the field generated by the coil 11 to concentrate in the magnetic layer 9.

The second magnetic layer 20 for flux concentration is disposed forward of the magnetic layer 18 for writing along the direction T of travel of the recording medium and connected to the upper yoke layer 18B of the magnetic layer 18 at a location away from the medium facing surface 30. The second magnetic layer 20 allows a magnetic flux corresponding to the field generated by the second coil 23 to pass. The second magnetic layer 20 incorporates: the first layer 20A having the end face located in the medium facing surface 30; and the second layer 20B having the end face located in the medium facing surface 30, the second layer 20B being connected to the top surface of the first layer 20A and also connected to a region of the top surface of the upper yoke layer 18B away from the medium facing surface 30. Part of the coil 23 is disposed between the second layer 20B of the magnetic layer 20 and the upper yoke layer 18B of the magnetic layer 18. The magnetic layer 20 and a portion of the second layer 20B thereof located in the center portion of the coil 23, in particular, have a function of allowing the magnetic flux corresponding to the field generated by the coil 23 to concentrate in the magnetic layer 20.

When seen in the direction orthogonal to the interface S2 between the second layer 20B and the upper yoke layer 18B, the interface S2 is disposed at a location that is closer to the medium facing surface 30 than the interface S1 between the second layer 98 and the pole layer 18A and that does not coincide with the interface S1.

Reference is now made to FIG. 2 and FIG. 3 to describe the shape of the pole layer 18A in detail. As shown in FIG. 3, the pole layer 18A incorporates a track width defining portion 18A1 and a wide portion 18A2. The track width defining portion 18A1 has the end face located in the medium facing surface 30. The wide portion 18A2 is located farther from the medium facing surface 30 than the track width defining portion 18A1 and has a width greater than the width of the track width defining portion 18A1. The width of the track width defining portion 18A1 does not change in accordance with the distance from the medium facing surface 30. For example, the wide portion 18A2 is equal in width to the track width defining portion 18A1 at the boundary with the track width defining portion 18A1, and gradually increases in width as the distance from the medium facing surface 30 increases and then maintains a specific width to the end of the wide portion 18A2. In the embodiment the track width defining portion 18A1 is a portion of the pole layer 18A extending from the end face located in the medium facing surface 30 to the point at which the width of the pole layer 18A starts to increase. Here, the length of the track width defining portion 18A1 taken in the direction orthogonal to the medium facing surface 30 is called a neck height and indicated with NH. The neck height NH falls within a range of 0.05 to 0.3 µm inclusive, for example.

As shown in FIG. 2, the end face of the pole layer 18A located in the medium facing surface 30 has: a first side A1 closest to the substrate 1; a second side A2 adjacent to the gap layer 19; a third side A3 connecting an end of the first side A1 to an end of the second side A2; and a fourth side A4 connecting the other end of the first side A1 to the other end of the second side A2. The second side A2 defines the track width. The width of the end face of the pole layer 18A located in the medium facing surface 30 decreases as the distance from the gap layer 19 increases. Each of the third side A3 and the fourth side A4 forms an angle that falls within a range of 5 to 15 degrees inclusive, for example, with respect to the direction orthogonal to the top surface of the substrate 1. The length of the second side A2, that is, the track width, falls within a range of 0.05 to 0.20 µm inclusive, for example.

In the embodiment, as shown in FIG. 1, the throat height TH is the distance between the medium facing surface 30 and a point at which the space between the pole layer 18A and the magnetic layer 20 starts to increase when seen from the medium facing surface 30. The throat height TH falls within a range of 0.05 to 0.3 µm inclusive, for example.

Reference is now made to FIG. 4A to FIG. 10A and FIG. 4B to FIG. 10B to describe a method of manufacturing the magnetic head of the embodiment. FIG. 4A to FIG. 10A each illustrate a cross section of a layered structure obtained in manufacturing process of the magnetic head, the cross section being orthogonal to the medium facing surface and the substrate. FIG. 4B to FIG. 10B each illustrate a cross section of a portion of the layered structure near the medium facing surface, the cross section being parallel to the medium facing surface. The portions closer to the substrate 1 than the first layer 9A of the first magnetic layer 9 are omitted in FIG. 4A to FIG. 10A and FIG. 4B to FIG. 10B.

According to the method of manufacturing the magnetic head of the embodiment, as shown in FIG. 1, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7, the nonmagnetic layer 8 and the first layer 9A are formed one by one on the top shield gap film 6.

Figures 4A, 4B:
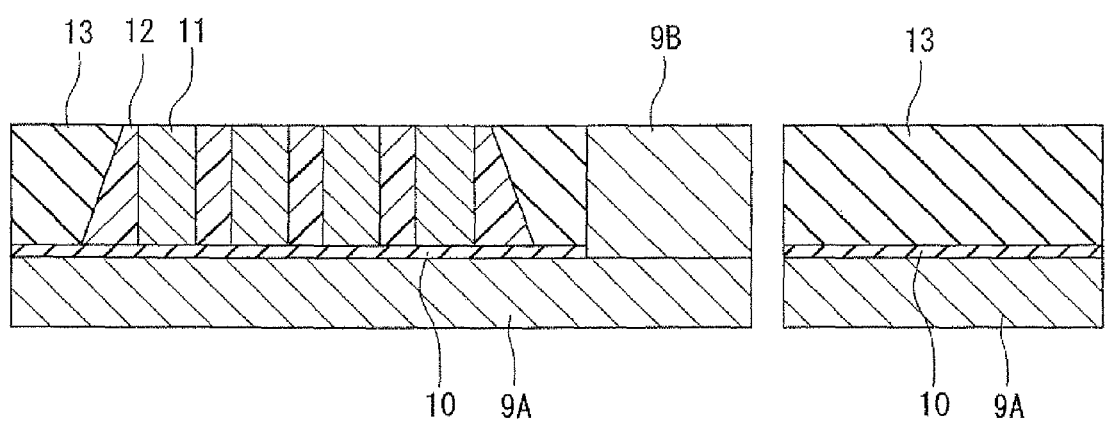
FIG. 4A and FIG. 4B are views for illustrating a step of a method of manufacturing the magnetic head of the first embodiment of the invention.

FIG. 4A and FIG. 4B illustrate the following step. In the step, first, the insulating layer 10 is selectively formed on a region of the top surfaces of the first layer 9A where the coil 11 is to be disposed. Next, the coil 11 is formed on the insulating layer 10 by frame plating, for example. Next, the second layer 9B is formed on the first layer 9A by frame plating, for example. Alternatively, the coil 11 may be formed after the second layer 9B is formed.

Next, the insulating layer 12 made of photoresist, for example, is selectively formed around the coil 11 and in the space between the respective adjacent turns of the coil 11. Next, the insulating layer 13 is formed by a method such as sputtering on the entire top surface of the layered structure. Next, the insulating layer 13 is polished by chemical mechanical polishing (hereinafter referred to as CMP), for example, so that the second layer 9B and the coil 11 are exposed, and the top surfaces of the second layer 9B, the coil 11, and the insulating layers 12 and 13 are thereby flattened.

FIG. 5A and FIG. 5B illustrate the following step. In the step, first, a nonmagnetic layer 14P is formed on the flattened top surfaces of the coil 11 and the insulating layers 12 and 13. The groove 14a will be formed in the nonmagnetic layer 14P later and the nonmagnetic layer 14P will be thereby formed into the encasing layer 14. Next, the nonmagnetic metal layer 15 made of a nonmagnetic metal material is formed by sputtering, for example, on the nonmagnetic layer 14P. The nonmagnetic metal layer 15 has a thickness that falls within a range of 20 to 100 nm inclusive, for example.

Next, a photoresist layer having a thickness of 1.0 µm, for example, is formed on the nonmagnetic metal layer 15. The photoresist layer is then patterned to form a mask 31 for making the groove 14a of the encasing layer 14. The mask 31 has an opening having a shape corresponding to the groove 14a.

Next, the nonmagnetic metal layer 15 is selectively etched using the mask 31. The opening 15a that penetrates is thereby formed in the nonmagnetic metal layer 15. The opening 15a has a shape corresponding to the plane geometry of the pole layer 18A to be formed later. Furthermore, a portion of the nonmagnetic layer 14P exposed from the opening 15a of the nonmagnetic metal layer 15 is selectively etched so as to form the groove 14a in the nonmagnetic layer 14P. Furthermore, a portion of the nonmagnetic layer 14P located on the second layer 9B is selectively etched so as to form a contact hole at the bottom of the groove 14a. The mask 31 is then removed. The nonmagnetic layer 14P is formed into the encasing layer 14 by being provided with the groove 14a. The edge of the opening 15a of the nonmagnetic metal layer 15 is located directly above the edge of the groove 14a located in the top surface of the encasing layer 14.

The etching of the nonmagnetic metal layer 15 and the nonmagnetic layer 14P is performed by reactive ion etching or ion beam etching, for example. The etching for forming the groove 14a in the nonmagnetic layer 14P is performed such that the walls of the groove 14a corresponding to both sides of the track width defining portion 18A1 of the pole layer 18A each form an angle that falls within a range of 5 to 15 degrees inclusive, for example, with respect to the direction orthogonal to the top surface of the substrate 1.

FIG. 6A and FIG. 68 illustrate the following step. In the step, first, the nonmagnetic film 16 is formed on the entire top surface of the layered structure. The nonmagnetic film 16 is formed in the groove 14a of the encasing layer 14, too. The nonmagnetic film 16 is formed by sputtering or chemical vapor deposition (hereinafter referred to as CVD), for example. It is possible to control the thickness of the nonmagnetic film 16 with precision. It is thereby possible to control the track width with accuracy. In the case of forming the nonmagnetic film 16 by CVD, it is preferred to employ a method called 'atomic layer CVD' (ALCVD) in which formation of a single atomic layer is repeated. In this case, it is possible to control the thickness of the nonmagnetic film 16 with higher precision. In the case of forming the nonmagnetic film 16 by ALCVD, the material of the nonmagnetic film 16 is preferably alumina among insulating materials, or Ta or Ru among conductive materials. If a semiconductor material is selected as the material of the nonmagnetic film 16, it is preferred to form the nonmagnetic film 16 by ALCVD at a low temperature (around 200° C.) or by low-pressure CVD at a low temperature. The semiconductor material as the material of the nonmagnetic film 16 is preferably undoped polycrystalline silicon or amorphous silicon.

Next, the polishing stopper layer 17 is formed on the entire top surface of the layered structure. The polishing stopper layer 17 is formed in the groove 14a of the encasing layer 14, too. The polishing stopper layer 17 indicates the level at which polishing of the polishing step to be performed later is stopped. If the nonmagnetic film 16 is made of a conductive material, it is possible to make the nonmagnetic film 16 function as the polishing stopper layer 17, too, without providing the polishing stopper layer 17.

If a nonmagnetic conductive material is selected as the material of the polishing stopper layer 17, the polishing stopper layer 17 is formed by sputtering or CVD, for example. In the case of forming the polishing stopper layer 17 by CVD, it is preferred to employ ALCVD. In the case of forming the polishing stopper layer 17 by ALCVD using a nonmagnetic conductive material, Ta or Ru is preferred as the material of the polishing stopper layer 17. The polishing stopper layer 17 formed by ALCVD exhibits a good step coverage. Therefore, it is possible to form the polishing stopper layer 17 that is uniform in the groove 14a of the encasing layer 14 by employing ALCVD to form the polishing stopper layer 17. It is thereby possible to control the track width with accuracy. In the case of forming the polishing stopper layer 17 by ALCVD, the nonmagnetic film 16 for controlling the track width may be omitted.

If the polishing stopper layer 17 is formed by ALCVD using a nonmagnetic conductive material, it is possible to reduce the resistance of the electrode layer (seed layer) used for forming the pole layer 18A by plating. It is thereby possible to form the pole layer 18A having a precise thickness.

Next, portions of the nonmagnetic film 16 and the polishing stopper layer 17 located on the second layer 9B are selectively etched to form the contact holes in the nonmagnetic film 16 and the polishing stopper layer 17.

FIG. 7A and FIG. 7B illustrate the following step. In the step, first, a magnetic layer not shown that will be the pole layer 18A later is fowled on the entire top surface of the layered structure. This magnetic layer is formed by the following method, for example. First, an electrode film not shown that is to be a portion of an electrode layer (seed layer) for plating is formed on the entire top surface of the layered structure. The electrode film is made of a magnetic material and will be a portion of the pole layer 18A later. The electrode film is formed by sputtering or ion beam deposition, for example. In the case of forming the electrode film by sputtering, it is preferred to employ collimation sputtering or long throw sputtering. Alternatively, the polishing stopper layer 17 may be used as the electrode layer (seed layer) for plating instead of forming the electrode film made of a magnetic material. Next, a plating layer is formed on the electrode film by frame plating, for example. The plating layer has a thickness of 0.5 to 1.0 µm, for example. The plating layer is made of a magnetic material and will be a major portion of the pole layer 18A later. The plating layer is formed such that the top surface thereof is located higher than the top surfaces of the nonmagnetic metal layer 15, the nonmagnetic film 16 and the polishing stopper layer 17. Next, a coating layer not shown made of alumina, for example, and having a thickness of 0.5 to 1.2 µm, for example, is formed by a method such as sputtering on the entire top surface of the layered structure. Next, the coating layer and the magnetic layer are polished by CMP, for example, so that the polishing stopper layer 17 is exposed, and the top surfaces of the polishing stopper layer 17 and the magnetic layer are thereby flattened. In the case of polishing the coating layer and the magnetic layer by CMP, such a slurry is used that polishing is stopped when the polishing stopper layer 17 is exposed, such as an alumina-base slurry.

FIG. 8A and FIG. 8B illustrate the following step. In the step, first, the gap layer 19 is formed on the entire top surface of the layered structure. The gap layer 19 is formed by sputtering or CVD, for example. In the case of forming the gap layer 19 by CVD, it is preferred to employ ALCVD. In the case of forming the gap layer 19 by ALCVD, the material of the gap layer 19 is preferably alumina among insulating materials, or Ta or Ru among conductive materials. Next, a photoresist layer is formed on the entire top surface of the layered structure. The photoresist layer is then patterned to form a mask not shown. The mask covers a portion of the gap layer 19 to be left. Next, the gap layer 19 is selectively etched using the mask. Next, the mask is removed.

Next, the first layer 20A is formed on the gap layer 19, and the upper yoke layer 18B is formed on the pole layer 18A. The first layer 20A and the upper yoke layer 18B may be formed by frame plating or by making a magnetic layer through sputtering and then selectively etching the magnetic layer. Selective etching of the magnetic layer may be performed by forming an alumina layer on the magnetic layer, making a mask on the alumina layer by frame plating, and etching the alumina layer and the magnetic layer using the mask.

Next, the nonmagnetic layer 21 is formed on the entire top surface of the layered structure. Next, the nonmagnetic layer 21 is polished by CMP, for example, so that the first layer 20A and the upper yoke layer 18B are exposed, and the top surfaces of the first layer 20A, the upper yoke layer 1813 and the nonmagnetic layer 21 are thereby flattened.

Figures 9A, 9B:
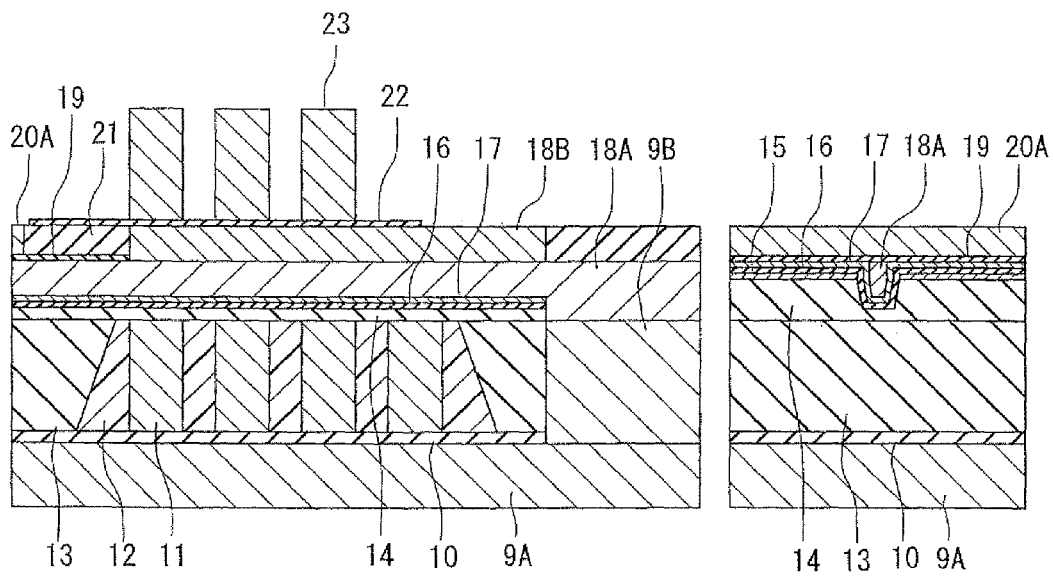
FIG. 9A and FIG. 9B are views for illustrating a step that follows the step shown in FIG. 8A and FIG. 8B.

FIG. 9A and FIG. 9B illustrate the following step. In the step, first, the insulating layer 22 is formed on regions of the top surfaces of the upper yoke layer 18B and the nonmagnetic layer 21 where the coil 23 is to be disposed. Next, the coil 23 is formed on the insulating layer 22 by frame plating, for example.

Figures 10A, 10B:
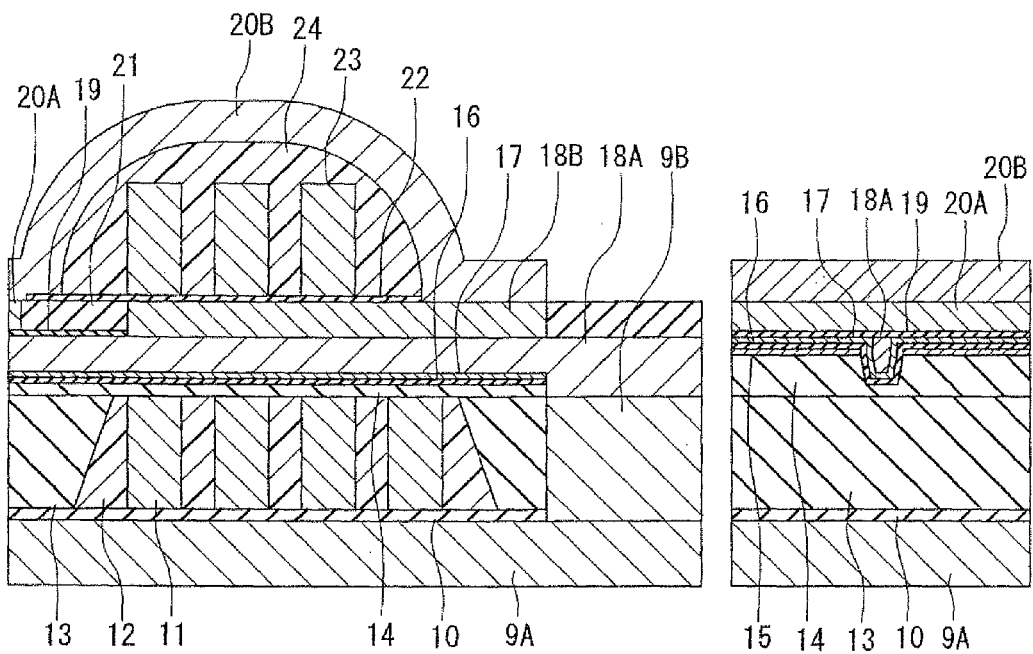
FIG. 10A and FIG. 10B are views for illustrating a step that follows the step shown in FIG. 9A and FIG. 9B.

FIG. 10A and FIG. 10B illustrate the following step. In the step, first, the insulating layer 24 is formed to cover the coil 23. Next, the second layer 20B is formed by frame plating, for example.

Next, as shown in FIG. 1, the protection layer 25 is formed to cover the entire top surface of the layered structure. Wiring and terminals are then formed on the protection layer 25, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coils 11 and 23 each generate a magnetic field that corresponds to the data to be written on the medium. A magnetic flux corresponding to the magnetic field generated by the coil 11 passes through the first magnetic layer 9 for flux concentration and the magnetic layer 18 for writing. A magnetic flux corresponding to the magnetic field generated by the coil 23 passes through the second magnetic layer 20 for flux concentration and the magnetic layer 18 for writing. Therefore, the magnetic layer 18 allows the flux corresponding to the field generated by the coil 11 and the flux corresponding to the field generated by the coil 23 to pass.

The coils 11 and 23 may be connected to each other either in series or parallel. In either case, the coils 11 and 23 are connected to each other in such a manner that, in the magnetic layer 18, the flux corresponding to the field generated by the coil 11 and the flux corresponding to the field generated by the coil 23 flow in the same direction. In FIG. 1 the arrows in the first magnetic layer 9, the magnetic layer 18 and the second magnetic layer 20 schematically show the directions in which the fluxes flow.

As described above, the magnetic layer 18 allows the flux corresponding to the field generated by each of the coils 11 and 23 to pass and generates from the end face of the pole layer 18A located in the medium facing surface 30 a write magnetic field used for writing the data on the recording medium by means of the perpendicular magnetic recording system.

The first magnetic layer 9 and the second magnetic layer 20 each function as a shield. That is, the magnetic layers 9 and 20 take in a disturbance magnetic field applied from outside the magnetic head to the magnetic head. It is thereby possible to prevent erroneous writing on the recording medium caused by the disturbance magnetic field intensively taken in into the pole layer 18A. Furthermore, the magnetic layers 9 and 20 have a function of taking in a magnetic flux that is generated from the end face of the pole layer 18A and that extends in directions except the direction orthogonal to the surface of the recording medium, and preventing this flux from reaching the recording medium. The magnetic layers 9 and 20 also have a function of returning a magnetic flux that has been generated from the end face of the pole layer 18A and has magnetized the recording medium.

The first magnetic layer 9 is located backward of the pole layer 18A along the direction T of travel of the recording medium. The second magnetic layer 20 is located forward of the pole layer 18A along the direction T of travel of the recording medium. Therefore, according to the embodiment, in regions both forward and backward of the end face of the pole layer 18A along the direction T of travel of the recording medium, it is possible to take in the magnetic flux generated from the end face of the pole layer 18A and extending in directions except the direction orthogonal to the surface of the recording medium, and to thereby prevent this flux from reaching the recording medium. As a result, according to the embodiment, over a wide range along the direction of track with, it is possible to suppress a phenomenon of attenuation of signals written on one or more tracks adjacent to the track that is a target of writing or reading.

According to the embodiment, the magnetic fluxes corresponding to the magnetic fields generated by the two coils 11 and 23 pass through the pole layer 18A. As a result, it is possible to make the number of turns of each of the coils 11 and 23 smaller than that of a single coil of a magnetic head in which the coil is the only one coil provided. It is thereby possible to reduce the resistance of each of the coils 11 and 23 and to thereby reduce the heat value of each of the coils 11 and 23. As a result, according to the embodiment, it is possible to suppress protrusion of a portion of the medium facing surface 30 due to the heat generated by the coils 11 and 23.

The location of an end of a bit pattern to be written on the recording medium is determined by the location of the end of the end face of the pole layer 18A located in the medium facing surface 30, the end being located forward along the direction T of travel of the recording medium. Therefore, to define the location of the end of the bit pattern precisely, it is important to take in a magnetic flux particularly at a location forward of the end face of the pole layer 18A along the direction T of travel of the recording medium, the flux being generated from the end face of the pole layer 18A and extending in directions except the direction orthogonal to the surface of the recording medium, so as to prevent the flux from reaching the recording medium. In the embodiment, the first layer 20A of the second magnetic layer 20 has an end face located in the medium facing surface 30. The end face of the first layer 20A is located forward of the end face of the pole layer 18A along the direction T of travel of the recording medium with a specific small space created by the thickness of the gap layer 19. As a result, particularly at a location forward of the end face of the pole layer 18A along the direction T of travel of the recording medium, it is possible to effectively take in the magnetic flux generated from the end face of the pole layer 18A and extending in directions except the direction orthogonal to the surface of the recording medium, and to thereby prevent the flux from reaching the recording medium. As a result, according to the embodiment, it is possible to precisely define the location of the end of the bit pattern to be written on the medium. According to the embodiment, an improvement in linear recording density is thereby achieved.

According to the embodiment, as shown in FIG. 2, the end face of the pole layer 18A located in the medium facing surface 30 has a width that decreases as the distance from the gap layer 19 increases. It is thereby possible to prevent the problems resulting from the skew.

According to the embodiment, the pole layer 18A is disposed in the groove 14a of the encasing layer 14 made of a nonmagnetic material, the nonmagnetic film 16 and the polishing stopper layer 17 being disposed between the pole layer 18A and the groove 14a. Consequently, the pole layer 18A is smaller than the groove 14a in width. It is thereby possible to easily form the groove 14a and to easily reduce the width of the pole layer 18A and the width of the top surface of the track width defining portion 18A1 that defines the track width, in particular. As a result, according to the embodiment, it is possible to easily implement the track width that is smaller than the minimum track width that can be formed by photolithography and to control the track width with accuracy.

Figure 11:
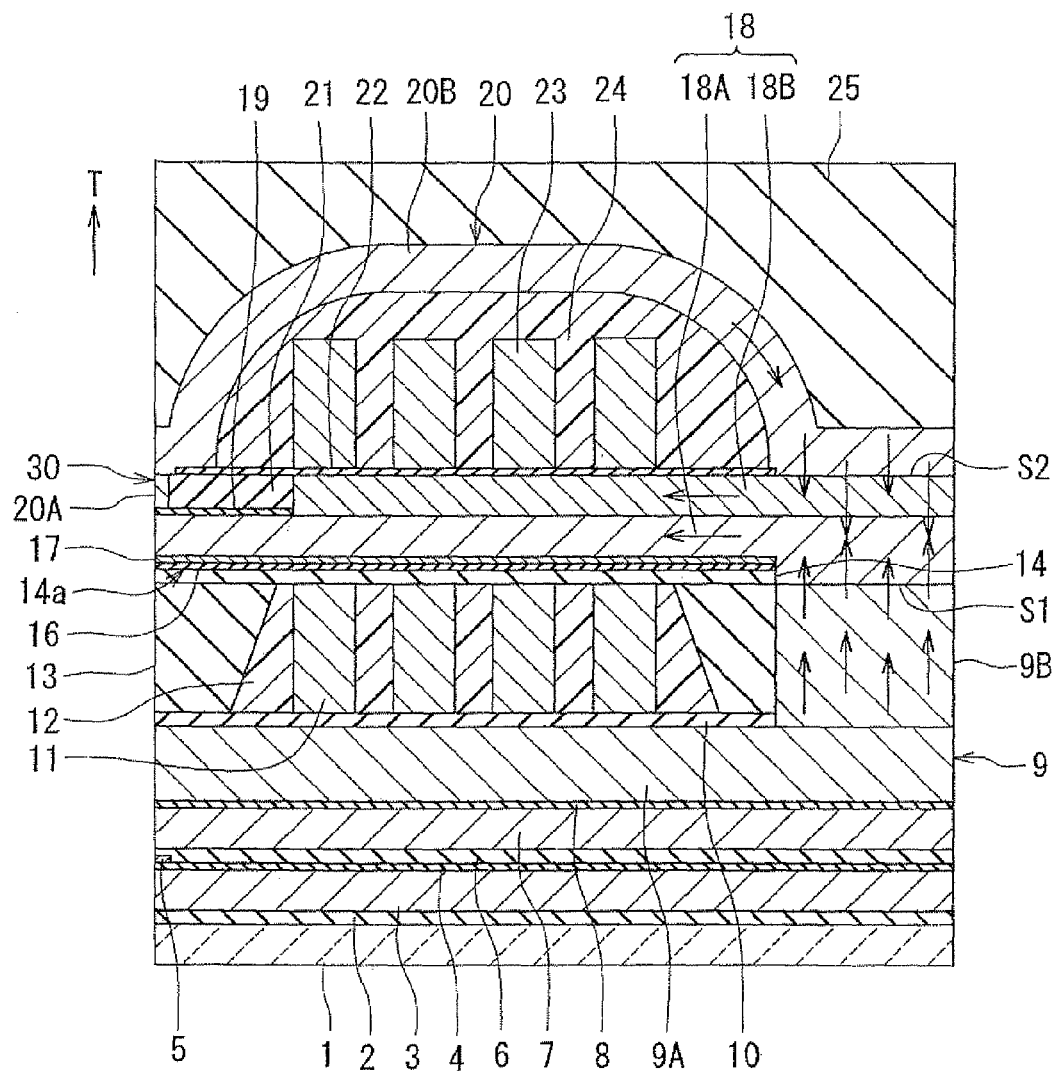
FIG. 11 is a cross-sectional view for illustrating the configuration of a reference magnetic head compared with the first embodiment of the invention.

Reference is now made to FIG. 11 to describe a reference magnetic head. FIG. 11 is a cross-sectional view for illustrating the configuration of the reference magnetic head. In the reference magnetic head, when seen in the direction orthogonal to the interface S2 between the second layer 20B and the upper yoke layer 18B, the interface S2 is located to coincide with the interface S1 between the second layer 9B and the pole layer 18A. The remainder of configuration of the reference magnetic head is the same as that of the magnetic head of the embodiment. In FIG. 11 the arrows in the first magnetic layer 9, the magnetic layer 18 and the second magnetic layer 20 schematically show the directions in which magnetic fluxes flow. In the reference magnetic head, in the region between the interfaces S1 and S2 in the magnetic layer 18, the flow of the magnetic flux that has come into the pole layer 18A from the second layer 9B and the flow of the magnetic flux that has come into the upper yoke layer 18B from the second layer 20B are nearly opposite in direction. As a result, in the magnetic layer 18 of the reference magnetic head, the flux that has come into the pole layer 18A from the second layer 9B and the flux that has come into the upper yoke layer 18B from the second layer 20B repel each other, and the flux density of the magnetic layer 18 may be thereby reduced, which may result in degradation of the overwrite property.

According to the embodiment, in contrast, when seen in the direction orthogonal to the interface S2 between the second layer 20B and the upper yoke layer 18B, the interface S2 is disposed at a location that is closer to the medium facing surface 30 than the interface S1 between the second layer 9B and the pole layer 18A and that does not coincide with the interface S1. As a result, in the embodiment, in a region of the magnetic layer 18 that coincides with the interface S2 when seen in the direction orthogonal to the interface S2, the flux that has come into the pole layer 18A from the second layer 9B flows in a nearly horizontal direction, which is not opposite to the direction of the flow of the flux that has come into the upper yoke layer 18B from the second layer 20B. Consequently, according to the embodiment, in the magnetic layer 18, it is possible to suppress repulsion between the flux that has come into the pole layer 18A from the second layer 9B and the flux that has come into the upper yoke layer 18B from the second layer 20B. It is thereby possible to prevent a reduction in flux density of the magnetic layer 18 and to thereby improve the overwrite property.

In the embodiment the interface S2 may be disposed at a location that is farther from the medium facing surface 30 than the interface S1 and that does not coincide with the interface S1. In this case, in the region of the magnetic layer 18 that coincides with the interface S1 when seen in the direction orthogonal to the interface S1, the flux that has come into the upper yoke layer 18B from the second layer 2013 flows in a nearly horizontal direction, which is not opposite to the direction of flow of the flux that has come into the pole layer 18A from the second layer 9B. Therefore, in this case, too, in the magnetic layer 18, it is possible to suppress repulsion between the flux that has come into the pole layer 18A from the second layer 9B and the flux that has come into the upper yoke layer 18B from the second layer 20B, and to thereby prevent a reduction in flux density of the magnetic layer 18. As a result, it is possible to improve the overwrite property.

In the embodiment, the end face of the first layer 9A closer to the medium facing surface 30 may be located at a distance from the medium facing surface 30.

In the embodiment, the second layer 20B may be directly connected to the pole layer 18A without providing the upper yoke layer 1813. In this case, it suffices that, when seen in the direction orthogonal to the interface between the second layer 20B and the pole layer 18A, this interface is disposed at a location that does not coincide with the interface S1 between the second layer 9B and the pole layer 18A.

Second Embodiment

Figure 12:
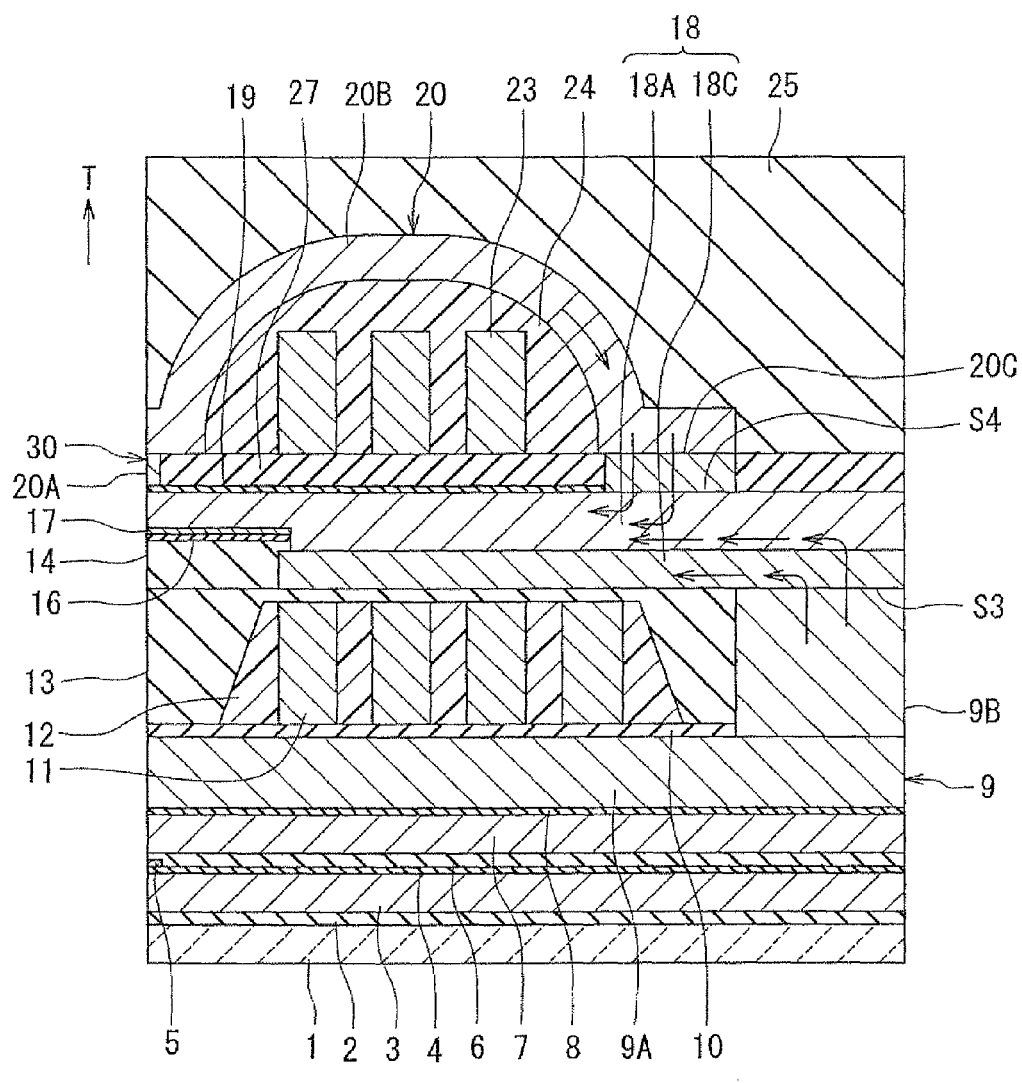
FIG. 12 is a cross-sectional view for illustrating the configuration of a magnetic head of a second embodiment of the invention.

Reference is now made to FIG. 12 to describe a magnetic head of a second embodiment of the invention. FIG. 12 is a cross-sectional view for illustrating the configuration of the magnetic head of the second embodiment. FIG. 12 illustrates a cross section orthogonal to the medium facing surface and the plane of the substrate.

In the magnetic head of the second embodiment, the insulating layer 13 is provided to cover the first coil 11 and the insulating layer 12. The insulating layer 13 and the second layer 9B have flattened top surfaces.

In the second embodiment a lower yoke layer 18C is provided in place of the upper yoke layer 18B of the first embodiment. The magnetic layer 18 for writing of the second embodiment incorporates the pole layer 18A and the lower yoke layer 18C. The lower yoke layer 18C is connected to the pole layer 18A and disposed backward of the pole layer 18A along the direction T of travel of the recording medium at a location away from the medium facing surface 30. The lower yoke layer 18C is disposed on the insulating layer 13 and the second layer 9B.

In the second embodiment the second magnetic layer 20 for flux concentration incorporates a third layer 20C in addition to the first layer 20A and the second layer 20B of the first embodiment. The third layer 20C is disposed forward of the pole layer 18A along the direction T of travel of the recording medium at a location away from the medium facing surface 30. The bottom surface of the third layer 20C is connected to the pole layer 18A. The top surface of the third layer 20C is connected to the second layer 20B.

In the second embodiment, an insulating layer 27 is provided in place of the nonmagnetic layer 21 of the first embodiment. The insulating layer 27 is disposed around the first layer 20A and the third layer 20C. The insulating layer 27 is made of alumina, for example. The first layer 20A, the third layer 20C and the insulating layer 27 have flattened top surfaces. In the second embodiment the second coil 23 and the insulating layer 24 are disposed on the insulating layer 27.

In the second embodiment, the second layer 9B of the first magnetic layer 9 is connected to the lower yoke layer 18C, and the third layer 20C of the second magnetic layer 20 is connected to the pole layer 18A. Each of the lower yoke layer 18C and the third layer 20C is made of a magnetic material. The material may be any of CoFeN, CoNiFe, NiFe and CoFe, for example.

In the second embodiment the interface between the magnetic layer 9 and the magnetic layer 18 is the interface S3 between the second layer 9B and the lower yoke layer 18C. When seen in the direction orthogonal to the interface S3, the coil 11 is wound around the interface S3.

In the second embodiment the interface between the second magnetic layer 20 and the magnetic layer 18 is the interface S4 between the third layer 20C and the pole layer 18A. When seen in the direction orthogonal to the interface S4, the coil 23 is wound around the interface S4. When seen in the direction orthogonal to the interface S4, the interface S4 is disposed at a location that is closer to the medium facing surface 30 than the interface S3 and that does not coincide with the interface S3.

The method of manufacturing the magnetic head of the second embodiment will now be described. In the method of manufacturing the magnetic head of the second embodiment, in the step illustrated in FIG. 4A and FIG. 4B, the coil 11 and the second layer 9B are formed such that the top surface of the coil 11 is located lower than the top surface of the second layer 9B (that is, located closer to the substrate 1).

In the following step of the second embodiment, the insulating layer 12 made of photoresist, for example, is selectively formed around the coil 11 and in the space between the respective adjacent turns of the coil 11. Next, the insulating layer 13 is formed on the entire top surface of the layered structure. Next, the insulating layer 13 is polished by CMP, for example, so that the second layer 9B is exposed, and the top surfaces of the second layer 9B and the insulating layer 13 are thereby flattened.

The following steps of the second embodiment are the same as the steps of the first embodiment illustrated in FIG. 5A to FIG. 10A and FIG. 5B to FIG. 10B, except differences that will now be described. First, in the second embodiment, in the step illustrated in FIG. 5A and FIG. 5B, the lower yoke layer 18C is formed before the nonmagnetic layer 14P is formed. The nonmagnetic layer 14P is then formed and the groove 14a is formed in a manner the same as that of the first embodiment. Next, a portion of the nonmagnetic layer 148 located on the lower yoke layer 18C is selectively etched to form an opening at the bottom of the groove 14a. In the second embodiment, in the step illustrated in FIG. 6A and FIG. 6B, portions of the nonmagnetic film 16 and the polishing stopper layer 17 located in the opening at the bottom of the groove 14a are selectively etched to form openings in the nonmagnetic film 16 and the polishing stopper layer 17. In the second embodiment, in the step illustrated in FIG. 8A and FIG. 8B, the third layer 20C is formed in place of the upper yoke layer 18B, and the insulating layer 27 is formed in place of the nonmagnetic layer 21. In the second embodiment, in the step illustrated in FIG. 9A and FIG. 9B, the coil 23 is formed on the insulating layer 27 without forming the insulating layer 22.

In FIG. 12 the arrows in the first magnetic layer 9, the magnetic layer 18 and the second magnetic layer 20 schematically show the directions in which magnetic fluxes flow. In the second embodiment, when seen in the direction orthogonal to the interface S4 between the third layer 20C and the pole layer 18A, the interface S4 is disposed at a location that is closer to the medium facing surface 30 than the interface S3 between the second layer 9B and the lower yoke layer 18C and that does not coincide with the interface S3. As a result, in the second embodiment, in a region of the magnetic layer 18 that coincides with the interface S4 when seen in the direction orthogonal to the interface S4, the flux that has come into the lower yoke layer 18C from the second layer 98 flows in a nearly horizontal direction, which is not opposite to the direction of flow of the flux that has come into the pole layer 18A from the third layer 20C. Consequently, according to the embodiment, in the magnetic layer 18, it is possible to suppress repulsion between the flux that has come into the lower yoke layer 18C from the second layer 9B and the flux that has come into the pole layer 18A from the third layer 20C. It is thereby possible to prevent a reduction in flux density of the magnetic layer 18 and to thereby improve the overwrite property.

In the second embodiment the interface S4 may be disposed at a location that is farther from the medium facing surface 30 than the interface S3 and that does not coincide with the interface S3. The remainder of configuration, function and effects of the second embodiment are similar to those of the first embodiment.

Third Embodiment

Figure 13:
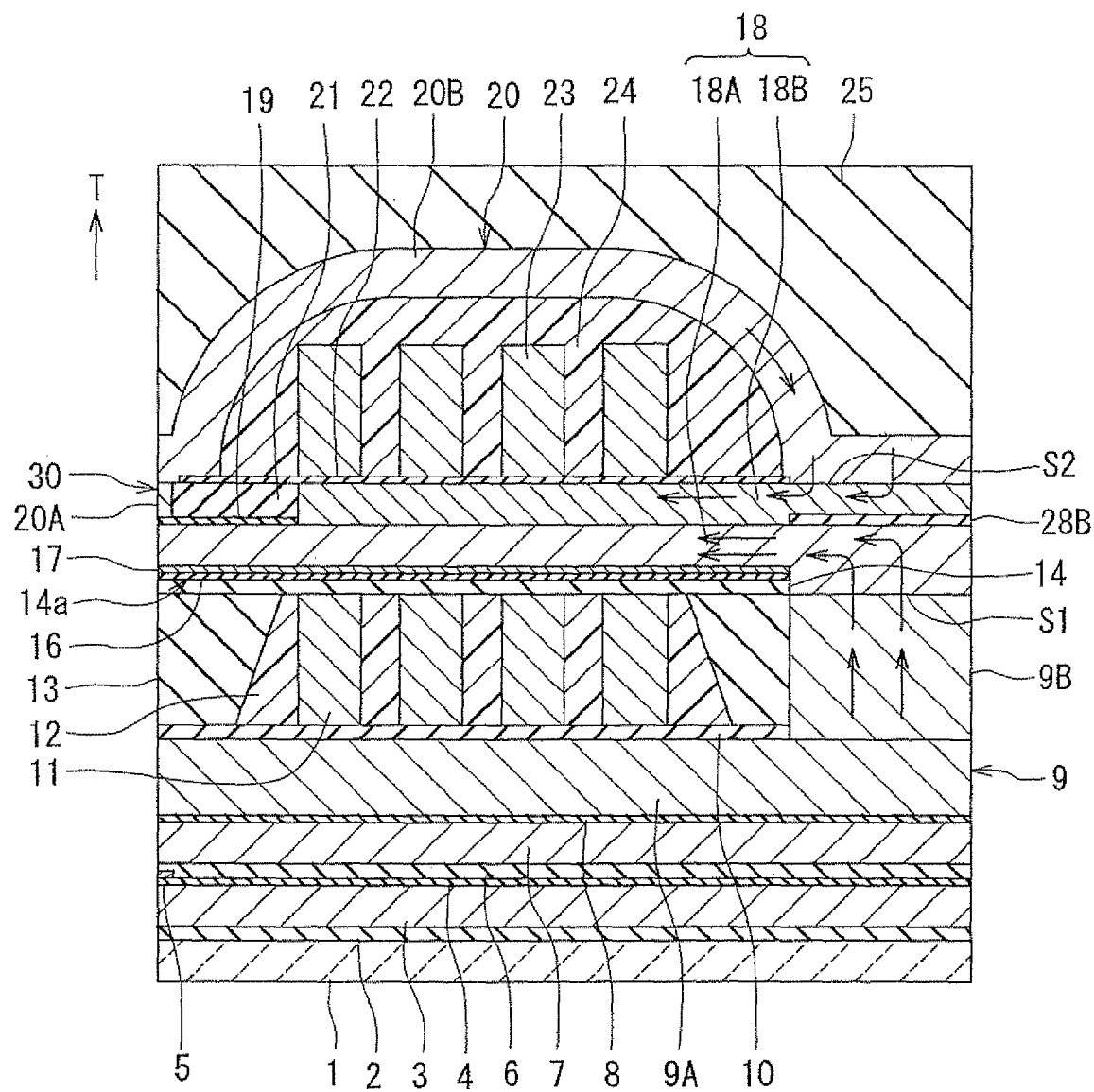
FIG. 13 is a cross-sectional view for illustrating an example of configuration of a magnetic head of a third embodiment of the invention.
Figure 14:
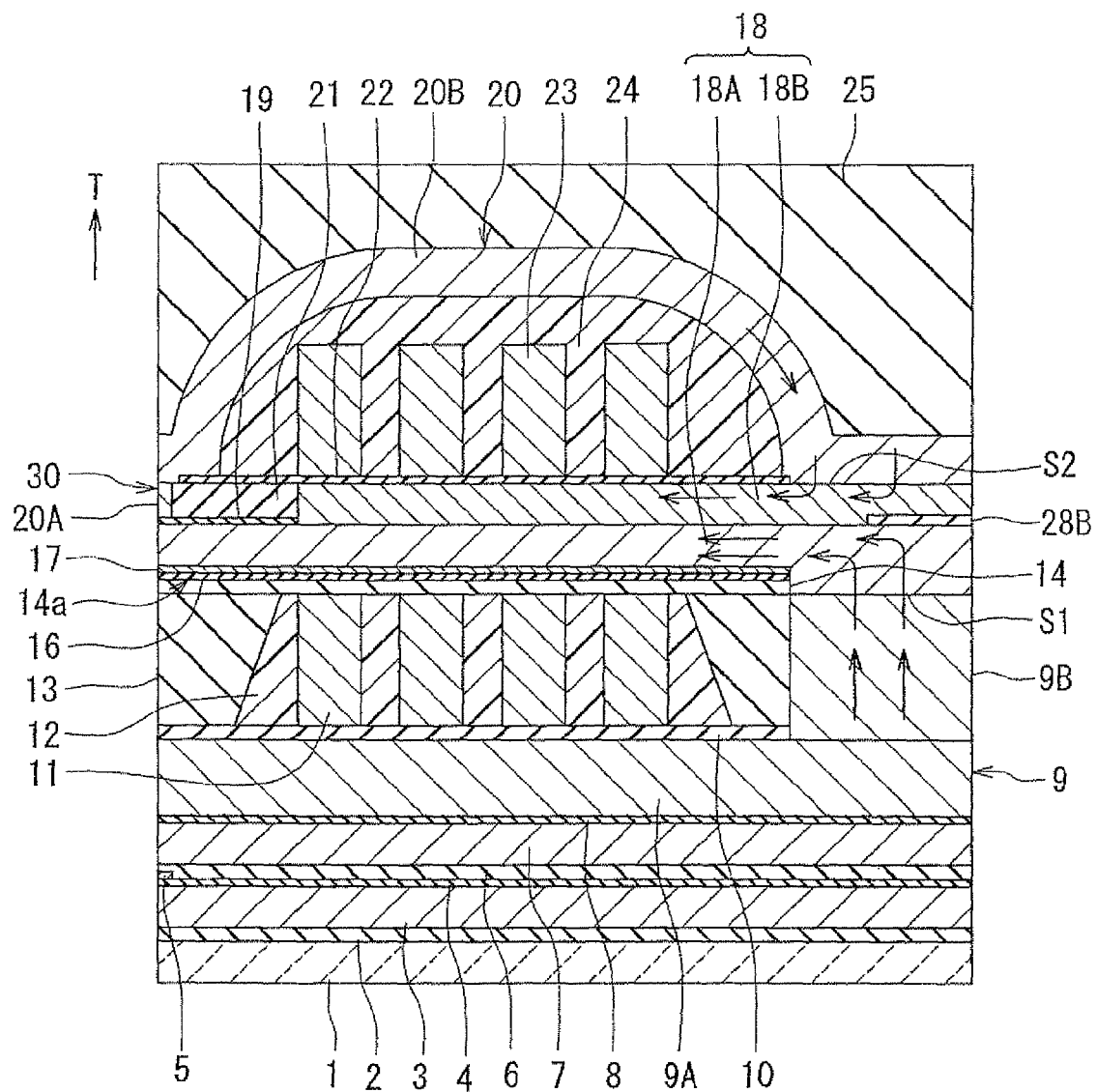
FIG. 14 is a cross-sectional view for illustrating another example of configuration of the magnetic head of the third embodiment of the invention.
Figure 15:
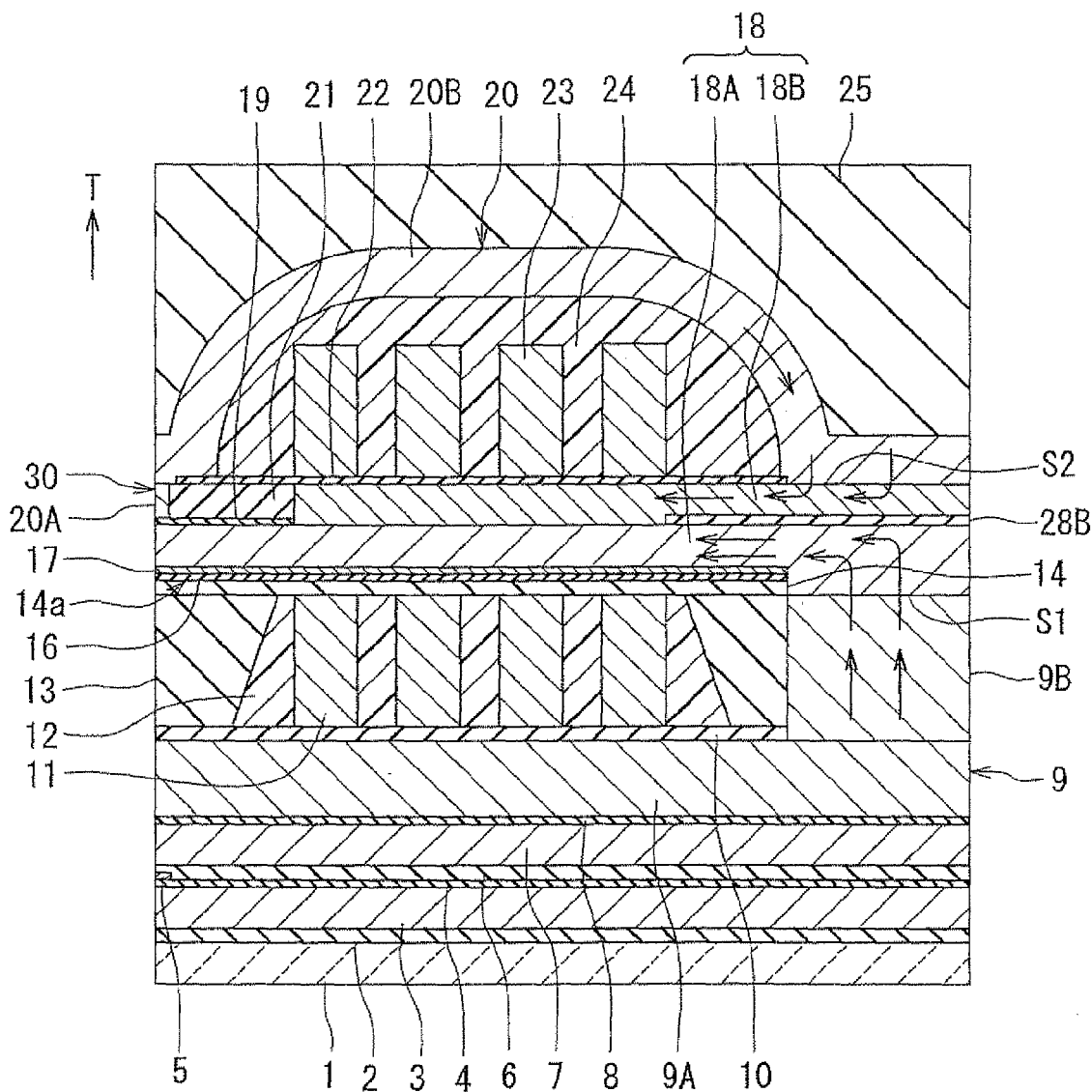
FIG. 15 is a cross-sectional view for illustrating still another example of configuration of the magnetic head of the third embodiment of the invention.

Reference is now made to FIG. 13 to FIG. 15 to describe a magnetic head of a third embodiment of the invention and a method of manufacturing the same. Each of FIG. 13 to FIG. 15 is a cross-sectional view for illustrating the configuration of the magnetic head of the third embodiment. Each of FIG. 13 to FIG. 15 illustrates a cross section orthogonal to the medium facing surface and the plane of the substrate.

The magnetic head of the third embodiment is similar to the magnetic head of the first embodiment but has differences as will now be described. In the magnetic head of the third embodiment, when seen in the direction orthogonal to the interface S2 between the second layer 20B and the upper yoke layer 18B, at least part of the interface S2 is disposed at a location that coincides with at least part of the interface S1 between the second layer 9B and the pole layer 18A. The magnetic head of the third embodiment has a nonmagnetic layer 28B made of a nonmagnetic material and disposed between the pole layer 18A and the upper yoke layer 18B. When seen in the direction orthogonal to the interface S2, at least part of the nonmagnetic layer 28B is disposed at a location that coincides with at least part of the interface S2. The upper yoke layer 18B is connected to the pole layer 18A at least at a location closer to the medium facing surface 30 than the nonmagnetic layer 28B. The nonmagnetic layer 28B may be made of a material the same as that of the gap layer 19. The nonmagnetic layer 288 has a thickness equal to or greater than that of the gap layer 19. The thickness of the nonmagnetic layer 28B preferably falls within a range of 0.1 to 0.3 inclusive.

In the embodiment, when seen in the direction orthogonal to the interface S2, at least part of the interface S2, at least part of the interface S1, and at least part of the nonmagnetic layer 28B are disposed at locations that coincide with one another.

The distance between the medium facing surface 30 and an end of the nonmagnetic layer 28B farther from the medium facing surface 30 is preferably equal to or greater than the distance between the medium facing surface 30 and an end of the interface S2 farther from the medium facing surface 30.

FIG. 13 to FIG. 15 illustrate three examples in which the locations of an end of the nonmagnetic layer 28B closer to the medium facing surface 30 are different. In the example of FIG. 13, the distance between the medium facing surface 30 and the end of the nonmagnetic layer 28B closer to the medium facing surface 30 is equal to the distance between the medium facing surface 30 and an end of the interface S2 closer to the medium facing surface 30. In the example of FIG. 14, the distance between the medium facing surface 30 and the end of the nonmagnetic layer 28B closer to the medium facing surface 30 is greater than the distance between the medium facing surface 30 and the end of the interface S2 closer to the medium facing surface 30. In the example of FIG. 15, the distance between the medium facing surface 30 and the end of the nonmagnetic layer 28B closer to the medium facing surface 30 is smaller than the distance between the medium facing surface 30 and the end of the interface S2 closer to the medium facing surface 30.

The method of manufacturing the magnetic head of the third embodiment includes the step of forming the nonmagnetic layer 28B on the pole layer 18A before forming the upper yoke layer 18B.

In FIG. 13 to FIG. 15 the arrows in the magnetic layer 9, the magnetic layer 18 and the magnetic layer 20 schematically show the directions in which magnetic fluxes flow. If the nonmagnetic layer 28B is not provided, a magnetic flux that has come into the pole layer 18A from the second layer 9B and a magnetic flux that has come into the upper yoke layer 18B from the second layer 20B repel each other in the magnetic layer 18, and the flux density of the magnetic layer 18 may be reduced, which may result in degradation of overwrite property. In the third embodiment, in contrast, the nonmagnetic layer 28B is provided between the pole layer 18A and the upper yoke layer 18B in a region where the interfaces S1 and S2 are opposed to each other. As a result, according to the embodiment, it is possible to suppress repulsion between the flux that has come into the pole layer 18A from the second layer 9B and the flux that has come into the upper yoke layer 18B from the second layer 20B in the magnetic layer 18. It is thereby possible to prevent a reduction in flux density of the magnetic layer 18 and to thereby improve the overwrite property.

The remainder of configuration, function and effects of the third embodiment are similar to those of the first embodiment.

Fourth Embodiment

Figure 16:
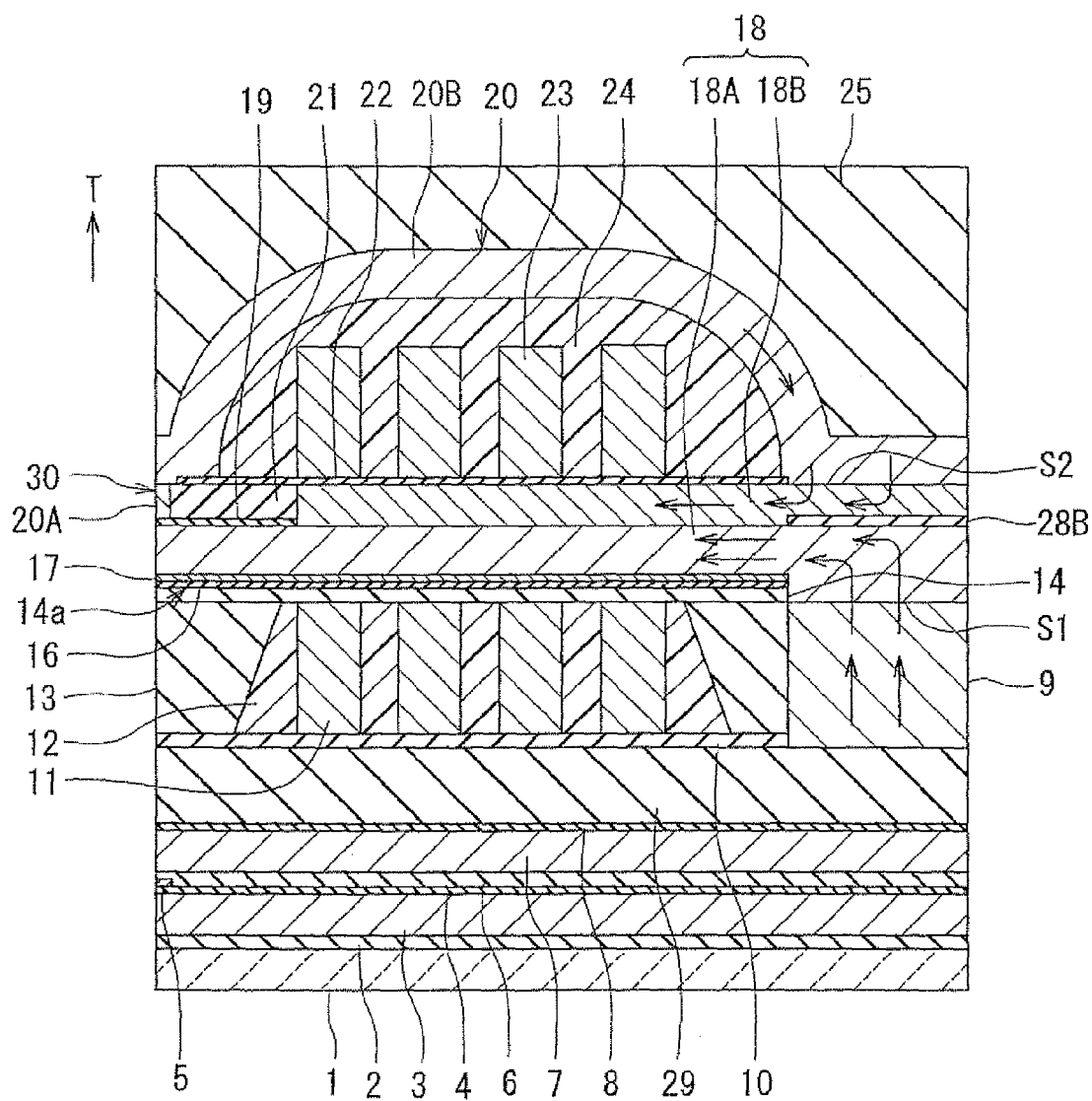
FIG. 16 is a cross-sectional view for illustrating the configuration of a magnetic head of a fourth embodiment of the invention.

Reference is now made to FIG. 16 to describe a magnetic head of a fourth embodiment of the invention. FIG. 16 is a cross-sectional view for illustrating the configuration of the magnetic head of the fourth embodiment. FIG. 16 illustrates a cross section orthogonal to the medium facing surface and the plane of the substrate.

In the magnetic head of the fourth embodiment, an insulating layer 29 is provided in place of the first layer 9A of the magnetic layer 9 for flux concentration of the third embodiment. The insulating layer 29 is made of alumina, for example. The magnetic layer 9 of the fourth embodiment is made up only of a magnetic layer that is an equivalent of the second layer 9B of the first embodiment. In this case, too, the magnetic layer 9 has a function of allowing a magnetic flux corresponding to the field generated by the coil 11 to concentrate in the magnetic layer 9. In FIG. 16 the arrows in the first magnetic layer 9, the magnetic layer 18 and the second magnetic layer 20 schematically show the directions in which the fluxes flow.

As does FIG. 13, FIG. 16 shows an example in which the distance between the medium facing surface 30 and the end of the nonmagnetic layer 28B closer to the medium facing surface 30 is equal to the distance between the medium facing surface 30 and the end of the interface S2 closer to the medium facing surface 30. However, in the fourth embodiment, as in the third embodiment, the distance between the medium facing surface 30 and the end of the nonmagnetic layer 28B closer to the medium facing surface 30 may be greater than the distance between the medium facing surface 30 and the end of the interface S2 closer to the medium facing surface 30 as shown in FIG. 14, or may be smaller than the distance between the medium facing surface 30 and the end of the interface S2 closer to the medium facing surface 30 as shown in FIG. 15.

The remainder of configuration, function and effects of the fourth embodiment are similar to those of the third embodiment.

Fifth Embodiment

Figure 17:
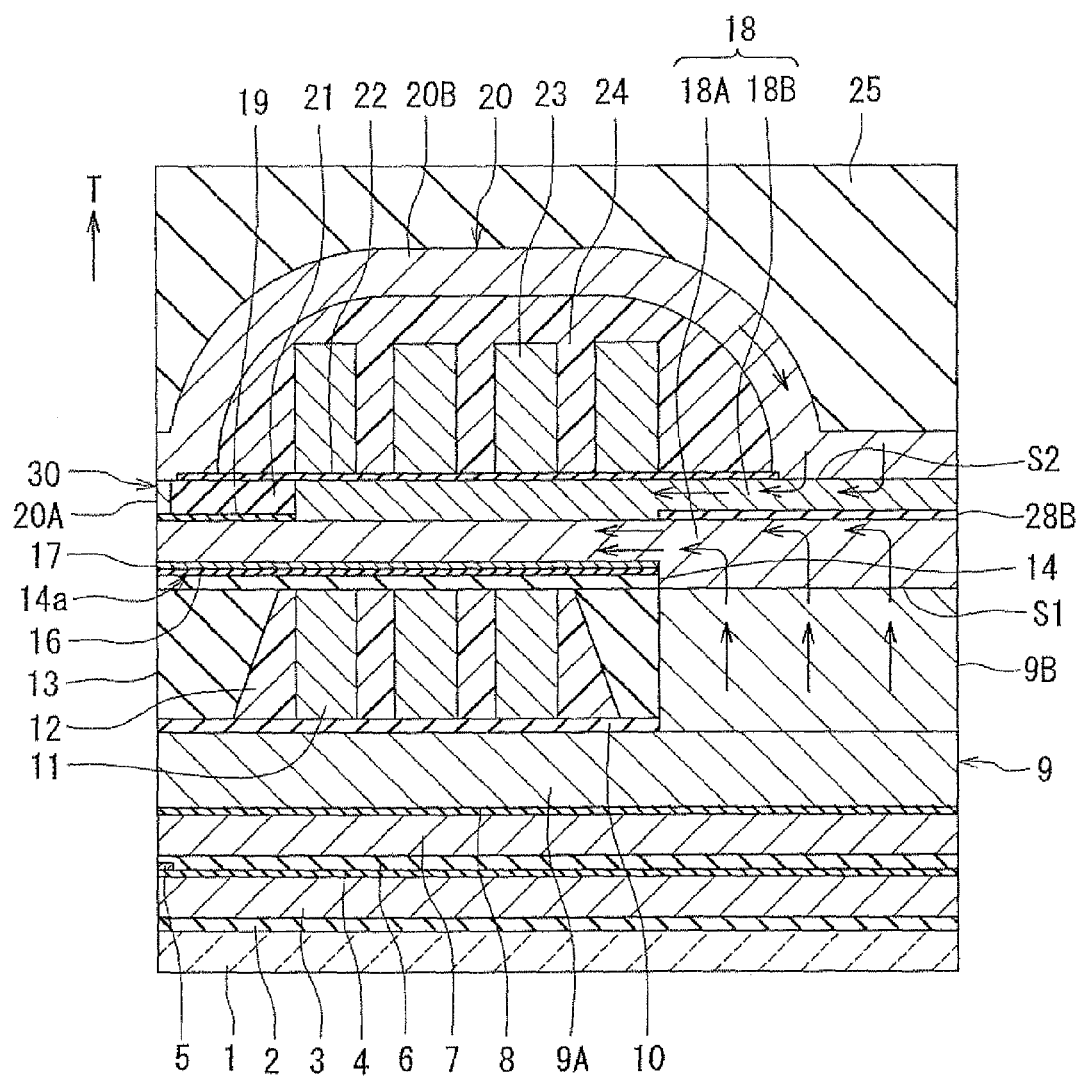
FIG. 17 is a cross-sectional view for illustrating the configuration of a magnetic head of a fifth embodiment of the invention.

Reference is now made to FIG. 17 to describe a magnetic head of a fifth embodiment of the invention. FIG. 17 is a cross-sectional view for illustrating the configuration of the magnetic head of the fifth embodiment. FIG. 17 illustrates a cross section orthogonal to the medium facing surface and the plane of the substrate.

The magnetic head of the fifth embodiment is similar to the magnetic head of the third embodiment but has differences as will now be described. In the fifth embodiment, the interface S1 has an area greater than that of the interface S2. When seen in the direction orthogonal to the interface S2, the interface S2 is located to coincide with only part of the interface S1. In addition, the distance between the medium facing surface 30 and the end of the interface S2 closer to the medium facing surface 30 is greater than the distance between the medium facing surface 30 and the end of the interface S1 closer to the medium facing surface 30. The nonmagnetic layer 28B is located in a region greater than the interface S2 when seen in the direction orthogonal to the interface S2. The nonmagnetic layer 28B is disposed at a location that coincides with the entire interface S2 when seen in the direction orthogonal to the interface S2 and that also coincides with the entire interface S1 when seen in the direction orthogonal to the interface S1. In FIG. 17 the arrows in the first magnetic layer 9, the magnetic layer 18 and the second magnetic layer 20 schematically show the directions in which magnetic fluxes flow.

In the fifth embodiment the area of the interface S2 may be greater than that of the interface S1, which is the opposite to the example of FIG. 17. In the fifth embodiment, it suffices that at least part of the interface S2, at least part of the interface S1, and at least part of the nonmagnetic layer 28B are disposed at locations that coincide with one another when seen in the direction orthogonal to the interface S2, as in the third embodiment. In the fifth embodiment, as in the fourth embodiment, the insulating layer 29 may be provided in place of the first layer 9A of the magnetic layer 9.

The remainder of configuration, function and effects of the fifth embodiment are similar to those of the third embodiment.

Sixth Embodiment

Figure 18:
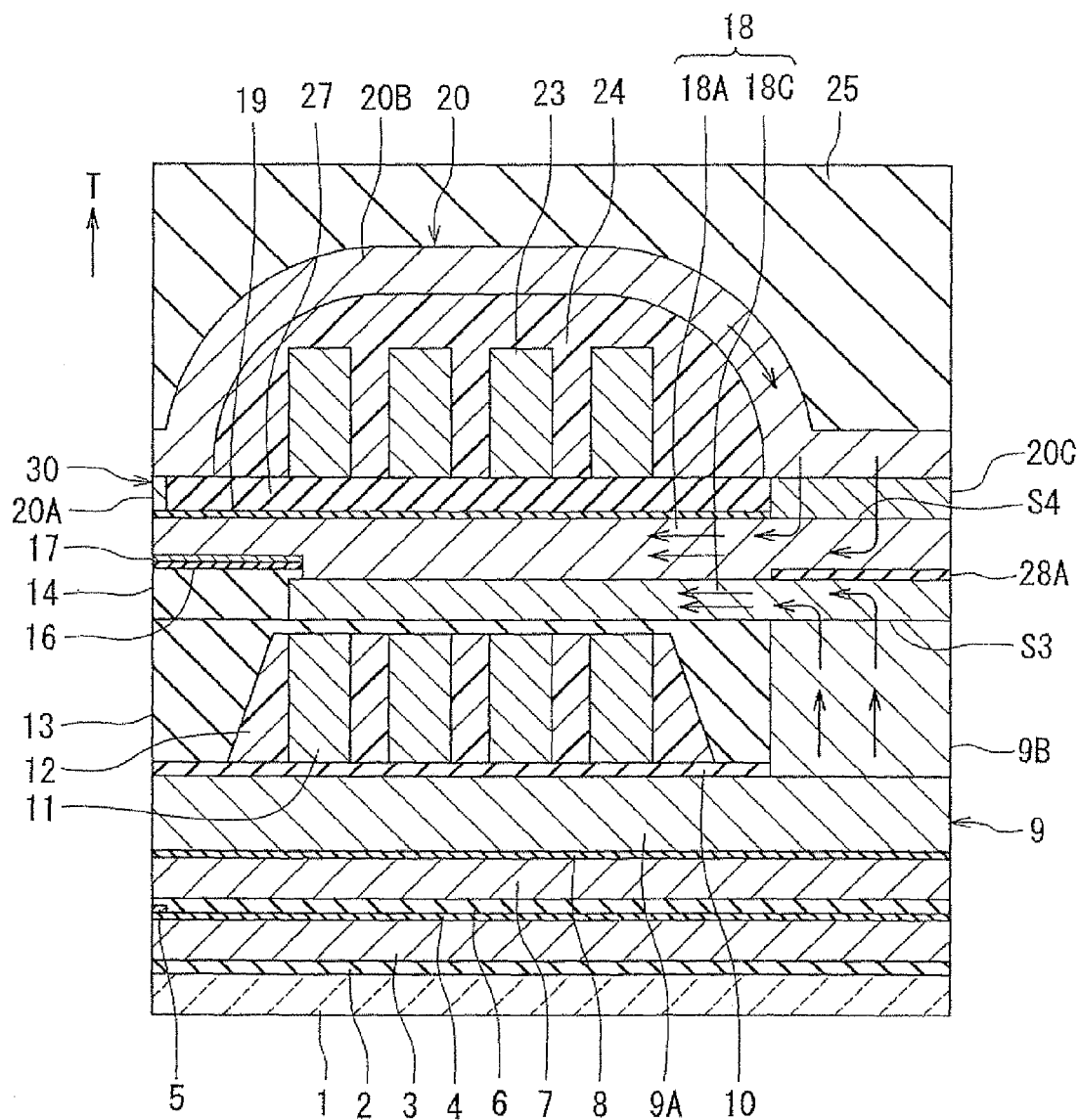
FIG. 18 is a cross-sectional view for illustrating the configuration of a magnetic head of a sixth embodiment of the invention.

Reference is now made to FIG. 18 to describe a magnetic head of a sixth embodiment of the invention. FIG. 18 is a cross-sectional view for illustrating the configuration of the magnetic head of the sixth embodiment. FIG. 18 illustrates a cross section orthogonal to the medium facing surface and the plane of the substrate.

The magnetic head of the sixth embodiment is similar to the magnetic head of the second embodiment but has differences as will now be described. In the magnetic head of the sixth embodiment, when seen in the direction orthogonal to the interface S3 between the second layer 9B and the lower yoke layer 18C, at least part of the interface S3 is disposed at a location that coincides with at least part of the interface S4 between the third layer 20C and the pole layer 18A. The magnetic head of the sixth embodiment has a nonmagnetic layer 28A made of a nonmagnetic material and disposed between the pole layer 18A and the lower yoke layer 18C. When seen in the direction orthogonal to the interface S3, at least part of the nonmagnetic layer 28A is disposed at a location that coincides with at least part of the interface S3. The lower yoke layer 18C is connected to the pole layer 18A at least at a location closer to the medium facing surface 30 than the nonmagnetic layer 28A. The material and thickness of the nonmagnetic layer 28A may be the same as those of the nonmagnetic layer 28B of the third embodiment.

In the embodiment, when seen in the direction orthogonal to the interface S3, at least part of the interface S3, at least part of the interface S4, and at least part of the nonmagnetic layer 28A are disposed in regions that coincide with one another.

The distance between the medium facing surface 30 and an end of the nonmagnetic layer 28A farther from the medium facing surface 30 is preferably equal to or greater than the distance between the medium facing surface 30 and an end of the interface S3 farther from the medium facing surface 30.

The method of manufacturing the magnetic head of the sixth embodiment includes the step of forming the nonmagnetic layer 28A on the lower yoke layer 18C before forming the pole layer 18A.

In FIG. 18 the arrows in the magnetic layer 9, the magnetic layer 18 and the magnetic layer 20 schematically show the directions in which magnetic fluxes flow. If the nonmagnetic layer 28A is not provided, a magnetic flux that has come into the lower yoke layer 18C from the second layer 9B and a magnetic flux that has come into the pole layer 18A from the third layer 20C repel each other in the magnetic layer 18, and the flux density of the magnetic layer 18 may be reduced, which may result in degradation of overwrite property. In the sixth embodiment, in contrast, the nonmagnetic layer 28A is provided between the pole layer 18A and the lower yoke layer 18C in a region where the interfaces S3 and S4 are opposed to each other. As a result, according to the embodiment, it is possible to suppress repulsion between the flux that has come into the lower yoke layer 18C from the second layer 9B and the flux that has come into the pole layer 18A from the third layer 20C in the magnetic layer 18. It is thereby possible to prevent a reduction in flux density of the magnetic layer 18 and to thereby improve the overwrite property.

FIG. 18 illustrates an example in which the distance between the medium facing surface 30 and the end of the nonmagnetic layer 28A closer to the medium facing surface 30 is equal to the distance between the medium facing surface 30 and an end of the interface S3 closer to the medium facing surface 30. However, as in the third embodiment, the distance between the medium facing surface 30 and the end of the nonmagnetic layer 28A closer to the medium facing surface 30 may be greater than the distance between the medium facing surface 30 and the end of the interface S3 closer to the medium facing surface 30, or may be smaller than the distance between the medium facing surface 30 and the end of the interface S3 closer to the medium facing surface 30.

In the sixth embodiment the insulating layer 29 may be provided in place of the first layer 9A of the magnetic layer 9 as in the fourth embodiment. In the sixth embodiment the areas of the interfaces S1 and S2 may be different from each other as in the fifth embodiment.

The remainder of configuration, function and effects of the sixth embodiment are similar to those of the second embodiment.

Seventh Embodiment

Figure 19:
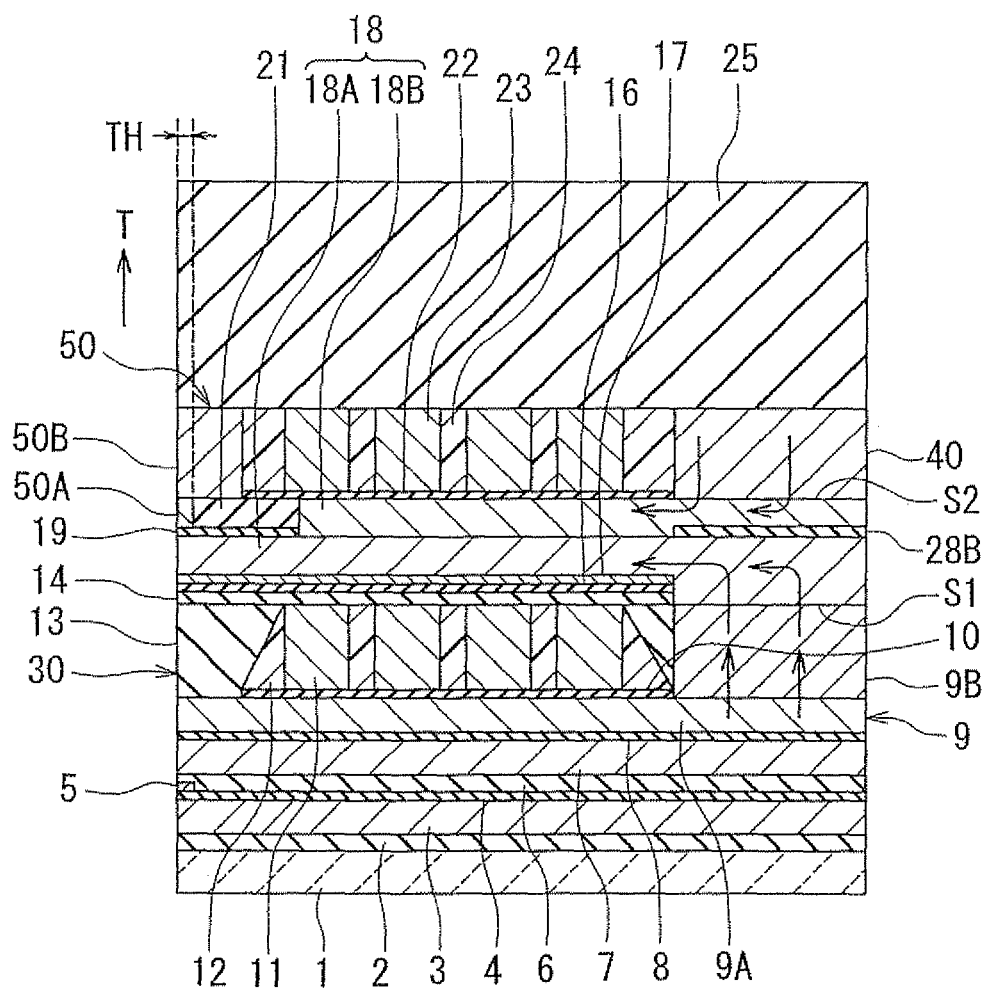
FIG. 19 is a cross-sectional view for illustrating the configuration of a magnetic head of a seventh embodiment of the invention.

Reference is now made to FIG. 19 to describe a magnetic head of a seventh embodiment of the invention and a method of manufacturing the same. FIG. 19 is a cross-sectional view for illustrating the configuration of the magnetic head of the seventh embodiment. FIG. 19 illustrates a cross section orthogonal to the medium facing surface and the plane of the substrate.

The magnetic head of the seventh embodiment is similar to the magnetic head of the third embodiment but has differences as will now be described. In the magnetic head of the seventh embodiment, a second magnetic layer 40 for flux concentration and a shield layer 50 are provided in place of the second magnetic layer 20 for flux concentration of the third embodiment.

The magnetic layer 40 for flux concentration is disposed forward of the upper yoke layer 18B of the magnetic layer 18 for writing along the direction T of travel of the recording medium at a location away from the medium facing surface 30 and is connected to the upper yoke layer 18B. The second coil 23 is wound around the magnetic layer 40. The magnetic layer 40 allows a magnetic flux corresponding to the field generated by the second coil 23 to pass. The magnetic layer 40 has a function of allowing a magnetic flux corresponding to the field generated by the coil 23 to concentrate in the magnetic layer 40.

The shield layer 50 incorporates a first layer 50A and a second layer 50B. The first layer 50A is disposed on the gap layer 19. The first layer 50A has an end face located in the medium facing surface 30. In the medium facing surface 30 the end face of the first layer 50A is located at a specific distance created by the thickness of the gap layer 19 from the end face of the pole layer 18A. The first layer 50A may incorporate: a middle portion including a portion opposed to the pole layer 18A with the gap layer 19 disposed in between; and two side portions disposed outside the middle portion along the direction of track width. The maximum length of each of the side portions taken in the direction orthogonal to the medium facing surface 30 is greater than the length of the middle portion taken in the direction orthogonal to the medium facing surface 30.

The second layer 50B is disposed on the first layer 50A and connected thereto. The second layer 50B has an end face located in the medium facing surface 30. In a cross section that passes the track width defining portion 18A1 of the pole layer 18A and is orthogonal to the medium facing surface 30 and the plane of the substrate 1, the length of the second layer 50B taken in the direction orthogonal to the medium facing surface 30 is greater than the length of the first layer 50A taken in the direction orthogonal to the medium facing surface 30. In the seventh embodiment, as shown in FIG. 19, the throat height TH is the distance from the medium facing surface 30 to the point at which the space between the pole layer 18A and the shield layer 50 starts to increase when seen from the medium facing surface 30.

The coil 23, the insulating layer 24, the magnetic layer 40 and the second layer 50B have flattened top surfaces. The protection layer 25 is disposed on these flattened top surfaces. Therefore, the magnetic layer 40 is not connected to the shield layer 50. The shield layer 50 takes in a disturbance magnetic field applied to the magnetic head from outside the magnetic head. As a result, it is possible to prevent erroneous writing on the recording medium caused by the disturbance magnetic field intensively taken in into the pole layer 18A. Furthermore, the shield layer 50 has a function of taking in a magnetic flux generated from the end face of the pole layer 18A and extending in directions except the direction orthogonal to the surface of the recording medium, and preventing this flux from reaching the recording medium.

Each layer making up the magnetic layer 40 and the shield layer 50 is made of a magnetic material. The material may be any of CoFeN, CoNiFe, NiFe and CoFe, for example.

When seen in a direction orthogonal to the interface between the magnetic layer 40 and the magnetic layer 18, that is, the interface S2 between the magnetic layer 40 and the upper yoke layer 18B, (seen from the top or bottom of FIG. 19), the coil 23 is wound around the interface S2. When seen in a direction orthogonal to the interface S2, at least part of the interface S2 is disposed at a location that coincides with at least part of the interface S1 between the second layer 9B and the pole layer 18A.

As in the third embodiment, the magnetic head of the seventh embodiment has the nonmagnetic layer 28B disposed between the pole layer 18A and the upper yoke layer 18B. When seen in the direction orthogonal to the interface S2, at least part of the nonmagnetic layer 28B is disposed at a location that coincides with at least part of the interface S2. The upper yoke layer 18B is connected to the pole layer 18A at least at a location closer to the medium facing surface 30 than the nonmagnetic layer 28B. When seen in the direction orthogonal to the interface S2, at least part of the interface S2, at least part of the interface S1, and at least part of the nonmagnetic layer 28B are disposed at locations that coincide with one another.

The distance between the medium facing surface 30 and the end of the nonmagnetic layer 28B farther from the medium facing surface 30 is preferably equal to or greater than the distance between the medium facing surface 30 and the end of the interface S2 farther from the medium facing surface 30.

As does FIG. 13, FIG. 19 shows an example in which the distance between the medium facing surface 30 and the end of the nonmagnetic layer 28B closer to the medium facing surface 30 is equal to the distance between the medium facing surface 30 and the end of the interface S2 closer to the medium facing surface 30. However, in the seventh embodiment, as in the third embodiment, the distance between the medium facing surface 30 and the end of the nonmagnetic layer 28B closer to the medium facing surface 30 may be greater than the distance between the medium facing surface 30 and the end of the interface S2 closer to the medium facing surface 30 as shown in FIG. 14, or may be smaller than the distance between the medium facing surface 30 and the end of the interface S2 closer to the medium facing surface 30 as shown in FIG. 15.

The method of manufacturing the magnetic head of the seventh embodiment includes the steps up to the step of forming the coil 23 and the insulating layer 24 that are the same as those of the first embodiment. In the seventh embodiment, however, the first layer 50A of the shield layer 50 is formed in place of the first layer 20A of the magnetic layer 20 for flux concentration of the first embodiment.

In the seventh embodiment, after the coil 23 and the insulating layer 24 are formed, the second layer 50B are formed on the first layer 50A and the nonmagnetic layer 21, and the second magnetic layer 40 is formed on the upper yoke layer 18B. Next, a coating layer not shown made of alumina, for example, is formed on the entire top surface of the layered structure. Next, the coating layer is polished by CMP, for example, so that the coil 23, the second layer 50B and the magnetic layer 40 are exposed, and the top surfaces of the coil 23, the insulating layer 24, the second layer 50B, the magnetic layer 40 and the coating layer are thereby flattened. Next, the protection layer 25 is formed to cover the entire top surface of the layered structure. Wiring and terminals are then formed on the protection layer 25, the substrate is cut into sliders, and the steps including polishing of the medium facing surface 30 and fabrication of flying rails are performed. The magnetic head is thus completed.

Figure 20:
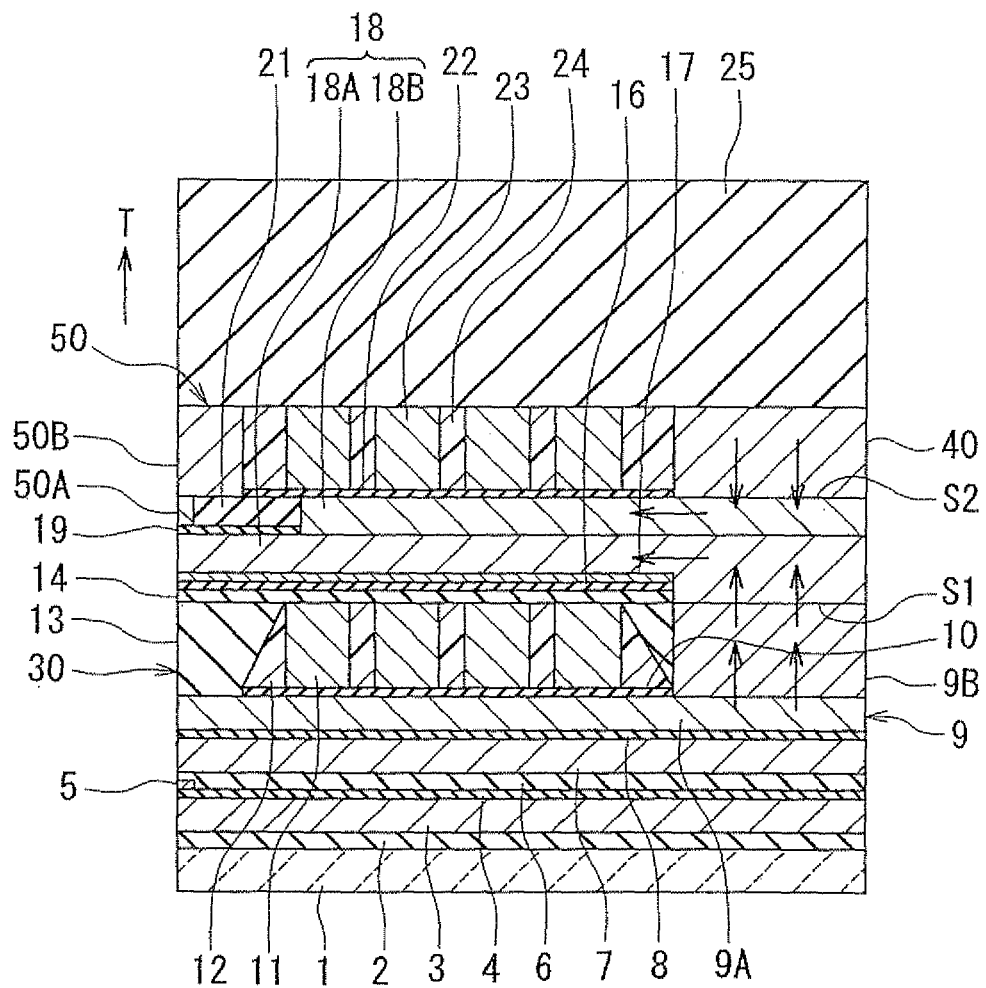
FIG. 20 is a cross-sectional view for illustrating the configuration of a reference magnetic head compared with the seventh embodiment of the invention.

Reference is now made to FIG. 20 to describe a reference magnetic head. FIG. 20 is a cross-sectional view for illustrating the configuration of the reference magnetic head. FIG. 20 illustrates a cross section orthogonal to the medium facing surface and the plane of the substrate. The configuration of the reference magnetic head is similar to that of the magnetic head of the seventh embodiment except that the reference magnetic head does not have the nonmagnetic layer 28B. No magnetic layer is provided to connect the magnetic layer 40 and the shield layer 50 to each other in either the reference magnetic head or the magnetic head of the embodiment. If a magnetic layer for connecting the magnetic layer 40 and the shield layer 50 to each other is provided, this magnetic layer is likely to expand by receiving the heat generated by the coil 23, so that the end face of the shield layer 50 located in the medium facing surface 30 (the end face of the first layer 50A and the end face of the second layer 50B) is likely to protrude. In contrast, since no magnetic layer for connecting the magnetic layer 40 and the shield layer 50 to each other is provided in either the reference magnetic head or the magnetic head of the embodiment, it is possible to suppress protrusion of the end face of the shield layer 50 resulting from the heat generated by the coil 23.

In FIG. 19 and FIG. 20 the arrows in the first magnetic layer 9, the magnetic layer 18 and the second magnetic layer 40 schematically show the directions in which magnetic fluxes flow. In the reference magnetic head, since the nonmagnetic layer 28B is not provided as shown in FIG. 20, a magnetic flux that has come into the pole layer 18A from the second layer 9B and a magnetic flux that has come into the upper yoke layer 18B from the magnetic layer 40 repel each other in the magnetic layer 18, and the flux density of the magnetic layer 18 may be reduced, which may result in degradation of overwrite property. In the seventh embodiment, in contrast, the nonmagnetic layer 28B is provided between the pole layer 18A and the upper yoke layer 18B in the region where the interfaces S1 and S2 are opposed to each other, as shown in FIG. 19. As a result, according to the embodiment, it is possible to suppress repulsion between the flux that has come into the pole layer 18A from the second layer 9B and the flux that has come into the upper yoke layer 18B from the magnetic layer 40 in the magnetic layer 18. It is thereby possible to prevent a reduction in flux density of the magnetic layer 18 and to thereby improve the overwrite property.

The remainder of configuration, function and effects of the seventh embodiment are similar to those of the third embodiment.

Modification Example

Figure 21:
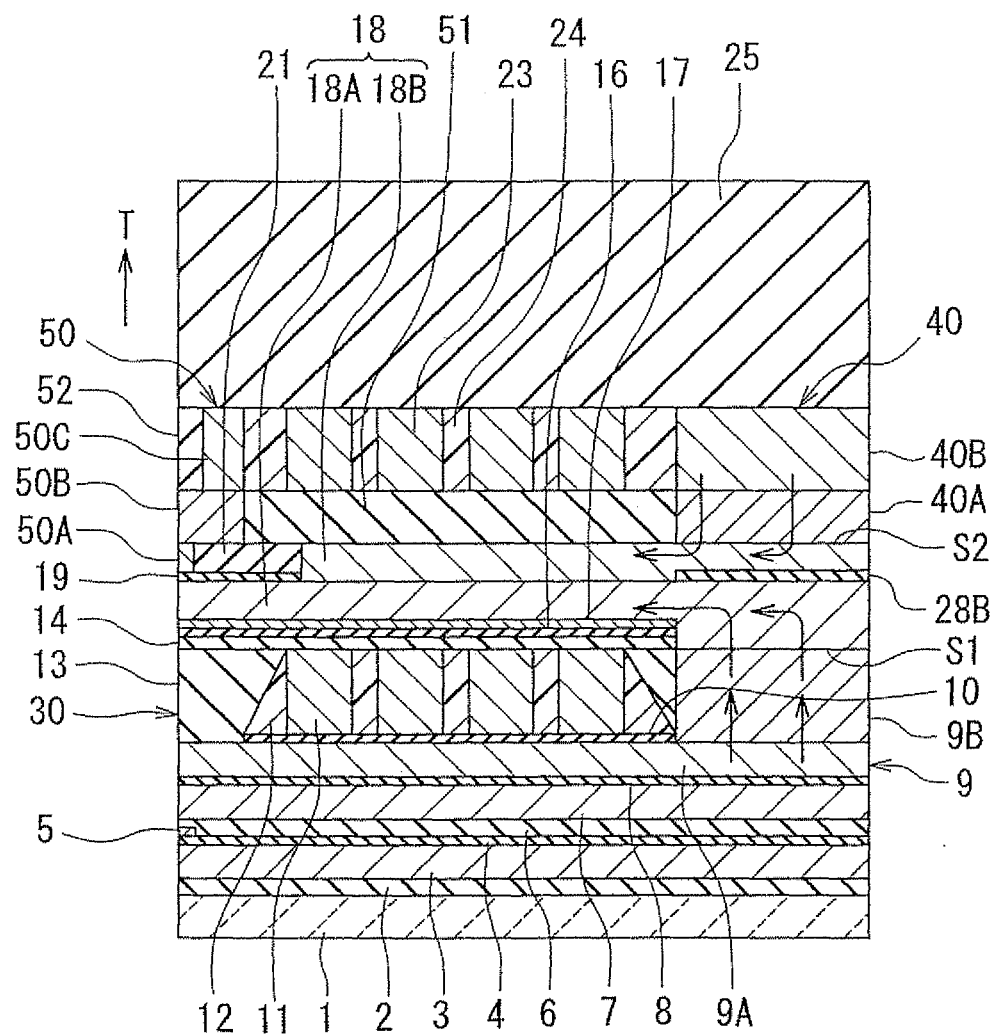
FIG. 21 is a cross-sectional view for illustrating the configuration of a magnetic head of a modification example of the seventh embodiment of the invention.

FIG. 21 is a cross-sectional view for illustrating the configuration of a magnetic head of a modification example of the seventh embodiment. FIG. 21 illustrates a cross section orthogonal to the medium facing surface and the plane of the substrate. In the magnetic head of the modification example, the second magnetic layer 40 incorporates: a first layer 40A disposed forward of the upper yoke layer 18B along the direction T of travel of the recording medium at a location away from the medium facing surface 30 and connected to the upper yoke layer 18B; and a second layer 40B disposed on the first layer 40A and connected thereto. The shield layer 50 incorporates a third layer 50C in addition to the first layer 50A and the second layer 5013. The third layer 50C is disposed on the second layer 50B and connected thereto. The third layer 50C has an end face located closer to the medium facing surface 30 and this end face is located at a distance from the medium facing surface 30. It is not absolutely necessary to provide the third layer 50C, however.

In the magnetic head of the modification example, an insulating layer 51 is provided in place of the insulating layer 22. The insulating layer 51 is made of alumina, for example. The second layer 50B, the first layer 40A and the insulating layer 51 have flattened top surfaces. The coil 23 and the insulating layer 24 are disposed on the insulating layer 51. The coil 23 is wound around the second layer 40B. An insulating layer 52 is disposed around the third layer 50C, the second layer 40B, the coil 23 and the insulating layer 24. The insulating layer 52 is made of alumina, for example. The third layer 50C, the second layer 40B, the coil 23, and the insulating layers 24 and 52 have flattened top surfaces. The protection layer 25 is disposed on the flattened top surfaces. The remainder of configuration of the magnetic head of the modification example is the same as that of the magnetic head of FIG. 19.

Figure 22:
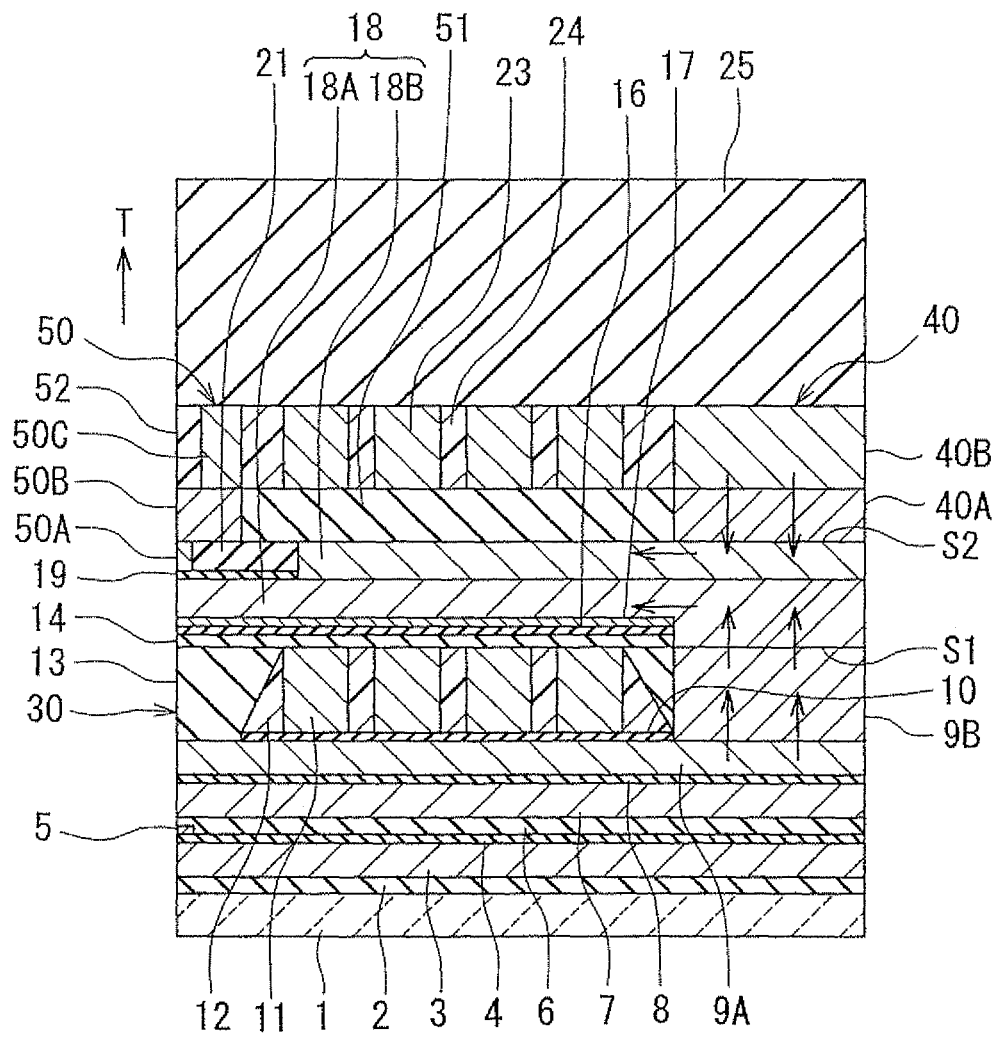
FIG. 22 is a cross-sectional view for illustrating the configuration of a reference magnetic head compared with the modification example shown in FIG. 21.

FIG. 22 is a cross-sectional view for illustrating the configuration of a reference magnetic head compared with the magnetic head of the modification example. FIG. 22 illustrates a cross section orthogonal to the medium facing surface and the plane of the substrate. The configuration of the reference magnetic head is similar to that of the magnetic head of the modification example shown in FIG. 21 except that the nonmagnetic layer 28B is not provided. The second magnetic layer 40 incorporates the first layer 40A and the second layer 40B in each of the reference magnetic head shown in FIG. 22 and the magnetic head of the modification example shown in FIG. 21. Therefore, these magnetic heads are capable of allowing magnetic fluxes of greater amount to concentrate in the magnetic layer 40.

In FIG. 21 and FIG. 22 the arrows in the first magnetic layer 9, the magnetic layer 18 and the second magnetic layer 40 schematically show the directions in which magnetic fluxes flow. In the reference magnetic head, since the nonmagnetic layer 28B is not provided as shown in FIG. 22, the flux density of the magnetic layer 18 may be reduced, which may result in degradation of overwrite property, as previously described. In the magnetic head of the modification example, in contrast, the nonmagnetic layer 28B is provided between the pole layer 18A and the upper yoke layer 18B in the region where the interfaces S1 and S2 are opposed to each other, as shown in FIG. 21. As a result, according to the magnetic head of the modification example, it is possible to prevent a reduction in flux density of the magnetic layer 18 and to thereby improve the overwrite property, as previously described.

Eighth Embodiment

Figure 23:
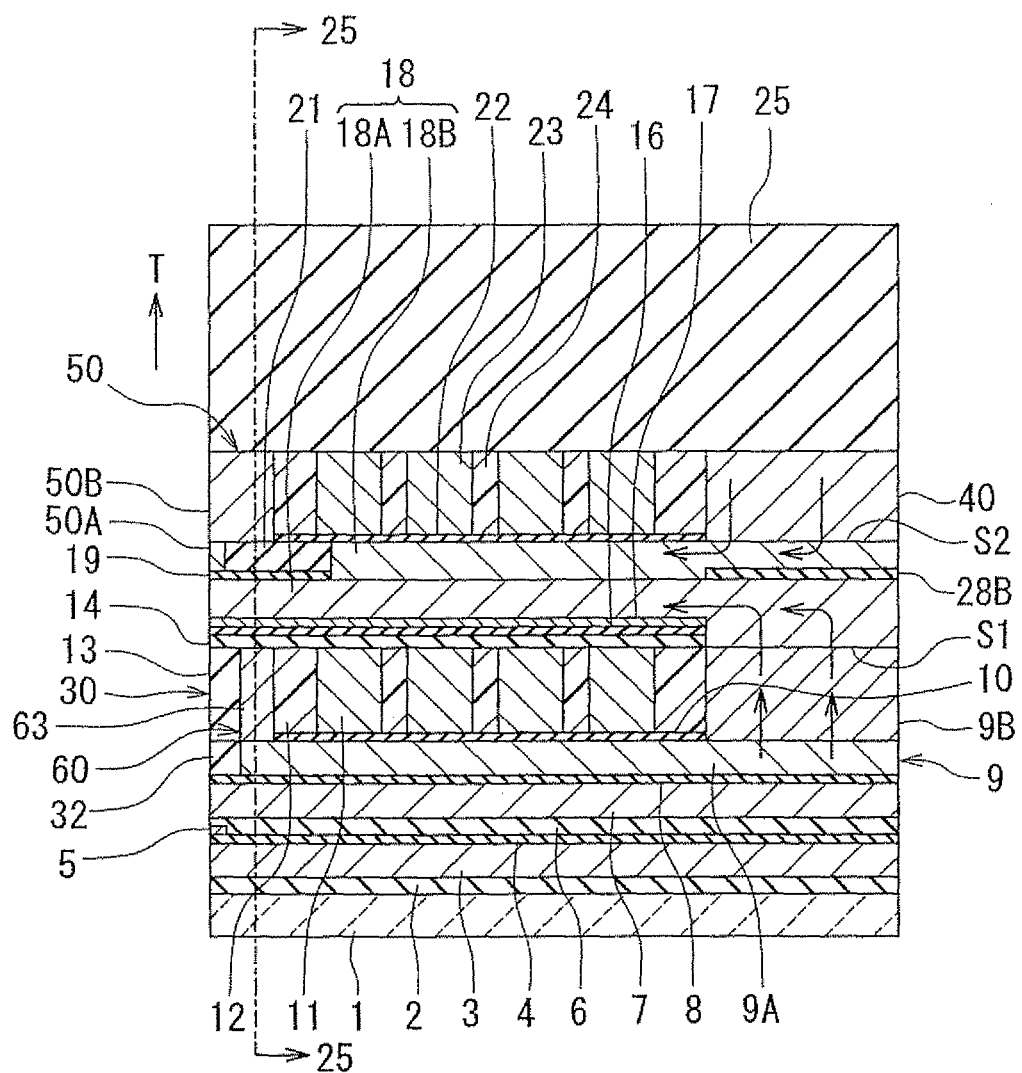
FIG. 23 is a cross-sectional view for illustrating the configuration of a magnetic head of an eighth embodiment of the invention.
Figure 24:
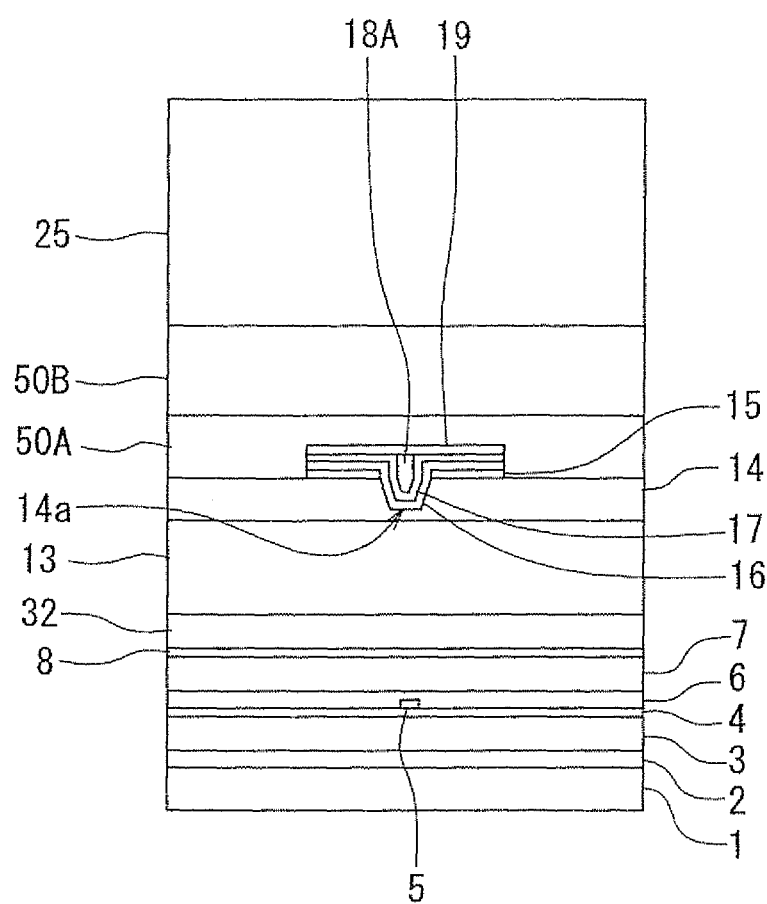
FIG. 24 is a front view of the medium facing surface of the magnetic head of the eighth embodiment of the invention.
Figure 25:
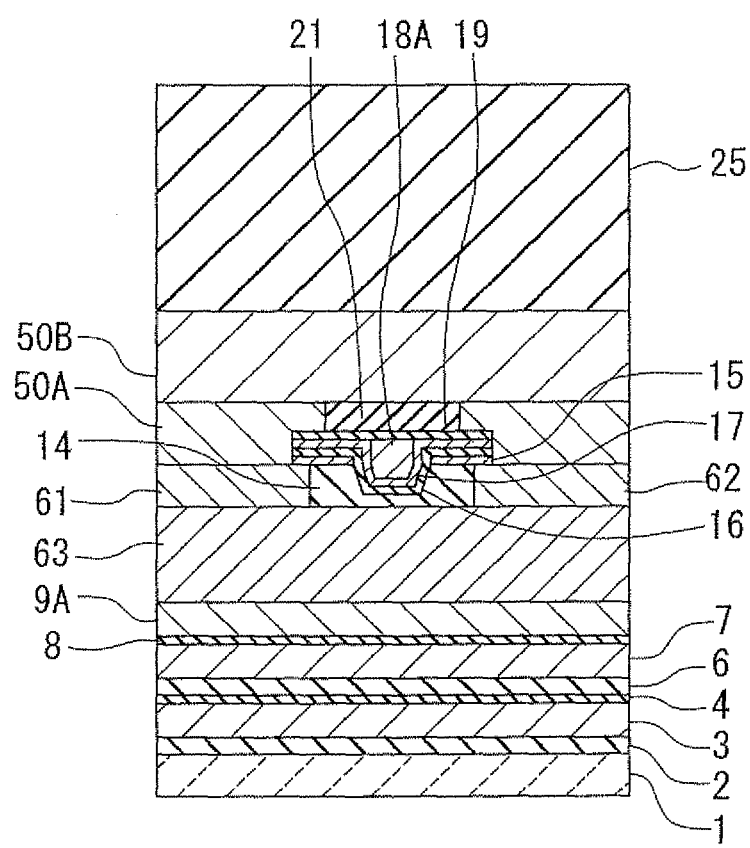
FIG. 25 is a cross-sectional view taken along line 25-25 of FIG. 23.

Reference is now made to FIG. 23 to FIG. 25 to describe a magnetic head of an eighth embodiment of the invention. FIG. 23 is a cross-sectional view for illustrating the configuration of the magnetic head of the eighth embodiment. FIG. 23 illustrates a cross section orthogonal to the medium facing surface and the plane of the substrate. FIG. 24 is a front view illustrating the medium facing surface of the magnetic head of the embodiment. FIG. 25 is a cross-sectional view taken along line 25-25 of FIG. 23.

The magnetic head of the eighth embodiment is similar to the magnetic head of the seventh embodiment but has differences as will now be described. In the eighth embodiment, the end face of the first layer 9A of the first magnetic layer 9 closer to the medium facing surface 30 is located at a distance from the medium facing surface 30. An insulating layer 32 is disposed around the first layer 9A. The insulating layer 32 is made of alumina, for example. The first layer 9A and the insulating layer 32 have flattened top surfaces.

The magnetic head of the eighth embodiment has a coupling portion 60 that connects the first layer 50A of the shield layer 50 to the first layer 9A of the first magnetic layer 9 without touching the magnetic layer 18. As shown in FIG. 25, the coupling portion 60 incorporates: a magnetic layer 63 disposed on a region of the first layer 9A between the coil 11 and the medium facing surface 30; and two magnetic layers 61 and 62 disposed on the magnetic layer 63.

The magnetic layer 63, the second layer 9B, the coil 11, and the insulating layers 12 and 13 have flattened top surfaces. The magnetic layers 61 and 62 are disposed on both sides of the pole layer 18A, the sides being opposed to each other in the direction of track width, and couple the first layer 50A to the magnetic layer 63. Each of the magnetic layers 61 to 63 is made of a magnetic material. The material may be any of CoFeN, CoNiFe, NiFe and CoFe, for example.

In the eighth embodiment, the first layer 50A incorporates: a middle portion including a portion opposed to the pole layer 18A with the gap layer 19 disposed in between; and two side portions located outside the middle portion along the direction of track width. The maximum length of each of the side portions taken in the direction orthogonal to the medium facing surface 30 is greater than the length of the middle portion taken in the direction orthogonal to the medium facing surface 30. The magnetic layers 61 and 62 are respectively connected to the two side portions of the first layer 50A.

In the method of manufacturing the magnetic head of the eighth embodiment, the magnetic layer 63 is formed at the same time as the second layer 9B. In the eighth embodiment the magnetic layers 61 and 62 are formed on the magnetic layer 63 before the nonmagnetic layer 14P to be the encasing layer 14 is formed. The nonmagnetic layer 14P is then formed. Next, the nonmagnetic layer 14P is polished by CMP, for example, so that the magnetic layers 61 and 62 are exposed, and the top surfaces of the magnetic layers 61 and 62 and the nonmagnetic layer 14P are thereby flattened. In the eighth embodiment, after the gap layer 19 is formed, portions of the gap layer 19, the polishing stopper layer 17, the nonmagnetic film 16 and the nonmagnetic metal layer 15 that are located on the magnetic layers 61 and 62 are selectively etched to expose the top surfaces of the magnetic layers 61 and 62. The first layer 50A is then formed on the gap layer 19 and the magnetic layers 61 and 62.

In the magnetic head of the eighth embodiment, the first portion 50A of the shield layer 50 is coupled to the first layer 9A of the first magnetic layer 9 for flux concentration by the coupling portion 60. As a result, according to the embodiment, a magnetic flux taken in from the end face of the shield layer 50 located in the medium facing surface 30 passes through the coupling portion 60 and the first magnetic layer 9 and flows into the pole layer 18A. As a result, according to the embodiment, the shield layer 50 also has a function of returning the flux that has been generated from the end face of the pole layer 18A and has magnetized the recording medium.

According to the embodiment, it is possible to take in magnetic fluxes of great amount from the end face of the shield layer 50. As a result, according to the embodiment, it is possible to precisely define the location of the end of a bit pattern to be written on the recording medium. According to the embodiment, an improvement in linear recording density is thereby achieved.

Figure 26:
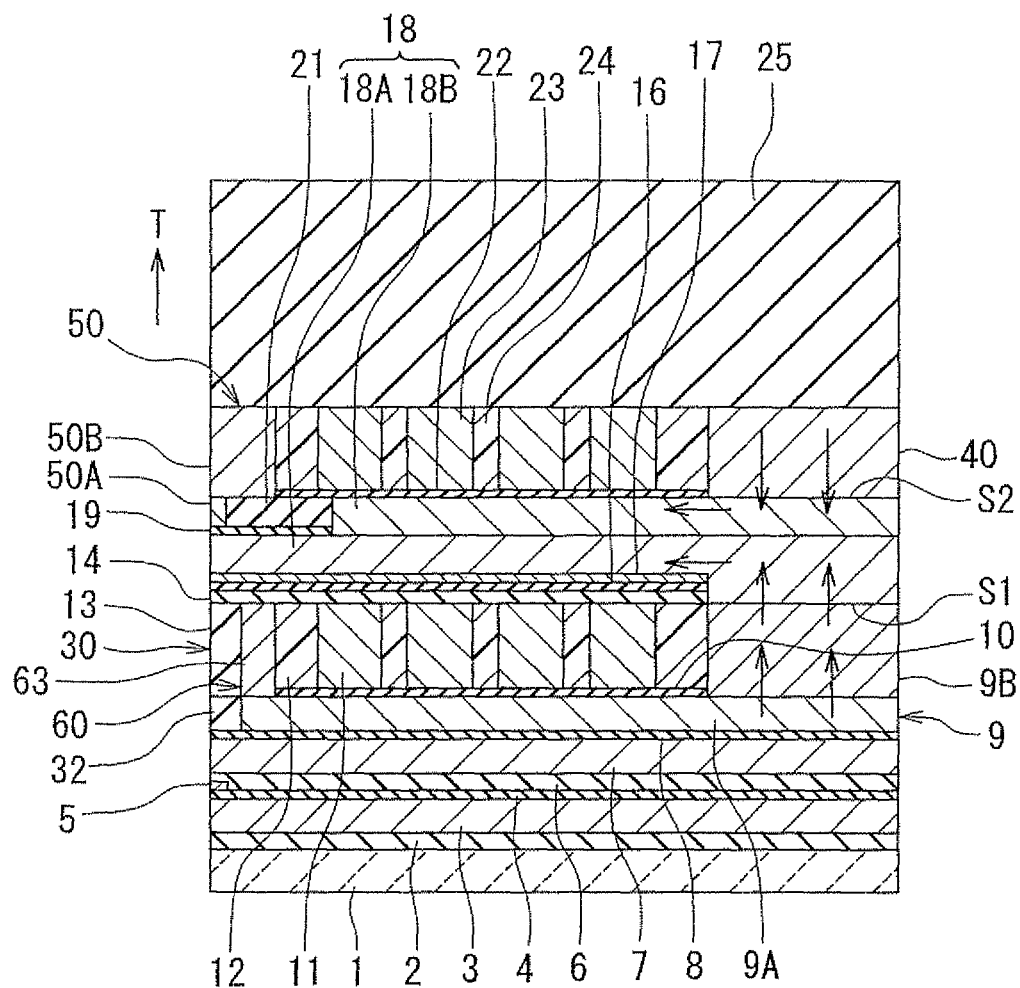
FIG. 26 is a cross-sectional view for illustrating the configuration of a reference magnetic head compared with the eighth embodiment of the invention.

FIG. 26 is a cross-sectional view for illustrating the configuration of a reference magnetic head. FIG. 26 illustrates a cross section orthogonal to the medium facing surface and the plane of the substrate. The configuration of the reference magnetic head is similar to that of the magnetic head of FIG. 23 except that the nonmagnetic layer 28B is not provided. The reference magnetic head of FIG. 26 has the above-described effects, too.

In FIG. 23 and FIG. 26 the arrows in the first magnetic layer 9, the magnetic layer 18 and the second magnetic layer 40 schematically show the directions in which magnetic fluxes flow. In the reference magnetic head, since the nonmagnetic layer 28B is not provided as shown in FIG. 26, the flux density of the magnetic layer 18 may be reduced, which may result in degradation of overwrite property, as described in the seventh embodiment. In the magnetic head of the embodiment, in contrast, the nonmagnetic layer 28B is provided between the pole layer 18A and the upper yoke layer 1813 in the region where the interfaces S1 and S2 are opposed to each other, as shown in FIG. 23. As a result, according to the magnetic head of the embodiment, it is possible to prevent a reduction in flux density of the magnetic layer 18 and to thereby improve the overwrite property, as in the seventh embodiment.

The remainder of configuration, function and effects of the eighth embodiment are similar to those of the seventh embodiment.

Modification Example

Figure 27:
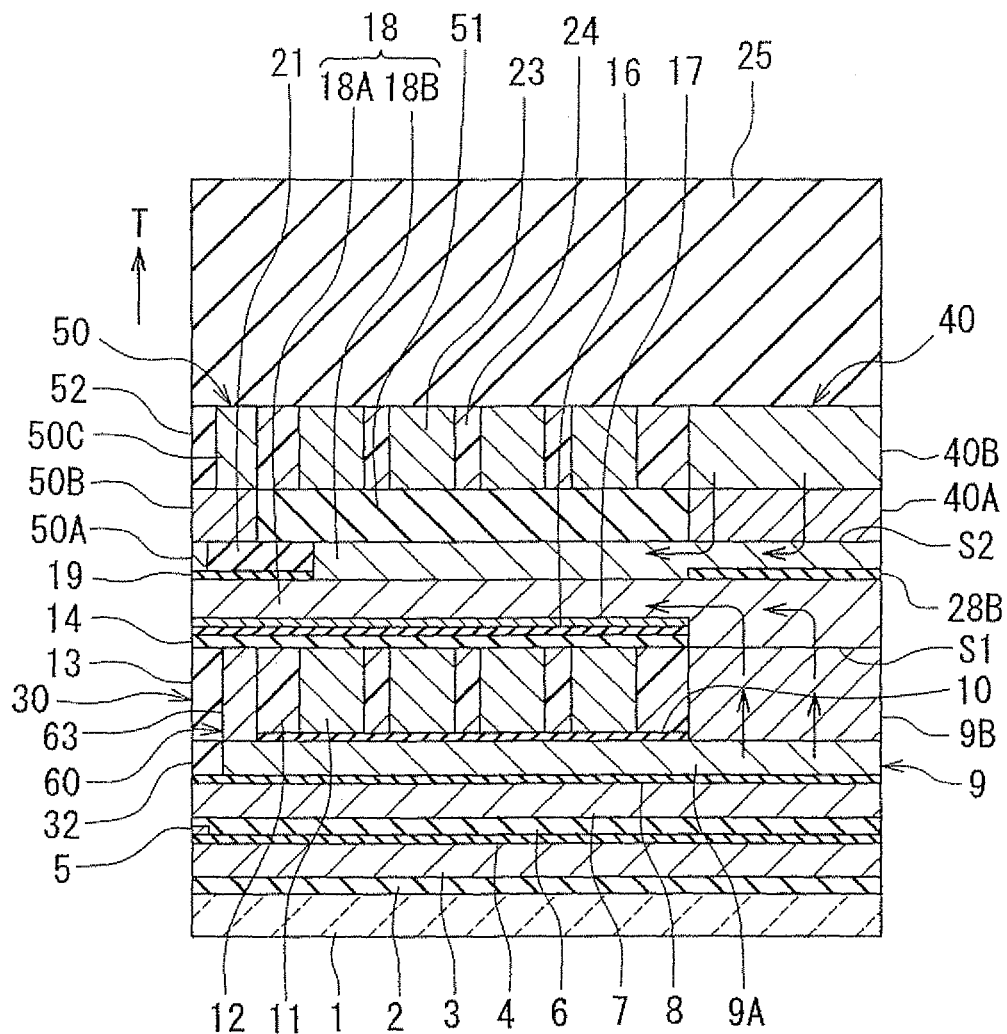
FIG. 27 is a cross-sectional view for illustrating the configuration of a magnetic head of a modification example of the eighth embodiment of the invention.

FIG. 27 is a cross-sectional view for illustrating the configuration of a magnetic head of a modification example of the eighth embodiment. FIG. 27 illustrates a cross section orthogonal to the medium facing surface and the plane of the substrate. In the magnetic head of the modification example, as in the modification example of the seventh embodiment, the second magnetic layer 40 incorporates the first layer 40A and the second layer 40B, and the shield layer 50 incorporates the third layer 50C in addition to the first layer 50A and the second layer 50B. It is not absolutely necessary to provide the third layer 50C, however.

In the magnetic head of this modification example, as in the modification example of the seventh embodiment, the insulating layer 51 is provided in place of the insulating layer 22, and the top surfaces of the second layer 50B, the first layer 40A and the insulating layer 51 are flattened. The coil 23 and the insulating layer 24 are disposed on the insulating layer 51. The coil 23 is wound around the second layer 40B. The insulating layer 52 is disposed around the third layer 50C, the second layer 40B, the coil 23 and the insulating layer 24. The top surfaces of the third layer 50C, the second layer 40B, the coil 23, and the insulating layers 24 and 52 are flattened. The protection layer 25 is disposed on the flattened top surfaces. The remainder of configuration of the magnetic head of the modification example is the same as that of the magnetic head of FIG. 23.

Figure 28:
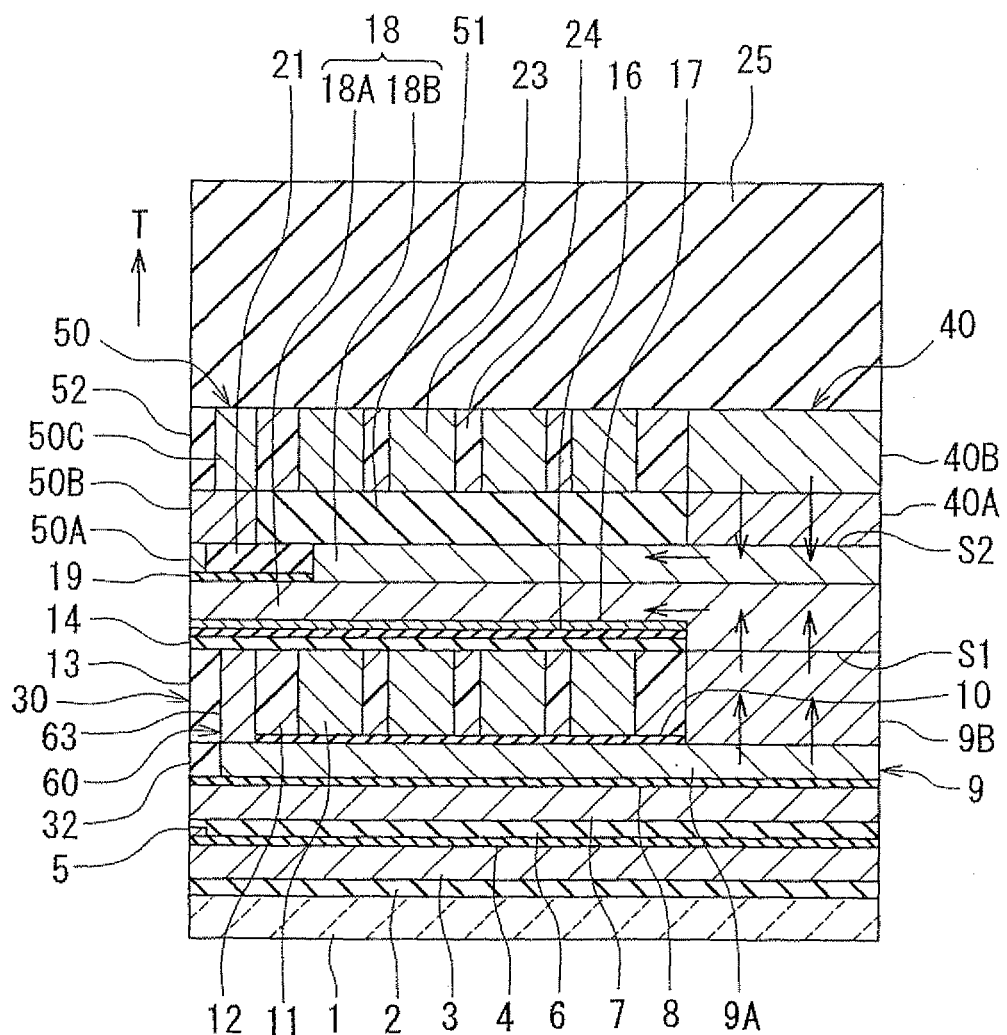
FIG. 28 is a cross-sectional view for illustrating the configuration of a reference magnetic head compared with the modification example shown in FIG. 27.

FIG. 28 is a cross-sectional view for illustrating the configuration of a reference magnetic head compared with the magnetic head of the modification example. FIG. 28 illustrates a cross section orthogonal to the medium facing surface and the plane of the substrate. The configuration of the reference magnetic head is similar to that of the magnetic head of the modification example shown in FIG. 27 except that the nonmagnetic layer 28B is not provided. The second magnetic layer 40 incorporates the first layer 40A and the second layer 40B in each of the reference magnetic head shown in FIG. 28 and the magnetic head of the modification example shown in FIG. 27. Therefore, these magnetic heads are capable of allowing magnetic fluxes of greater amount to concentrate in the magnetic layer 40.

In FIG. 27 and FIG. 28 the arrows in the first magnetic layer 9, the magnetic layer 18 and the second magnetic layer 40 schematically show the directions in which magnetic fluxes flow. In the reference magnetic head, since the nonmagnetic layer 28B is not provided as shown in FIG. 28, the flux density of the magnetic layer 18 may be reduced, which may result degradation of overwrite property, as previously described. In the magnetic head of the modification example, in contrast, the nonmagnetic layer 28B is provided between the pole layer 18A and the upper yoke layer 18B in the region where the interfaces S1 and S2 are opposed to each other, as shown in FIG. 27. As a result, according to the magnetic head of the modification example, it is possible to prevent a reduction in flux density of the magnetic layer 18 and to thereby improve the overwrite property, as previously described.

Ninth Embodiment

Figure 29:
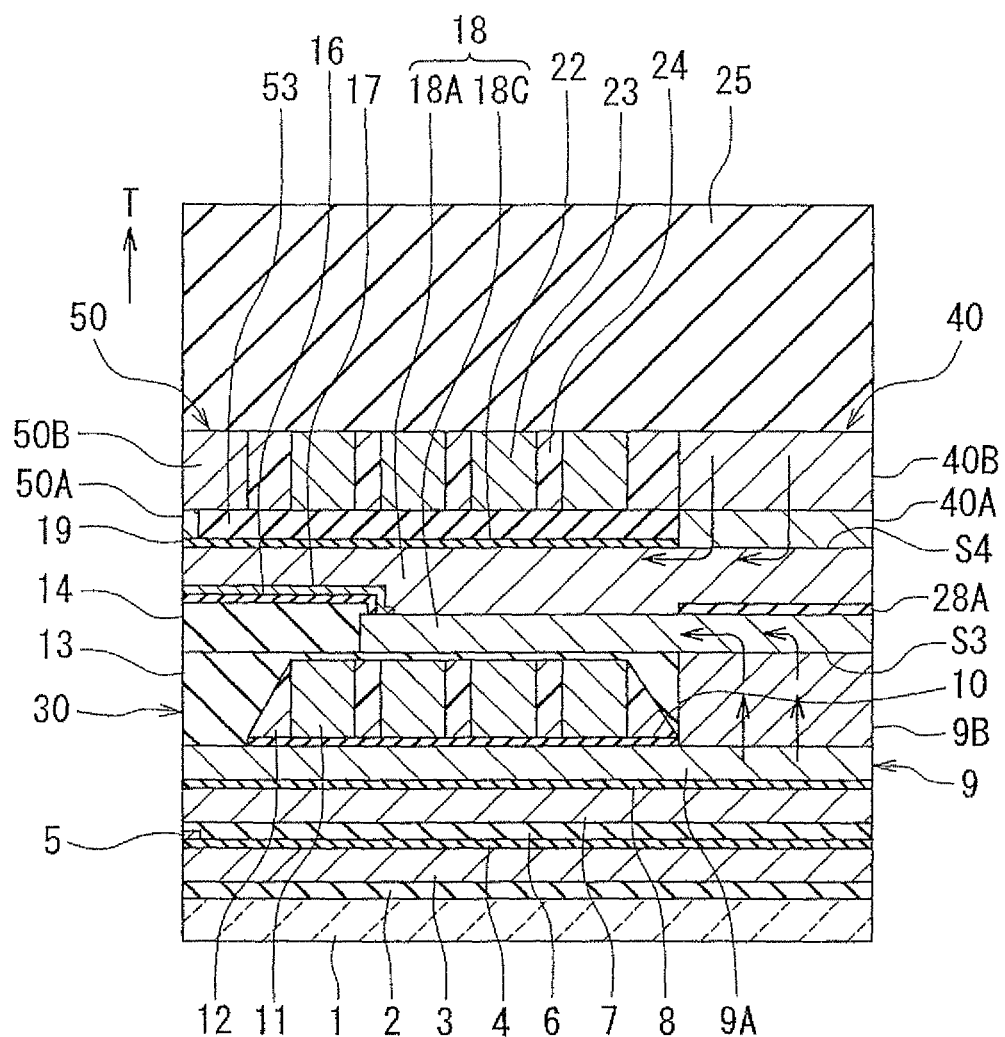
FIG. 29 is a cross-sectional view for illustrating the configuration of a magnetic head of a ninth embodiment of the invention.

Reference is now made to FIG. 29 to describe a magnetic head of a ninth embodiment of the invention. FIG. 29 is a cross-sectional view for illustrating the configuration of the magnetic head of the ninth embodiment. FIG. 29 illustrates a cross section orthogonal to the medium facing surface and the plane of the substrate.

The magnetic head of the ninth embodiment is similar to the magnetic head of the seventh embodiment but has differences as will now be described. In the magnetic head of the ninth embodiment, the insulating layer 13 is provided to cover the first coil 11 and the insulating layer 12. The top surfaces of the insulating layer 13 and the second layer 9B are flattened.

In the ninth embodiment the lower yoke layer 18C is provided in place of the upper yoke layer 18B of the seventh embodiment. The magnetic layer 18 for writing of the ninth embodiment incorporates the pole layer 18A and the lower yoke layer 18C. The lower yoke layer 18C is connected to the pole layer 18A and disposed backward of the pole layer 18A along the direction T of travel of the recording medium at a location away from the medium facing surface 30. The lower yoke layer 18C is disposed on the insulating layer 13 and the second layer 9B.

In the ninth embodiment the second magnetic layer 40 for flux concentration incorporates: the first layer 40A connected to the pole layer 18A and disposed forward of the pole layer 18A along the direction T of travel of the recording medium at a location away from the medium facing surface 30; and the second layer 40B disposed on the first layer 40A and connected thereto.

In the ninth embodiment an insulating layer 53 is provided in place of the nonmagnetic layer 21 of the seventh embodiment. The insulating layer 53 is disposed around the first layer 50A and the first layer 40A. The insulating layer 53 is made of alumina, for example. The first layer 50A, the first layer 40A and the insulating layer 53 have flattened top surfaces. In the ninth embodiment the second coil 23 and the insulating layer 24 are disposed on the insulating layer 53.

In the ninth embodiment the second layer 9B of the first magnetic layer 9 is connected to the lower yoke layer 18C, and the first layer 40A of the second magnetic layer 40 is connected to the pole layer 18A. The lower yoke layer 18C is made of a magnetic material. The material may be any of CoFeN, CoNiFe, NiFe and CoFe, for example.

In the ninth embodiment the interface between the first magnetic layer 9 and the magnetic layer 18 is the interface S3 between the second layer 9B and the lower yoke layer 18C.

When seen in the direction orthogonal to the interface S3, the coil 11 is wound around the interface 83. Furthermore, the interface between the second magnetic layer 40 and the magnetic layer 18 is the interface S4 between the first layer 40A and the pole layer 18A. When seen in the direction orthogonal to the interface S4, the coil 23 is wound around the interface 84. When seen in the direction orthogonal to the interface S3, at least part of the interface S3 is disposed at a location that coincides with at least part of the interface 84.

The magnetic head of the ninth embodiment has the nonmagnetic layer 28A made of a nonmagnetic material and disposed between the pole layer 18A and the lower yoke layer 18C. When seen in the direction orthogonal to the interface S3, at least part of the nonmagnetic layer 28A is disposed at a location that coincides with at least part of the interface S3. The lower yoke layer 18C is connected to the pole layer 18A at least at a location closer to the medium facing surface 30 than the nonmagnetic layer 28A. The material and thickness of the nonmagnetic layer 28A are the same as those of the sixth embodiment.

In the ninth embodiment, when seen in the direction orthogonal to the interface S3, at least part of the interface S3, at least part of the interface S4, and at least part of the nonmagnetic layer 28A are disposed at locations that coincide with one another.

The distance between the medium facing surface 30 and the end of the nonmagnetic layer 28A farther from the medium facing surface 30 is preferably equal to or greater than the distance between the medium facing surface 30 and the end of the interface S3 farther from the medium facing surface 30.

Figure 30:
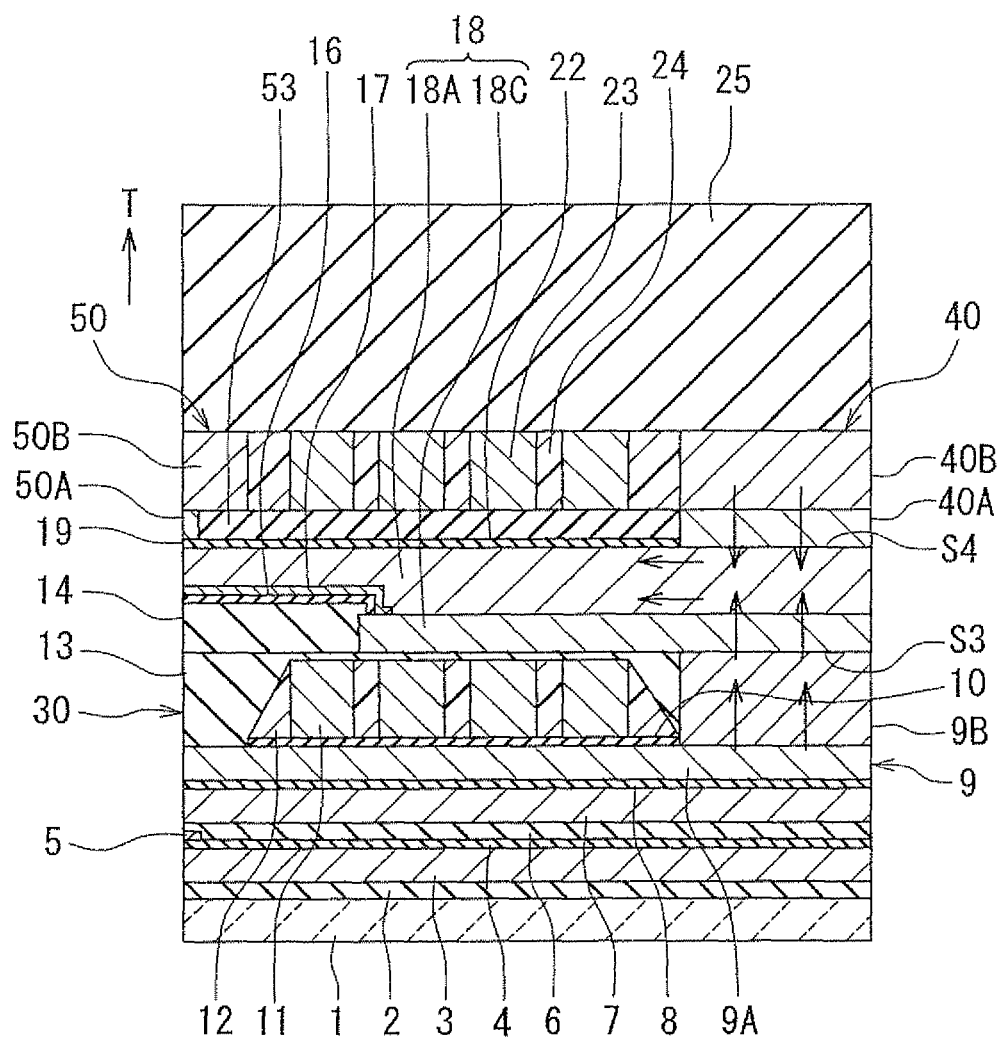
FIG. 30 is a cross-sectional view for illustrating the configuration of a reference magnetic head compared with the ninth embodiment of the invention.

FIG. 30 is a cross-sectional view for illustrating the configuration of a reference magnetic head. FIG. 30 illustrates a cross section orthogonal to the medium facing surface and the plane of the substrate. The configuration of the reference magnetic head is similar to that of the magnetic head of the ninth embodiment except that the nonmagnetic layer 28A is not provided.

In FIG. 29 and FIG. 30 the arrows in the first magnetic layer 9, the magnetic layer 18 and the second magnetic layer 40 schematically show the directions in which magnetic fluxes flow. In the reference magnetic head, since the nonmagnetic layer 28A is not provided as shown in FIG. 30, a magnetic flux that has come into the lower yoke layer 18C from the second layer 9B and a magnetic flux that has come into the pole layer 18A from the first layer 40A repel each other, and the flux density of the magnetic layer 18 may be thereby reduced, which may result in degradation of overwrite property. In the ninth embodiment, in contrast, the nonmagnetic layer 28A is provided between the pole layer 18A and the lower yoke layer 18C in the region where the interfaces S3 and S4 are opposed to each other, as shown in FIG. 29. As a result, according to the embodiment, it is possible to suppress repulsion between the flux that has come into the lower yoke layer 18C from the second layer 9B and the flux that has come into the pole layer 18A from the first layer 40A in the magnetic layer 18. It is thereby possible to prevent a reduction in flux density of the magnetic layer 18 and to thereby improve the overwrite property.

The remainder of configuration, function and effects of the ninth embodiment are similar to those of the seventh embodiment.

Tenth Embodiment

Figure 31:
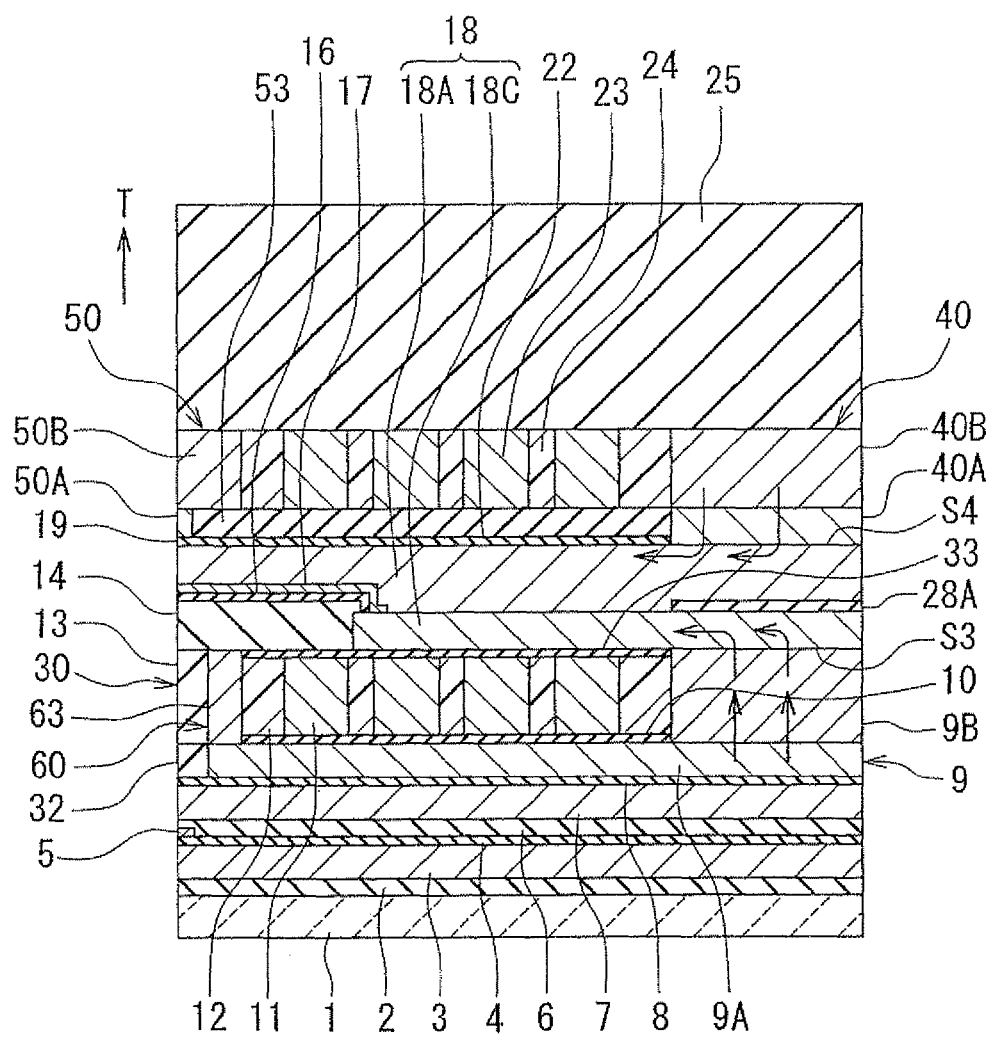
FIG. 31 is a cross-sectional view for illustrating the configuration of a magnetic head of a tenth embodiment of the invention.

Reference is now made to FIG. 31 to describe a magnetic head of a tenth embodiment of the invention. FIG. 31 is a cross-sectional view for illustrating the configuration of the magnetic head of the tenth embodiment. FIG. 31 illustrates a cross section orthogonal to the medium facing surface and the plane of the substrate.

The magnetic head of the tenth embodiment is similar to the magnetic head of the ninth embodiment but has differences as will now be described. In the tenth embodiment, the end face of the first layer 9A of the first magnetic layer 9 closer to the medium facing surface 30 is located at a distance from the medium facing surface 30. The insulating layer 32 is disposed around the first layer 9A. The insulating layer 32 is made of alumina, for example. The top surfaces of the first layer 9A and the insulating layer 32 are flattened.

The magnetic head of the tenth embodiment has the coupling portion 60 that connects the first layer 50A of the shield layer 50 to the first layer 9A of the first magnetic layer 9 without touching the magnetic layer 18. The configuration of the coupling portion 60 is the same as that of the eighth embodiment.

In the magnetic head of the tenth embodiment, the first portion 50A of the shield layer 50 is coupled to the first layer 9A of the first magnetic layer 9 for flux concentration by the coupling portion 60. As a result, according to the embodiment, a magnetic flux taken in from the end face of the shield layer 50 located in the medium facing surface 30 passes through the coupling portion 60, the first magnetic layer 9 and the lower yoke layer 18C and flows into the pole layer 18A. As a result, according to the embodiment, the shield layer 50 also has a function of returning the flux that has been generated from the end face of the pole layer 18A and has magnetized the recording medium.

According to the embodiment, it is possible to take in magnetic fluxes of great amount from the end face of the shield layer 50. As a result, according to the embodiment, it is possible to precisely define the location of the end of a bit pattern to be written on the recording medium. According to the embodiment, an improvement in linear recording density is thereby achieved.

Figure 32:
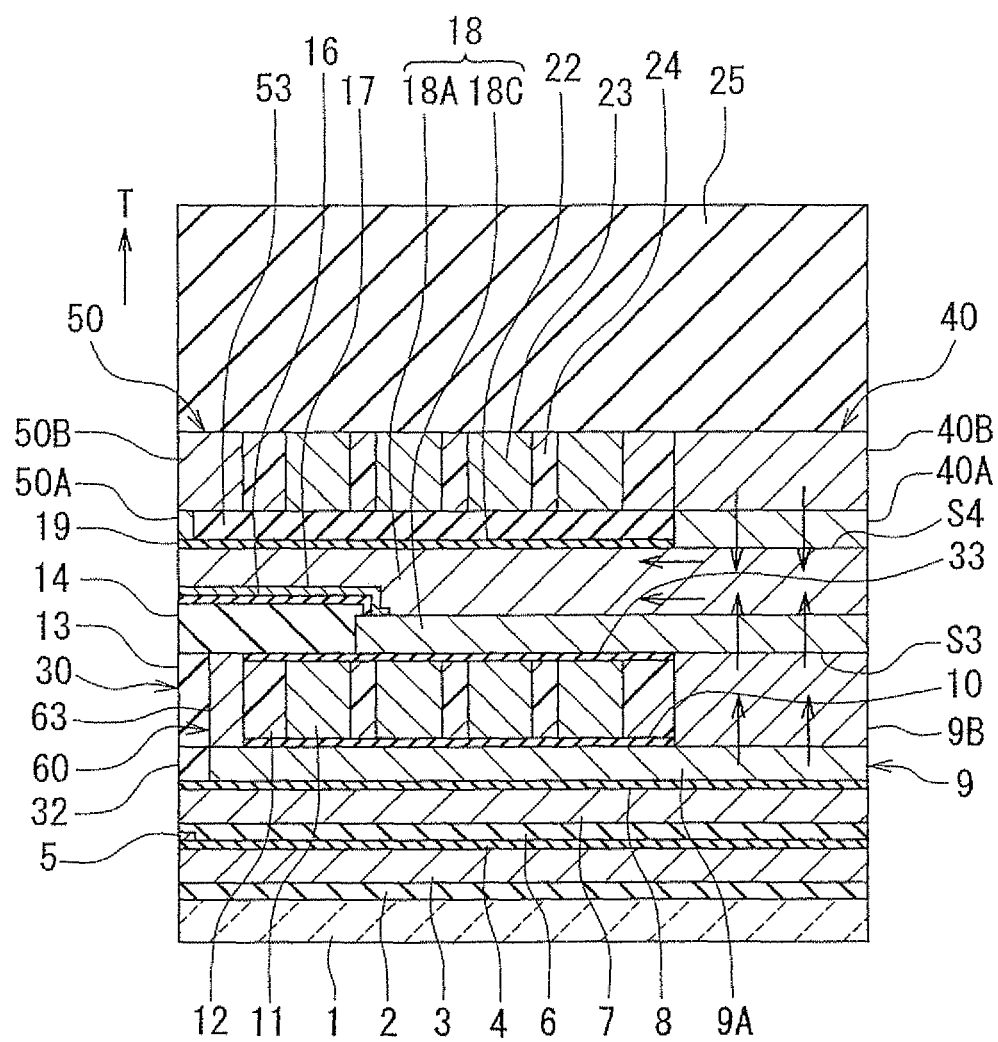
FIG. 32 is a cross-sectional view for illustrating the configuration of a reference magnetic head compared with the tenth embodiment of the invention.

FIG. 32 is a cross-sectional view for illustrating the configuration of a reference magnetic head. FIG. 32 illustrates a cross section orthogonal to the medium facing surface and the plane of the substrate. The configuration of the reference magnetic head is similar to that of the magnetic head of FIG. 31 except that the nonmagnetic layer 28A is not provided. The reference magnetic head of FIG. 32 has the above-described effects, too.

In FIG. 31 and FIG. 32 the arrows in the first magnetic layer 9, the magnetic layer 18 and the second magnetic layer 40 schematically show the directions in which magnetic fluxes flow. In the reference magnetic head, since the nonmagnetic layer 28A is not provided as shown in FIG. 32, the flux density of the magnetic layer 18 may be reduced, which may result in degradation of overwrite property, as described in the ninth embodiment. In the magnetic head of the tenth embodiment, in contrast, the nonmagnetic layer 28A is provided between the pole layer 18A and the lower yoke layer 18C in the region where the interfaces S1 and S2 are opposed to each other, as shown in FIG. 31. As a result, according to the magnetic head of the embodiment, it is possible to prevent a reduction in flux density of the magnetic layer 18 and to thereby improve the overwrite property, as in the ninth embodiment.

The remainder of configuration, function and effects of the tenth embodiment are similar to those of the ninth embodiment.

Eleventh Embodiment

Figure 33:
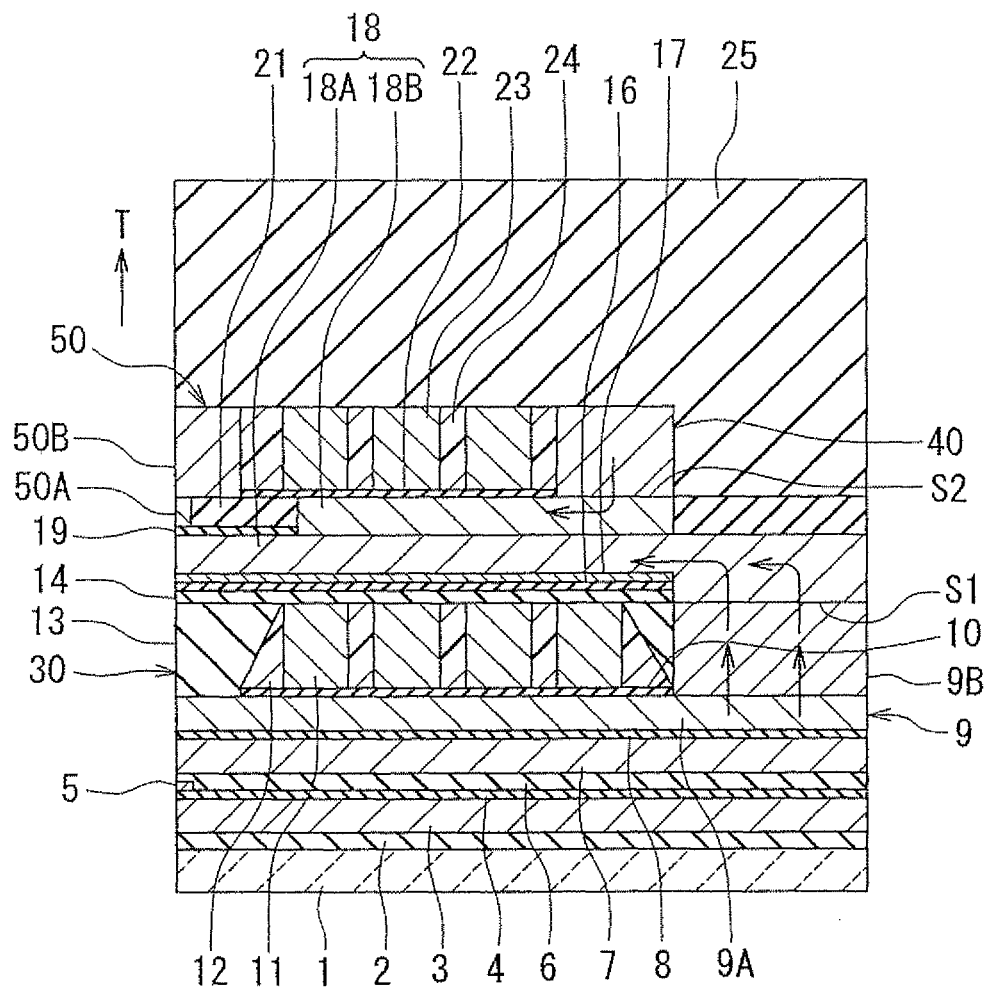
FIG. 33 is a cross-sectional view for illustrating the configuration of a magnetic head of an eleventh embodiment of the invention.

Reference is now made to FIG. 33 to describe a magnetic head of an eleventh embodiment of the invention. FIG. 33 is a cross-sectional view for illustrating the configuration of the magnetic head of the eleventh embodiment. FIG. 33 illustrates a cross section orthogonal to the medium facing surface and the plane of the substrate.

The magnetic head of the eleventh embodiment is similar to the magnetic head of the seventh embodiment but has differences as will now be described. In the eleventh embodiment, the nonmagnetic layer 28B of the seventh embodiment is not provided. In the eleventh embodiment, when seen in the direction orthogonal to the interface S2 between the magnetic layer 40 and the upper yoke layer 18B, the interface S2 is disposed at a location that is closer to the medium facing surface 30 than the interface S1 between the second layer 9B and the pole layer 18A and that does not coincide with the interface S1. According to the embodiment, through the function the same as that of the first embodiment, in the magnetic layer 18 it is possible to suppress repulsion between the flux that has come into the pole layer 18A from the second layer 9B and the flux that has come into the upper yoke layer 18B from the magnetic layer 40. It is thereby possible to prevent a reduction in flux density of the magnetic layer 18 and to thereby improve the overwrite property.

In the eleventh embodiment the interface S2 may be disposed at a location that is farther from the medium facing surface 30 than the interface S1 and that does not coincide with the interface S1. The remainder of configuration, function and effects of the eleventh embodiment are similar to those of the seventh embodiment.

Twelfth Embodiment

Figure 34:
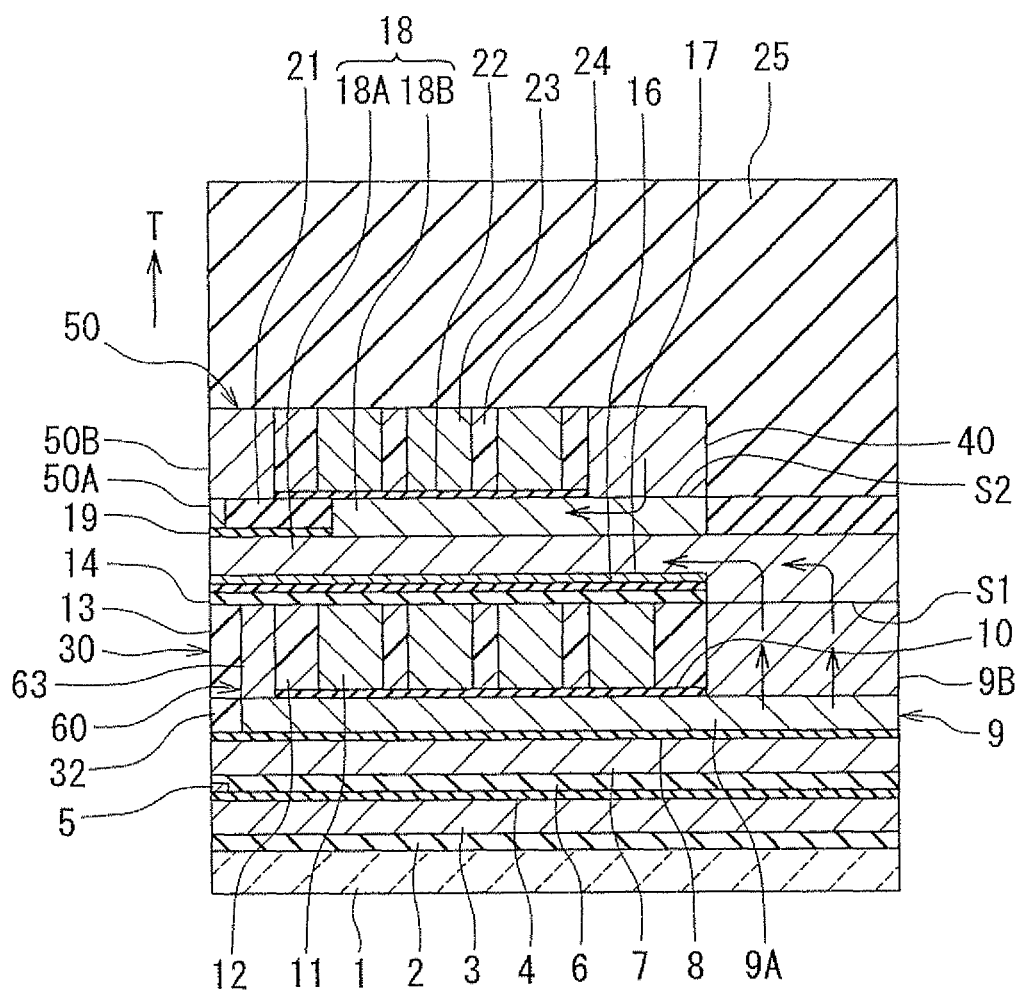
FIG. 34 is a cross-sectional view for illustrating the configuration of a magnetic head of a twelfth embodiment of the invention.

Reference is now made to FIG. 34 to describe a magnetic head of a twelfth embodiment of the invention. FIG. 34 is a cross-sectional view for illustrating the configuration of the magnetic head of the twelfth embodiment. FIG. 34 illustrates a cross section orthogonal to the medium facing surface and the plane of the substrate.

The magnetic head of the twelfth embodiment is similar to the magnetic head of the eighth embodiment but has differences as will now be described. In the twelfth embodiment, the nonmagnetic layer 28B of the eighth embodiment is not provided. In the twelfth embodiment, when seen in the direction orthogonal to the interface S2 between the magnetic layer 40 and the upper yoke layer 18B, the interface S2 is disposed at a location that is closer to the medium facing surface 30 than the interface S1 between the second layer 9B and the pole layer 18A and that does not coincide with the interface S1. According to the embodiment, through the function the same as that of the first embodiment, in the magnetic layer 18 it is possible to suppress repulsion between the flux that has come into the pole layer 18A from the second layer 9B and the flux that has come into the upper yoke layer 18B from the magnetic layer 40. It is thereby possible to prevent a reduction in flux density of the magnetic layer 18 and to thereby improve the overwrite property.

In the twelfth embodiment the interface S2 may be disposed at a location that is farther from the medium facing surface 30 than the interface S1 and that does not coincide with the interface S1. The remainder of configuration, function and effects of the twelfth embodiment are similar to those of the eighth embodiment.

Thirteenth Embodiment

Figure 35:
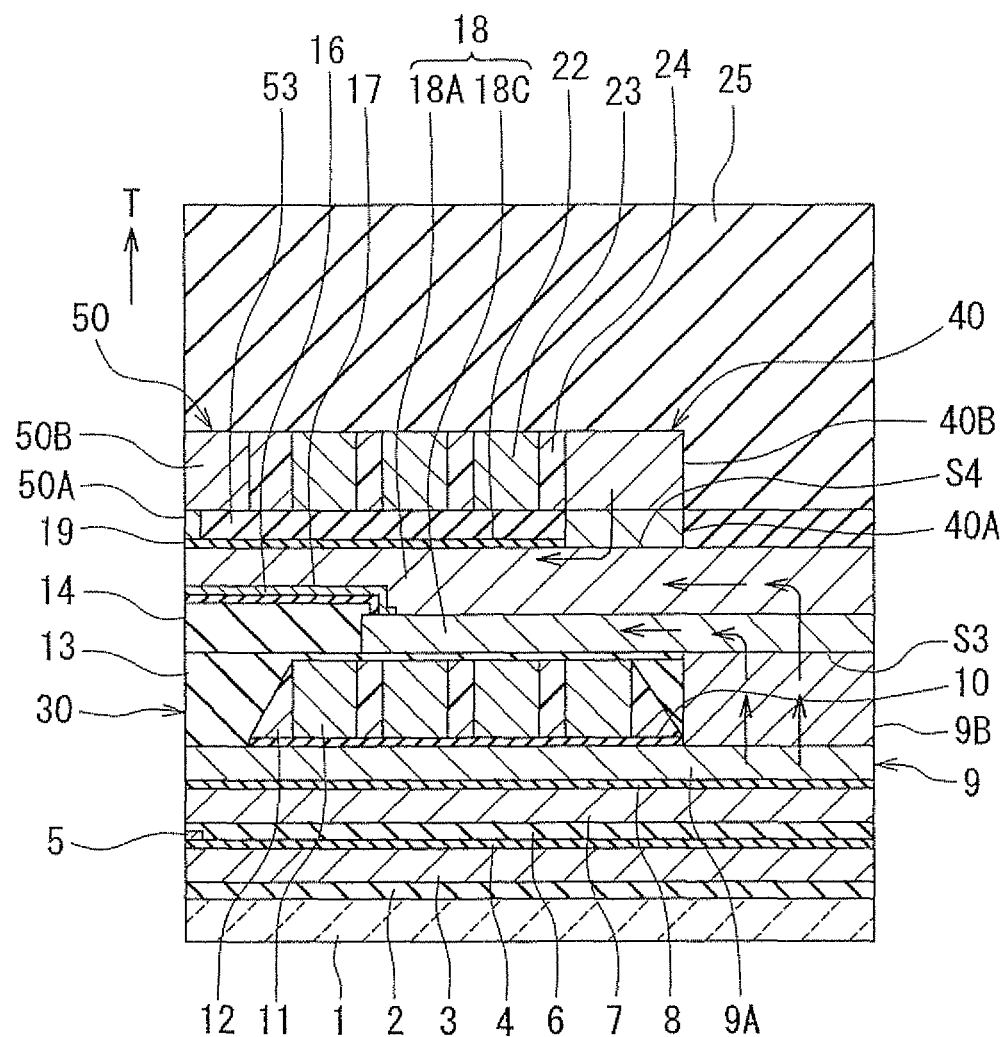
FIG. 35 is a cross-sectional view for illustrating the configuration of a magnetic head of a thirteenth embodiment of the invention.

Reference is now made to FIG. 35 to describe a magnetic head of a thirteenth embodiment of the invention. FIG. 35 is a cross-sectional view for illustrating the configuration of the magnetic head of the thirteenth embodiment. FIG. 35 illustrates a cross section orthogonal to the medium facing surface and the plane of the substrate.

The magnetic head of the thirteenth embodiment is similar to the magnetic head of the ninth embodiment but has differences as will now be described. In the thirteenth embodiment, the nonmagnetic layer 28A of the ninth embodiment is not provided. In the thirteenth embodiment, when seen in the direction orthogonal to the interface S4 between the first layer 40A and the pole layer 18A, the interface S4 is disposed at a location that is closer to the medium facing surface 30 than the interface S3 between the second layer 9B and the lower yoke layer 18C and that does not coincide with the interface S3. According to the embodiment, through the function the same as that of the second embodiment, in the magnetic layer 18 it is possible to suppress repulsion between the flux that has come into the lower yoke layer 18C from the second layer 9B and the flux that has come into the pole layer 18A from the first layer 40A. It is thereby possible to prevent a reduction in flux density of the magnetic layer 18 and to thereby improve the overwrite property.

In the thirteenth embodiment the interface S4 may be disposed at a location that is farther from the medium facing surface 30 than the interface S3 and that does not coincide with the interface S3. The remainder of configuration, function and effects of the thirteenth embodiment are similar to those of the ninth embodiment.

Fourteenth Embodiment

Figure 36:
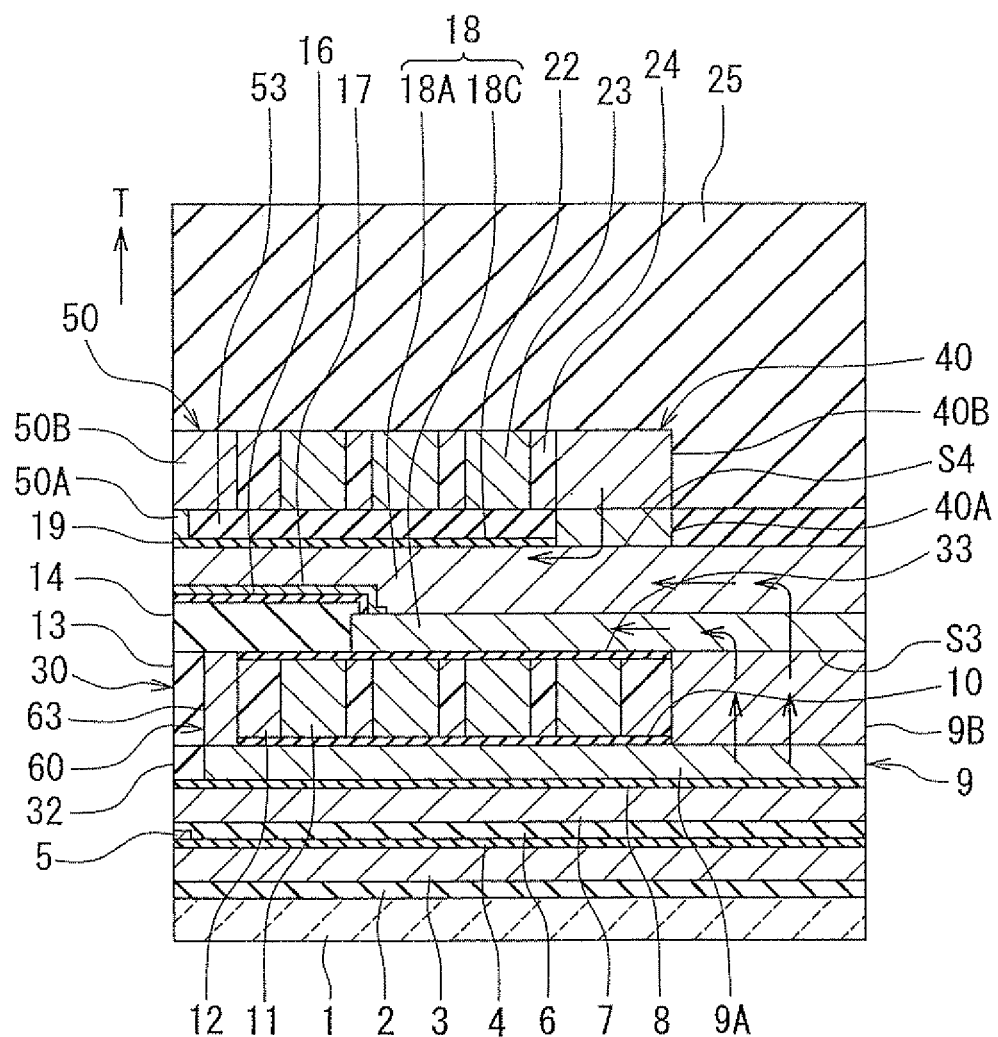
FIG. 36 is a cross-sectional view for illustrating the configuration of a magnetic head of a fourteenth embodiment of the invention.
Figure 37:
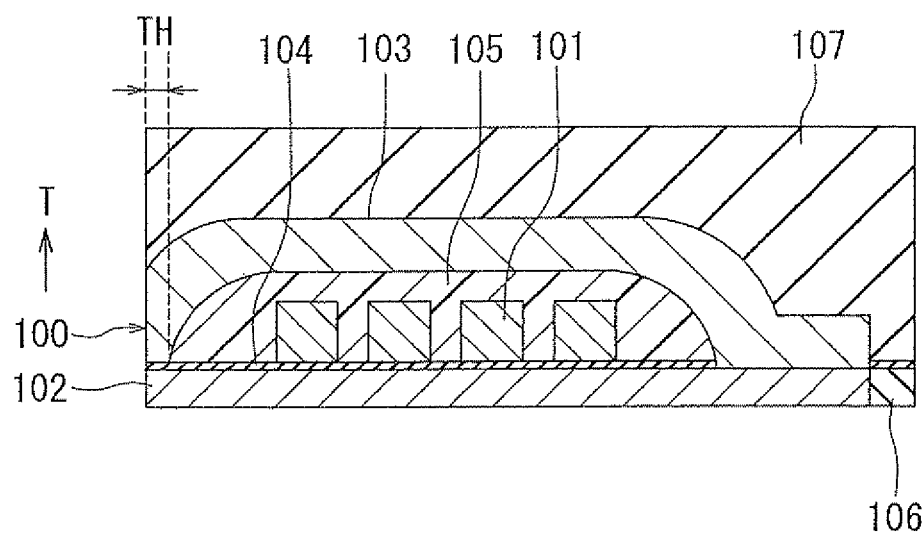
FIG. 37 is a cross-sectional view illustrating a main part of an example of a shield-type head.

Reference is now made to FIG. 36 to describe a magnetic head of a fourteenth embodiment of the invention. FIG. 36 is a cross-sectional view for illustrating the configuration of the magnetic head of the fourteenth embodiment. FIG. 36 illustrates a cross section orthogonal to the medium facing surface and the plane of the substrate.

The magnetic head of the fourteenth embodiment is similar to the magnetic head of the tenth embodiment but has differences as will now be described. In the fourteenth embodiment, the nonmagnetic layer 28A of the tenth embodiment is not provided. In the fourteenth embodiment, when seen in the direction orthogonal to the interface S4 between the first layer 40A and the pole layer 18A, the interface S4 is disposed at a location that is closer to the medium facing surface 30 than the interface S3 between the second layer 9B and the lower yoke layer 18C and that does not coincide with the interface S3. According to the embodiment, through the function the same as that of the second embodiment, in the magnetic layer 18 it is possible to suppress repulsion between the flux that has come into the lower yoke layer 18C from the second layer 9B and the flux that has come into the pole layer 18A from the first layer 40A. It is thereby possible to prevent a reduction in flux density of the magnetic layer 18 and to thereby improve the overwrite property.

In the fourteenth embodiment the interface S4 may be disposed at a location that is farther from the medium facing surface 30 than the interface S3 and that does not coincide with the interface S3. The remainder of configuration, function and effects of the fourteenth embodiment are similar to those of the tenth embodiment.

The present invention is not limited to the foregoing embodiments but may be practiced in still other ways. For example, in any of the eighth, tenth, twelfth and fourteenth embodiments, the pole layer 18A may have a penetrating hole, and the coupling portion 60 may pass through this hole without touching the pole layer 18A and couple the first layer 50A of the shield layer 50 to the first layer 9A of the first magnetic layer 9 for flux concentration.

The pole layer of the invention is not limited to the one formed in the manner disclosed in each of the embodiments but may be formed otherwise. For example, the pole layer may be formed by patterning a magnetic layer by etching, or may be formed by frame plating. The pole layer may have a flat top surface.

While the magnetic head disclosed in each of the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a first coil and a second coil each generating a magnetic field corresponding to data to be written on the recording medium;
    a magnetic layer for writing having an end face located in the medium facing surface, allowing a magnetic flux corresponding to the field generated by each of the first and second coils to pass therethrough, and generating a write magnetic field for writing the data on the recording medium by means of a perpendicular magnetic recording system;
    a first magnetic layer for flux concentration disposed backward of the magnetic layer for writing along a direction of travel of the recording medium, connected to the magnetic layer for writing at a location away from the medium facing surface, and allowing a magnetic flux corresponding to the field generated by the first coil to pass; and
    a second magnetic layer for flux concentration disposed forward of the magnetic layer for writing along the direction of travel of the recording medium, connected to the magnetic layer for writing at a location away from the medium facing surface, and allowing a magnetic flux corresponding to the field generated by the second coil to pass, wherein:
    the magnetic layer for writing incorporates: a pole layer having the end face located in the medium facing surface; and a yoke layer connected to the pole layer and disposed backward of the pole layer along the direction of travel of the recording medium at a location away from the medium facing surface;
    the first magnetic layer for flux concentration is connected to the yoke layer;
    the second magnetic layer for flux concentration is connected to the pole layer;
    when seen in a direction orthogonal to an interface between the first magnetic layer for flux concentration and the yoke layer, the first coil is wound around the interface between the first magnetic layer for flux concentration and the yoke layer; and
    when seen in a direction orthogonal to an interface between the second magnetic layer for flux concentration and the pole layer, the second coil is wound around the interface between the second magnetic layer for flux concentration and the pole layer,
    the magnetic head further comprising a nonmagnetic layer made of a nonmagnetic material and disposed between the pole layer and the yoke layer, wherein:
    when seen in the direction orthogonal to the interface between the first magnetic layer for flux concentration and the yoke layer, at least part of the nonmagnetic layer is disposed at a location that coincides with at least part of this interface; and
    the yoke layer is connected to the pole layer at least at a location closer to the medium facing surface than the nonmagnetic layer.

2. The magnetic head according to claim 1, wherein:
    the second magnetic layer for flux concentration has an end face located in the medium facing surface; and
    part of the second coil is disposed between the second magnetic layer for flux concentration and the magnetic layer for writing.

3. The magnetic head according to claim 1, wherein the first magnetic layer for flux concentration has a portion located to sandwich part of the first coil between the magnetic layer for writing and itself.

4. The magnetic head according to claim 1, further comprising: a shield layer disposed forward of the pole layer along the direction of travel of the recording medium and having an end face located in the medium facing surface; and a gap layer made of a nonmagnetic material and disposed between the pole layer and the shield layer, wherein:
    in the medium facing surface, the end face of the shield layer is located forward of the end face of the pole layer along the direction of travel of the recording medium with a specific space created by a thickness of the gap layer; and
    the end face of the pole layer has a side located adjacent to the gap layer, the side defining the track width.

5. The magnetic head according to claim 4, wherein the first magnetic layer for flux concentration incorporates a portion located to sandwich part of the first coil between the magnetic layer for writing and itself,
    the magnetic head further comprising a coupling portion coupling the shield layer and the first magnetic layer for flux concentration to each other without touching the magnetic layer for writing.

* * * * *